United States Patent
Andreev et al.

(10) Patent No.: US 7,797,739 B2
(45) Date of Patent: Sep. 14, 2010

(54) AUTOMATED VERIFICATION OF CORRECTNESS OF ASPECTS OF AN INFORMATION TECHNOLOGY SYSTEM

(75) Inventors: Dmitry Andreev, Chester, NY (US); Paul G. Greenstein, Croton-on-Hudson, NY (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 11/135,599

(22) Filed: May 23, 2005

(65) Prior Publication Data

US 2006/0156274 A1    Jul. 13, 2006

Related U.S. Application Data

(63) Continuation-in-part of application No. 11/120,678, filed on May 3, 2005, which is a continuation-in-part of application No. 11/060,007, filed on Feb. 17, 2005, which is a continuation-in-part of application No. 11/011,449, filed on Dec. 14, 2004.

(51) Int. Cl.
    *G06F 17/30* (2006.01)
(52) U.S. Cl. ...................................... 726/16
(58) Field of Classification Search .................... 726/16
    See application file for complete search history.

(56) References Cited

U.S. PATENT DOCUMENTS 5,960,200 A    9/1999    Eager et al.
6,031,984 A    2/2000    Walser
6,167,564 A    12/2000   Fontana et al.
6,249,769 B1   6/2001    Ruffin et al.
6,260,065 B1 * 7/2001    Leiba et al. .................. 709/224
6,621,505 B1   9/2003    Beauchamp et al.
6,983,449 B2 * 1/2006    Newman ..................... 717/121

(Continued)

OTHER PUBLICATIONS

Notice of Allowance (Mail Date Dec. 19, 2008) for U.S. Appl. No. 11/263,498, Filing Date Oct. 31, 2005; Confirmation No. 2739.

(Continued)

*Primary Examiner*—Nasser Moazzami
*Assistant Examiner*—Michael S McNally
(74) *Attorney, Agent, or Firm*—Schmeiser, Olsen & Watts; William E. Schiesser

(57) ABSTRACT

A method for verifying correctness of an Information Technology (IT) structure instance D of an IT structure R, a method for detecting an unauthorized change in an operating instance X of an IT structure R, a method for verifying conformance of an IT structure to an IT delivery environment, associated computer program products, and associated processes for integrating computing infrastructure. The method for verifying correctness of an IT structure instance D determines whether a reverse specification RD for D differs from R. The method for detecting an unauthorized change in an operating instance X of an IT structure R determines whether authorized changes in R have occurred. The method for verifying conformance of an IT structure to an IT delivery environment verifies compliance of the IT structure relating to: product standard compliance, compliance of software elements of the IT structure primitive composition, software application type compliance, and network traffic compliance.

24 Claims, 44 Drawing Sheets

U.S. PATENT DOCUMENTS

| | | | |
|---|---|---|---|
| 7,143,420 B2* | 11/2006 | Radhakrishnan | 719/328 |
| 2002/0104071 A1* | 8/2002 | Charisius et al. | 717/109 |
| 2002/0129001 A1 | 9/2002 | Levkoff et al. | |
| 2002/0129345 A1 | 9/2002 | Tilden et al. | |
| 2002/0194147 A1 | 12/2002 | Ricke | |
| 2003/0140128 A1* | 7/2003 | Cox et al. | 709/221 |
| 2003/0149685 A1 | 8/2003 | Trossman et al. | |
| 2003/0158842 A1 | 8/2003 | Levy et al. | |
| 2003/0172145 A1* | 9/2003 | Nguyen | 709/223 |
| 2004/0156391 A1* | 8/2004 | Bushnell | 370/468 |
| 2005/0027858 A1 | 2/2005 | Sloth et al. | |
| 2005/0066015 A1* | 3/2005 | Dandekar et al. | 709/220 |

OTHER PUBLICATIONS

Final Office Action (Mail Date Dec. 3, 2008) for U.S. Appl. No. 11/011,449, Filing Date Dec. 14, 2004; Confirmation No. 6365.

U.S. Appl. No. 11/060,007, filed Feb. 17, 2005; Confirmation No. 2527.

U.S. Appl. No. 11/120,678, filed May 3, 2005; Confirmation No. 3799.

U.S. Appl. No. 11/159,918, filed Jun. 23, 2005; Confirmation No. 4650.

U.S. Appl. No. 11/741,885, filed Apr. 30, 2007; Confirmation No. 3872.

Chou et al.; Guided simulated annealing method for optimization problems; The American Physical Society; Physical Review E 67, 066704 (2003); pp. 1-6.

What is Optimization?, http://www-fp.mcs.anl.gov/OTC/Guide/OptWeb/opt.html, Mar. 28, 1996, pp. 1-3.

Reliability and Availability Basics, Apr. 1, 2002, EventHelix, http://web/archive.org/web/20020401235342/www.eventhelix.com/RealtimeMantra/FaultHandling/reliability_availability_basics.htm.

System Reliability and Availability, Apr. 1, 2002, EventHelix, http://www.eventhelix.com/RealtimeMantra/FaultHandling/system_reliability_availability.htm.

\* cited by examiner

IT ENTITIES addElement() Method deleteElement() Method setAvailable() Method ensureDependencies() METHOD

IT STRUCTURE COMPOSITION

IT DEVELOPMENT PROCESS

TRANSLATION ITERATION PROCESS

ENSURING SPECIFICATION OF CHARACTERISTICS OF ABSTRACT IT STRUCTURE INSTANCE

ADJUSTING CHARACTERISTICS OF IT STRUCTURE INSTANCE

SELECTION OF SUBCLASS OF IT STRUCTURE

SELECTION OF TRANSLATION CANDIDATE

CLASS HIERARCHY EXAMPLE

DELIVERY BINDING

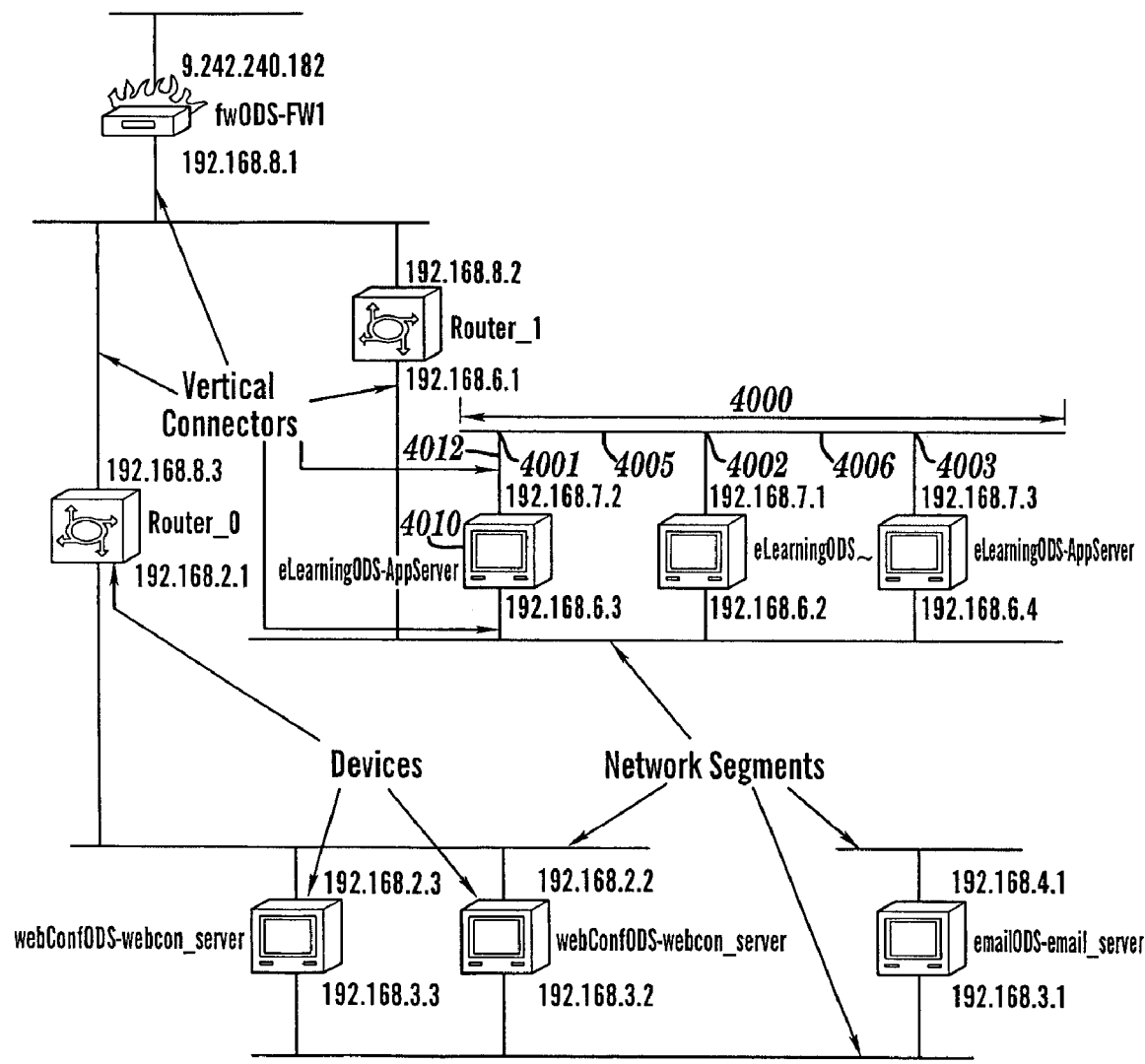
*FIG. 21A*  Sample Network Display

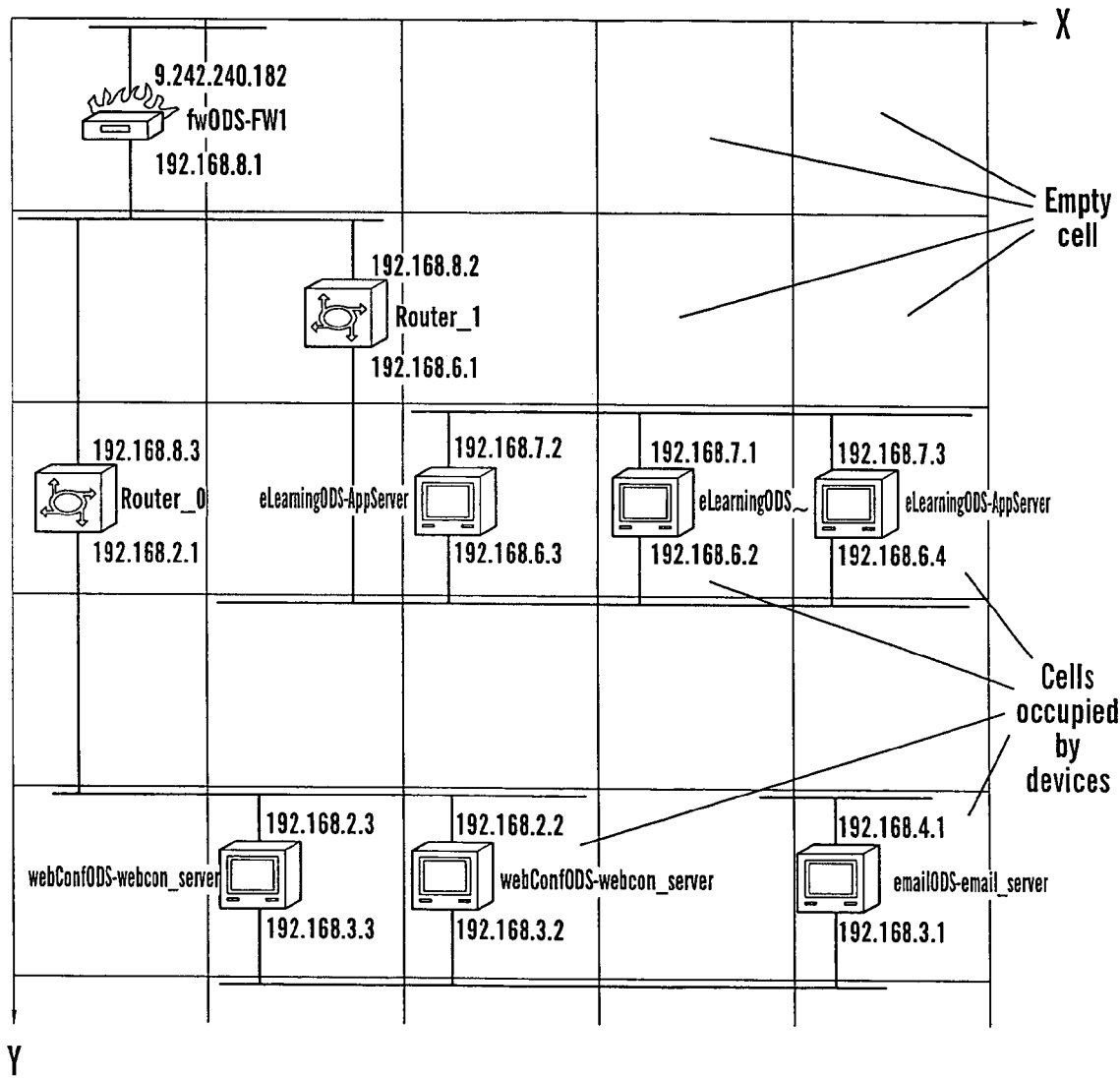
*FIG. 21B* Relationship Between Display Matrix and Network Elements

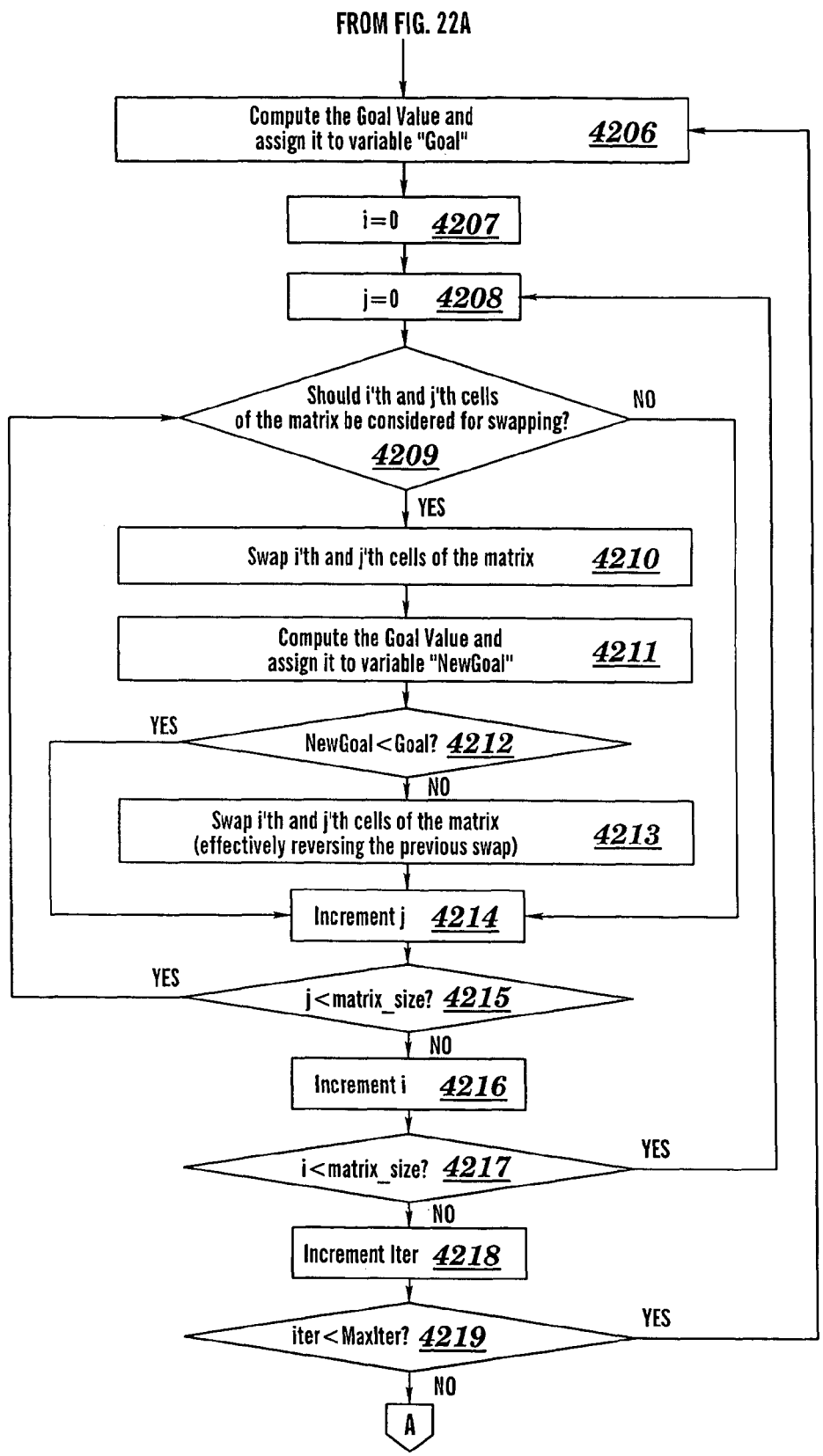
FIG. 22B  Matrix Generation and Matrix Cell Swapping

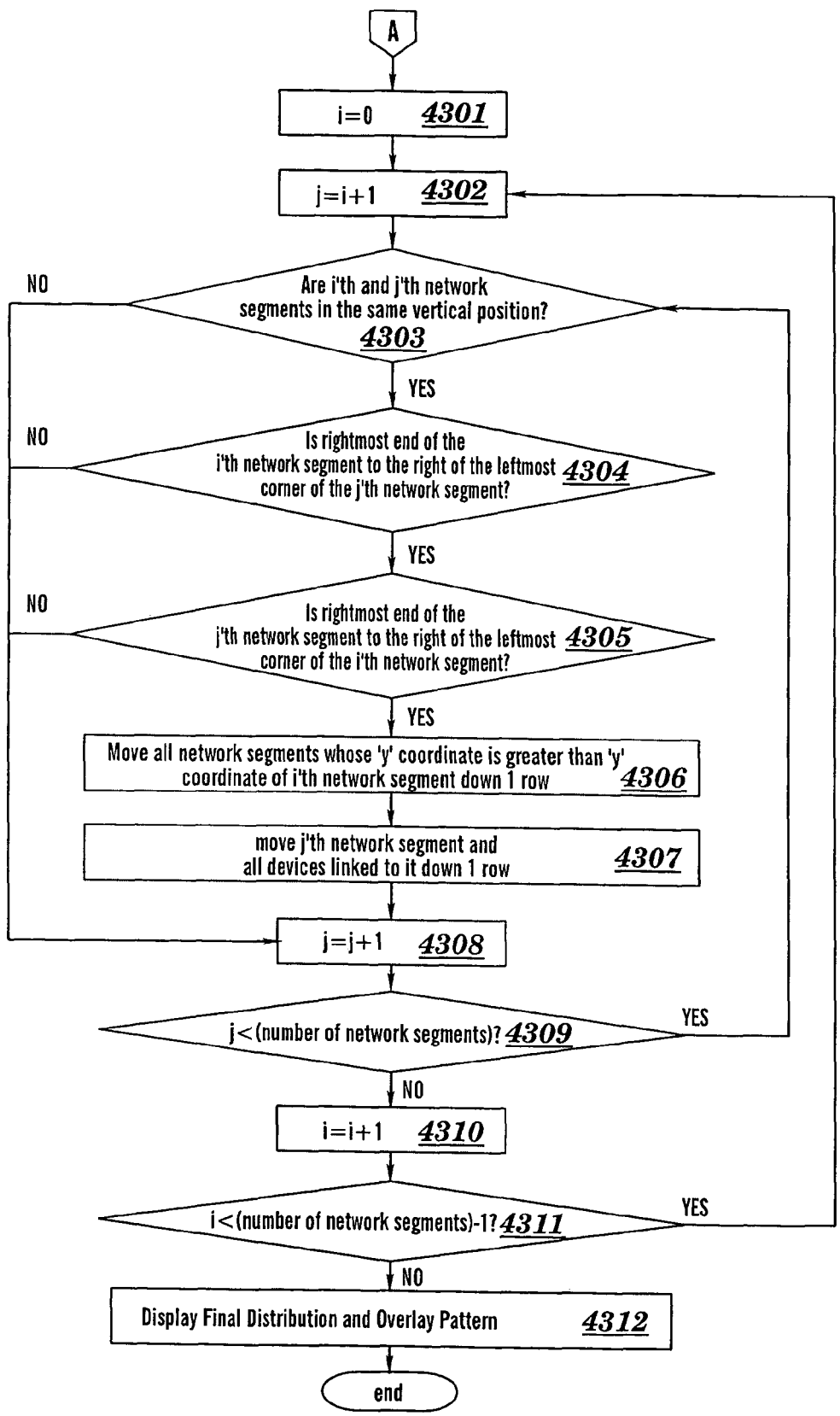
FIG. 23  Rearrangement of Network Segments

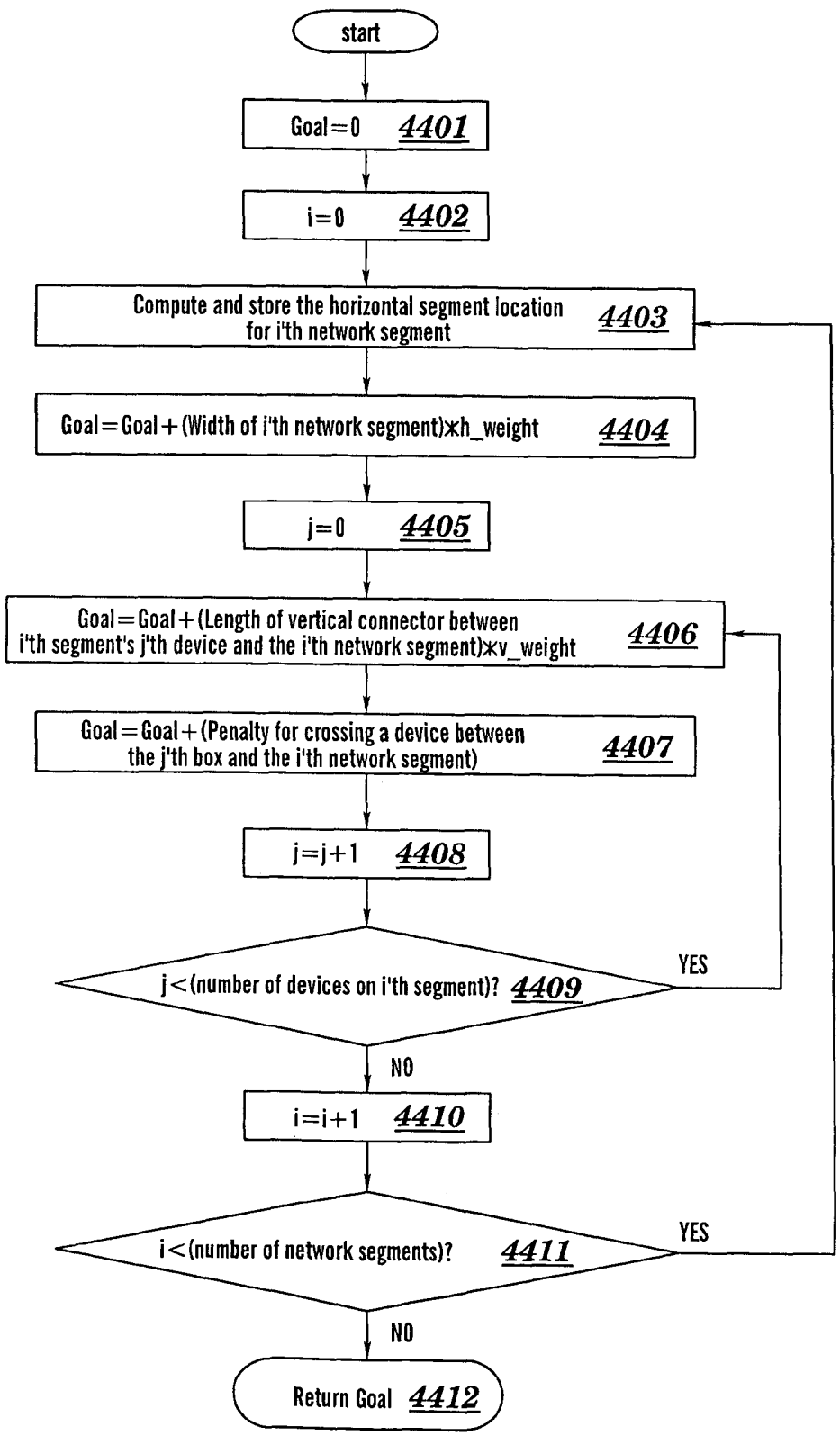
*FIG. 24*  Goal Function Method

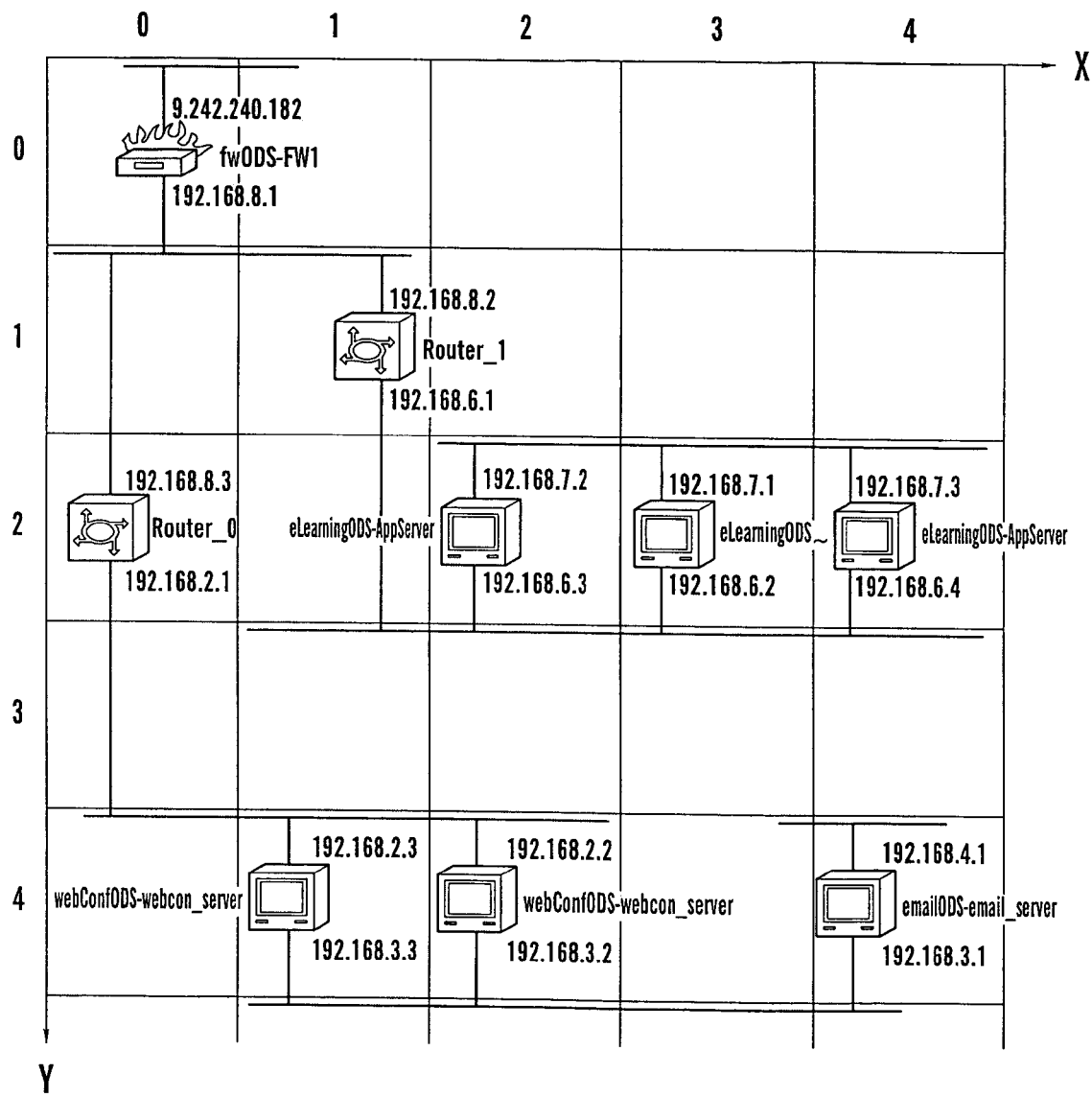
FIG. 25  Network Diagram Before Swapping

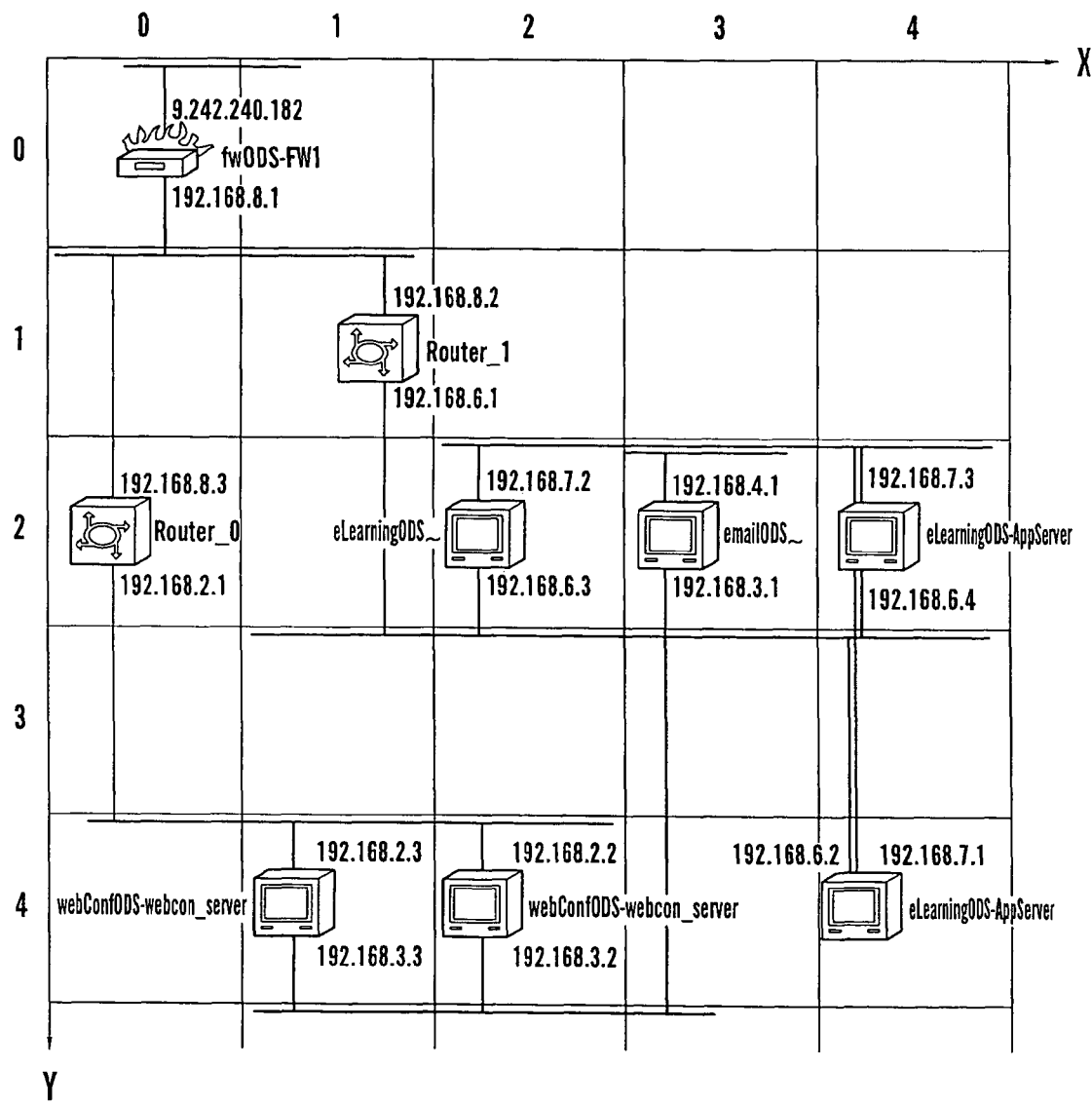
FIG. 26 Network Diagram After Swapping

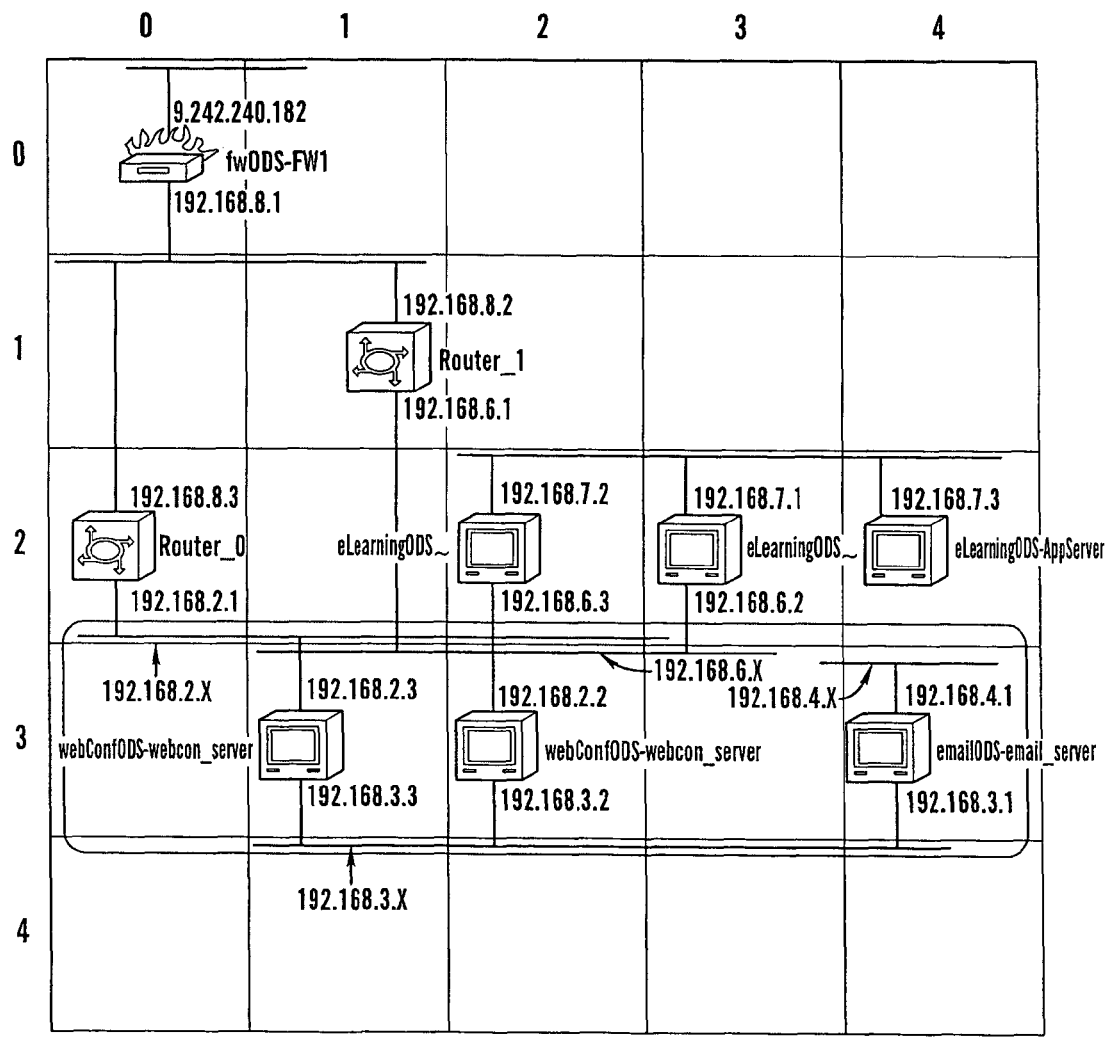
FIG. 27 Separating Overlapping Segments - Before Separation

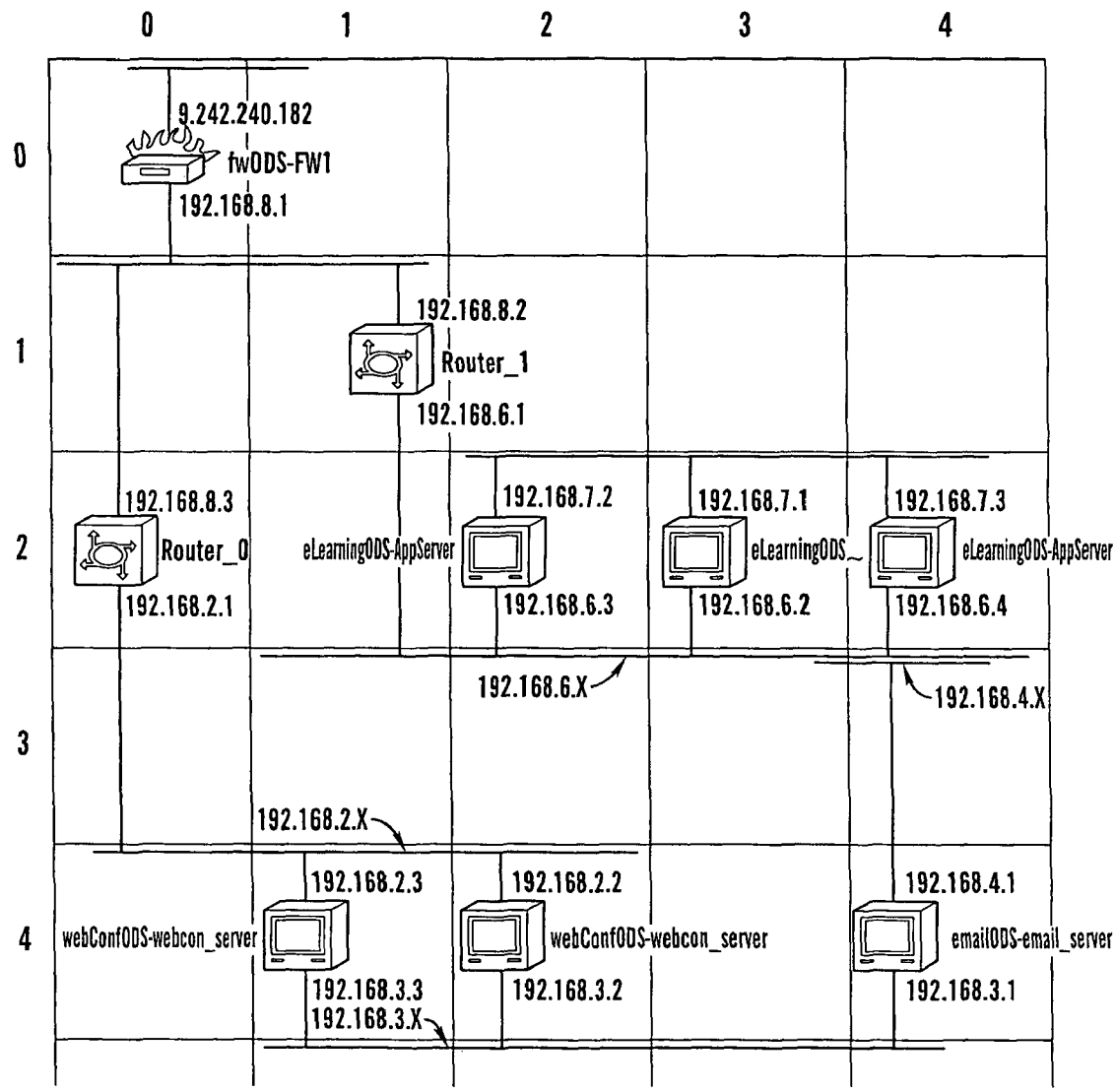
*FIG. 28* Separating Overlapping Segments - After Separation

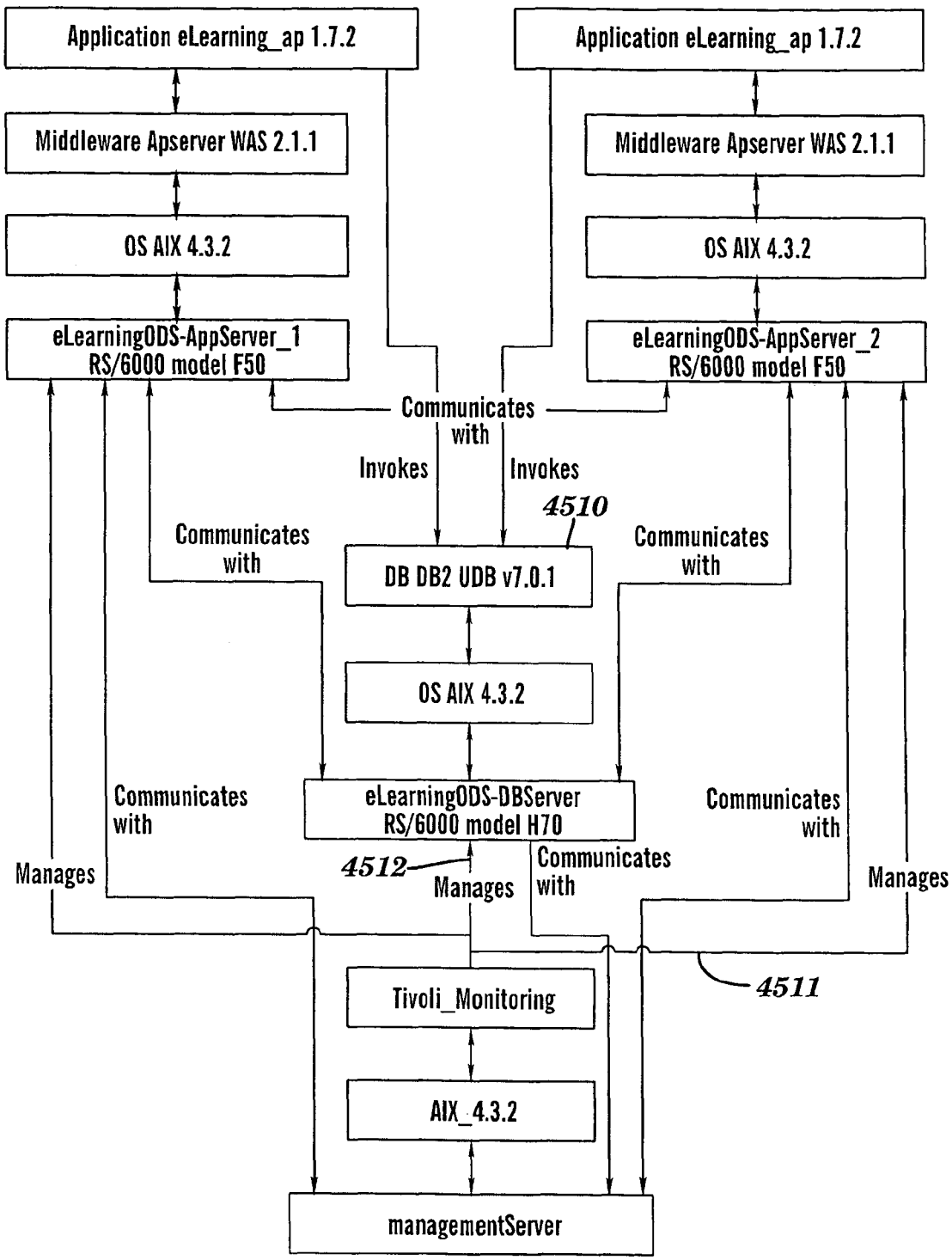
FIG. 29   Display of IT Relationships

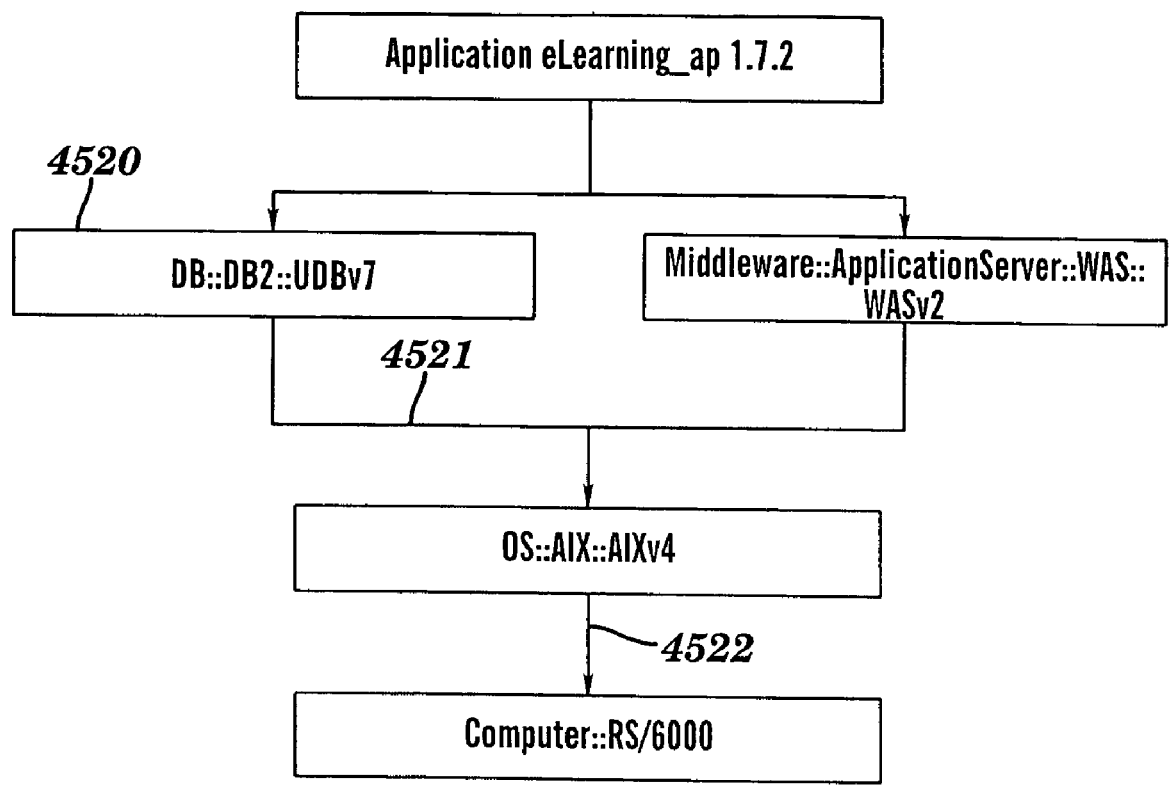
FIG. 30 Display of IT Dependencies

AUTOMATED VERIFICATION OF CORRECTNESS OF ASPECTS OF AN INFORMATION TECHNOLOGY SYSTEM

RELATED APPLICATION

The present patent application is a continuation-in-part of copending U.S. patent application Ser. No. 11/120,678, filed May 3, 2005 and entitled "Automated Generation of Configuration Elements of an Information Technology System", which is a continuation-in-part of copending U.S. patent application Ser. No. 11/060,007, filed Feb. 17, 2005 and entitled "Automated Display of an Information Technology System Configuration", which is a continuation-in-part of copending U.S. patent application Ser. No. 11/011,449, filed Dec. 14, 2004 and entitled "Automation of Information Technology System Development".

BACKGROUND OF THE INVENTION

1. Technical Field

The present invention relates generally to automation of Information Technology system development and more particularly to an automated verification of correctness of aspects of an Information Technology system.

2. Related Art

A number of activities are associated with use of a computer. These activities may be grouped into several categories: development, deployment, operations and maintenance, and productive use. The category of development comprises determination of specific hardware, software, and networking required to satisfy the specific usage needs; planning of a production system.

The category of deployment comprises implementation of the developed production system, ranging from acquisition of the appropriate hardware and software to installation, configuration, and customization of acquired software, hardware and network devices, to verification of correctness of the built system.

The category of operations and maintenance comprises operation of the deployed production system and introduction of changes to it.

The category of productive use comprises application of the deployed production system to activities for which it is intended.

The preceding categories of activities are common to computing systems, be it a stand-alone personal computer, or a geographically dispersed collection of highly complex systems supporting an international corporation. The first three of the preceding categories of activities (i.e., development, deployment, operations) are a liability required in support of the last activity category of productive use of a computer system. While for a single stand-alone personal computer, development, deployment and operations may involve miniscule investment of time and/or money (with the exception of the acquisition of the necessary hardware and software), in large institutions, these preceding three activities occupy armies of technical and administrative personnel and entail high costs, primarily due to complexity of computer systems, exacerbated by constantly evolving technology and business requirements.

Thus, there is a need for a method and system to reduce costs and user effort pertaining to Information Technology (IT) development, including implementation of an automated verification of correctness of aspects of an Information Technology system.

SUMMARY OF THE INVENTION

The present invention provides a method for verifying correctness of an Information Technology (IT) structure instance D of an IT structure R of an IT system, an associated computer program product, and an associated process for integrating computing infrastructure, said method comprising:

providing information relating to the IT structure instance D, said IT instance D having resulted from deployment of the IT structure R;

generating a real IT structure RD from the information relating to the IT structure instance D;

comparing R and RD to determine whether RD differs from R; and if said comparing determines that RD differs from R then indicating that said deployment was unsuccessful else indicating that said deployment was successful.

The present invention provides a method for detecting an unauthorized change in an operating instance X of an Information Technology (IT) structure R of an IT system, an associated computer program product, and an associated process for integrating computing infrastructure, said method comprising the steps of:

(a) determining if X is a correctly deployed instance of R; and (b) if said determining determines that X is not a correctly deployed instance of R then signaling that X is not a correctly deployed instance of R and exiting said method, else (b1) delaying or not delaying for a pre-specified period of time followed by (b2) if R is determined to have acquired an authorized change since step (a) then exiting said method else looping back to step (a).

The present invention provides a method for verifying conformance of an Information Technology (IT) structure of an IT system to an IT delivery environment, an associated computer program product, and an associated process for integrating computing infrastructure, said method comprising:

verifying product standard compliance of the IT structure by verifying that a primitive composition of the IT structure does not comprise a non-abstract element that is not in conformance with all standards established for the IT delivery environment;

verifying compliance of software elements the primitive composition of the IT structure by verifying that the IT structure does not comprise a software element that is forbidden from being used in the IT delivery environment, and by further verifying that each software element of the IT structure required for use in the IT delivery environment satisfies all dependencies of said each software element required by the IT delivery environment;

verifying software application type compliance of the IT structure by verifying that the IT structure does not comprise a software application type that is forbidden by the IT delivery environment; and verifying network traffic compliance of the IT structure by verifying that: the IT structure does not use a protocol forbidden by the IT delivery environment, the IT structure does not comprise an interface on any port forbidden by the IT delivery environment from accessing external data flow into the IT delivery environment from outside of the IT delivery environment, and the IT structure does not comprise an interface on any port forbidden by the IT delivery environment from facilitating outward data flow from within the IT delivery environment to outside of the IT delivery environment.

The present invention provides a method and system to reduce costs and user effort pertaining to Information Technology (IT) development, including implementation of an automated verification of correctness of aspects of an Information Technology system.

BRIEF DESCRIPTION OF THE DRAWINGS

FIG. 21A depicts a network display comprising devices, network segments, and vertical connectors, in accordance with embodiments of the present invention.

FIG. 21B depicts relationships between the network display of FIG. 21A and a two-dimensional matrix representing the screen layout, in accordance with embodiments of the present invention.

FIGS. 22A and 22B is a flow chart describing matrix generation and matrix cell swapping, in accordance with embodiments of the present invention.

FIG. 23 is a flow chart describing rearrangement of network segments, in accordance with embodiments of the present invention.

FIG. 24 is a flow chart describing the goal function method for computing a goal value, in accordance with embodiments of the present invention.

FIGS. 25-26 illustrate how the swapping of two non-empty cells of the matrix can affect the goal value, in accordance with embodiments of the present invention.

FIGS. 27-28 illustrate movement of overlapping network segments, in accordance with embodiments of the present invention.

FIG. 29 illustrates a display for visualizing IT relationships, in accordance with embodiments of the present invention.

FIG. 30 illustrates a display for visualizing IT dependencies, in accordance with embodiments of the present invention.

DETAILED DESCRIPTION OF THE INVENTION

The detailed description of the present invention is organized into the following sections:
1. Nomenclature;
2. Information Technology (IT) Entity Model (defines basic IT entities and describes their properties and associated processes);
3. IT Structure Visualization (generates a display of an IT structure configuration);
4. Generation of IT Structure configuration elements;

5. Verification of correctness of aspects of an Information Technology system;
6. Computer System (describes computer system used to implement an IT Entity Model and associated processes)

1. Nomenclature 1.1 Flow Charts

Figure 3:
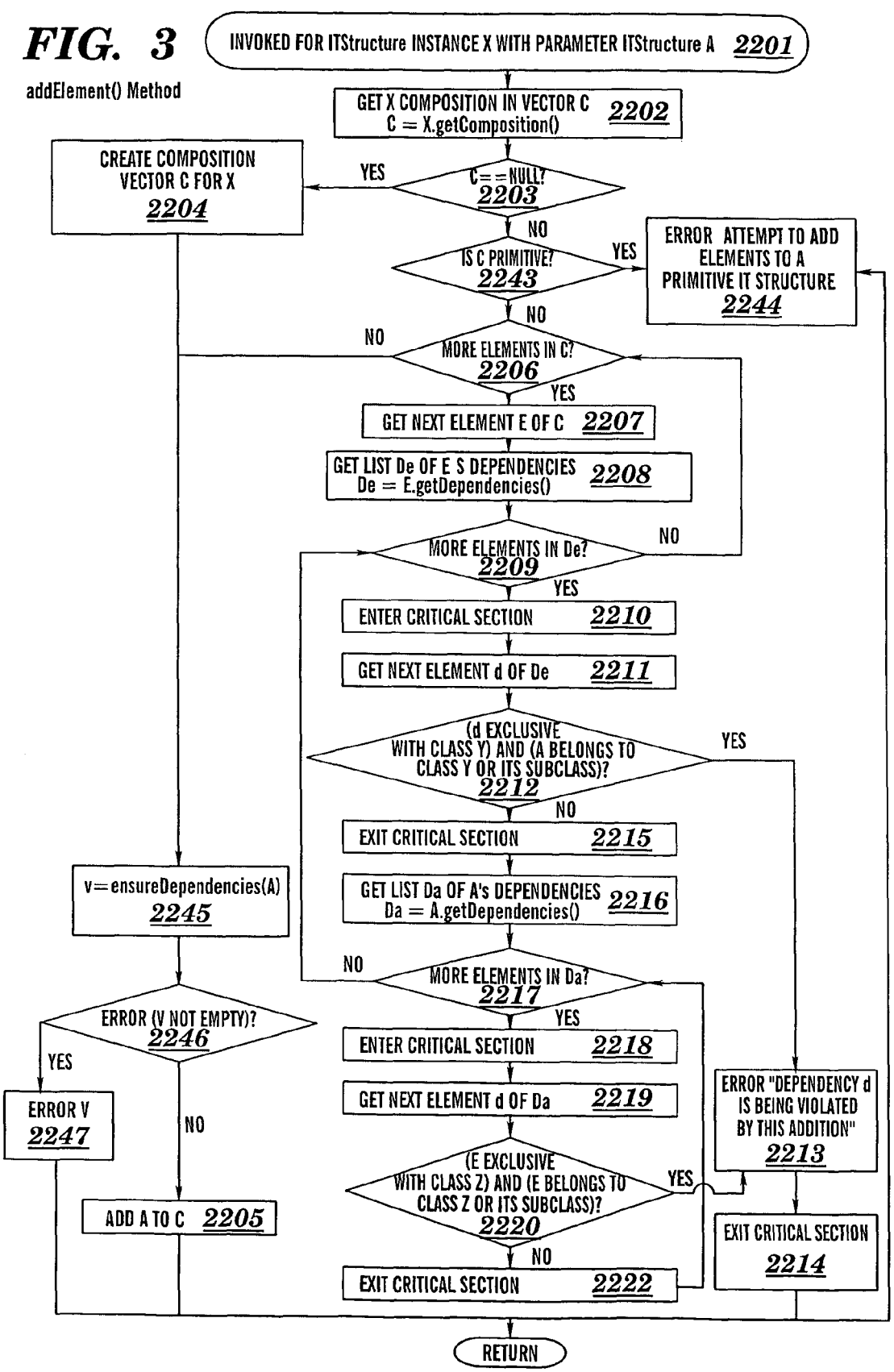
FIG. 3 is a flow chart depicting the logic of addElement( ) method, in accordance with embodiments of the present invention.

The flow charts in the Figures comprise, inter alia, the following block shapes:
1) Rectangular: represents execution of code as described (e.g., FIG. 3, block 2202); and
2) Diamond: represents a decision block (e.g., FIG. 3, block 2203).

1.2 Abbreviations

The following abbreviations are utilized herein.
CASE—computer-aided software engineering
CD—compact disk
CICS—Customer Information Control System
CPU—central processor unit
DASD—direct access storage device
DB—database
DNS—domain name server
DRAM—dynamic random access memory
DVD—digital video disk
GB—gigabyte
GUI—graphical user interface
HTTP—HyperText Transfer Protocol
HTTPS—HTTP Secure
IDE—integrated development environment
IP—internet protocol
IT—information technology
KB—kilobyte
KW—kilowatt
LAN—local-area network
LOC—lines of code
Mbps—megabits per second
MHz—mega-Hertz
MN—multi-processor
NAT—network address translation
NIC—network interface card
NOOP—no operation (moot)
OS—operating system
PM—person/month
POTS—"plain old telephone service"
RAM—random-access memory
RISC—reduced instruction set computer
ROM—read-only memory
SL—service level
SMTP—Simple Mail Transfer Protocol
S/N—serial number
TCO—total cost of ownership
TCP/IP—transmission control protocol/internet protocol
UI—user interface
UML—universal modeling language
UP—uni-processor
UPS—uninterruptible power supply 2. Information Technology (IT) Entity Model IT systems and environments may be described in terms of IT entities. The term "entity" is understood to denote "IT entity" herein.

The base entity model comprises IT entities, relationships among the IT entities, and interfaces and methods provided by these IT entities.

For illustrative purposes, Java-like syntax is used herein as a specification language for IT structures. An IT structure is a set of IT entities. Generally, another programming language (e.g., object oriented, procedural, high- or low-level) may be used instead of Java; a modeling language (e.g., UML) may be used instead of Java; and a specialized language could be defined and implemented solely for the purpose of definition of IT structures.

2.1 IT Entities

Figure 1:
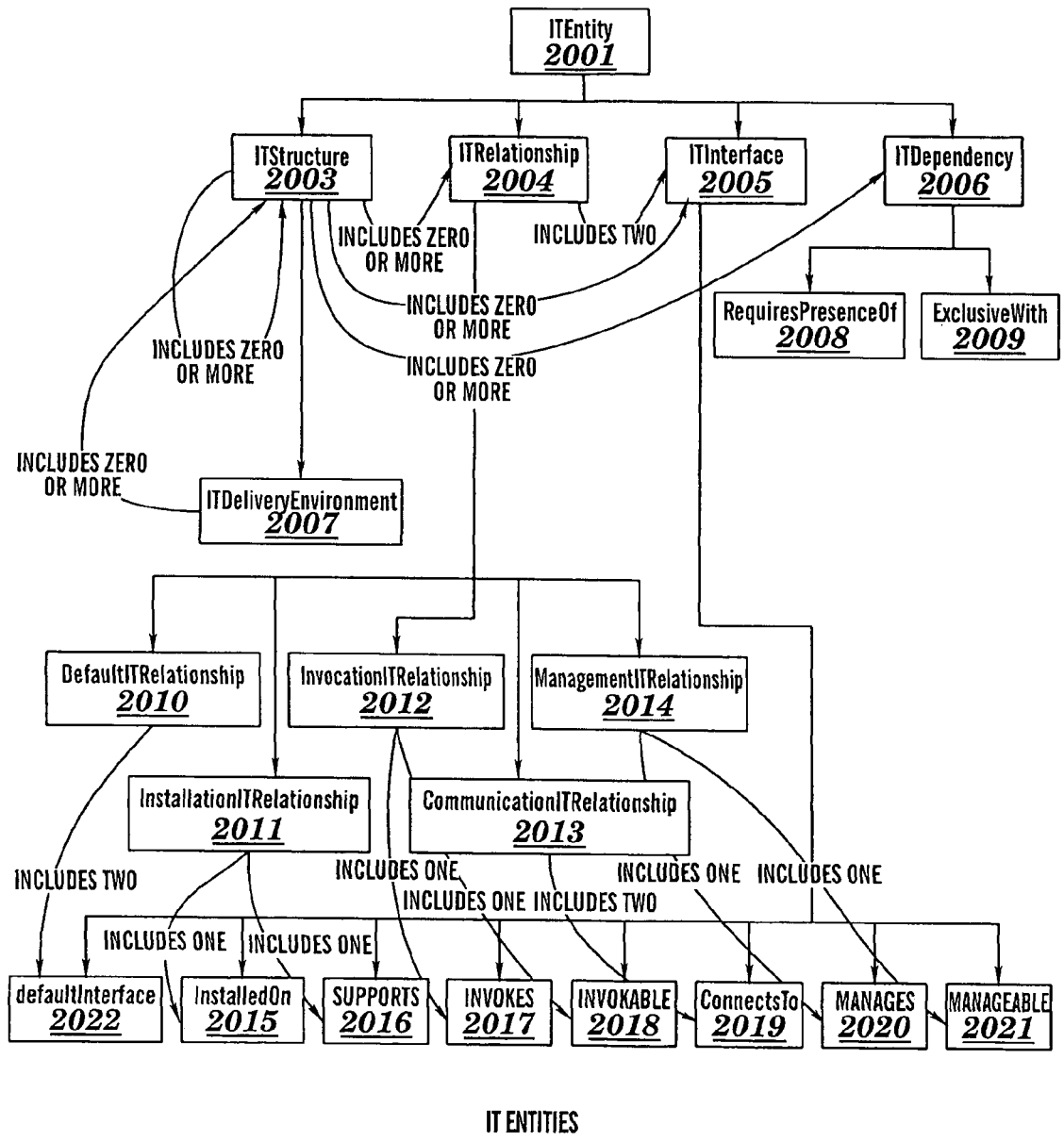
FIG. 1 is a diagram illustrating Information Technology (IT) entities included in the base entity model, and organized in a class hierarchy, in accordance with embodiments of the present invention.

FIG. 1 is a diagram illustrating IT entities included in the base entity model, and organized in a class hierarchy as shown in Table 1, in accordance with embodiments of the present invention.

TABLE 1

```
ITEntity 2001
    ITStructure 2003
        ITDeliveryEnvironment 2007
    ITInterface 2005
        defaultInterface 2022
        InstalledOn 2015
        Supports 2016
        Invokes 2017
        Invokable 2018
        ConnectsTo 2019
        Manages 2020
        Mangeable 2021
    ITRelationship 2004
        DefaultITRelationship 2010
        InstallationITRelationship 2011
        InvocationITRelationship 2012
        CommunicationITRelationship 2013
        ManagementITRelationship 2014
    ITDependency 2006
        RequiresPresenceOf 2008
        ExclusiveWith 2009
```

IT entities may be qualified as real, virtual, or abstract. A real IT entity has no undefined characteristic and may therefore be represented physically. A virtual IT entity has exactly one undefined characteristic and thus cannot have more than one undefined characteristic. An abstract IT entity has at least two undefined characteristics. Examples of real entities, virtual entities, and abstract entities will be presented infra. For convenience, class Type is introduced as follows:

Enumeration Type:=(abstract, virtual, real)

2.1.1 ITEntity Class

TEntity class is introduced for convenience as a root class for the other IT entity classes listed above. ITEntity has the following methods:
1) constructor(String name [, Type type])—creates an instance of ITEntity with the specified name and of optionally specified type
2) boolean isAbstract( ), returns true if ITEntity is abstract, false otherwise
3) boolean isVirtual( ), returns true if ITEntity is virtual, false otherwise
4) boolean isReal( ), returns true if ITEntity is real, false otherwise
5) getName( )—returns ITEntity name
6) setType(Type type)—changes IT entity type as specified 2.2 IT Structures An IT structure is either a primitive IT structure or a complex IT structure.

A primitive IT structure is an IT entity representing materials or labor, indivisible within a particular view to a structural model, and a set of method associated with characteristics of the represented materials or labor.

A real primitive IT structure represents a specific single physical object or a specific unit of labor. Examples of real primitive IT structure include:
1) RS/6000 model F50 S/N 123456-AB. There is one and only one RS/6000 model F50 with this particular S/N.
2) Software product Ppppp version vvvvv license key 12345678-AB-9ABCD-XYZ.

A virtual primitive IT structure represents a class of specific physical objects. Examples of virtual primitive IT structure include:

1) RS/6000 model F50. Since no s/n is specified, there is a class of RS/6000 model F50 this virtual primitive IT structure corresponds to, and RS/6000 model F50 with any s/n belongs to this class.

2) Software product Ppppp version vvvvv.

An abstract primitive IT structure represents an abstract view of materials or labor. In this embodiment, abstract primitive IT structures include the same out-of-model IT entity, called abstractPrimitive. Other embodiment may have a multiplicity of abstract primitive out-of-model entities. Examples of abstract primitive IT structure include:

1) RS/6000. Since no model is specified, any RS/6000, including model F50, as well as any other models, belongs to this class.

2) Computer. Since no architecture, type, or any other characteristics are specified, any computer, including any model of RS/6000, belongs to this class.

3) Software product Ppppp.

4) Software product.

Primitive IT structures are indivisible only within a particular model. For example, a computer may be viewed as indivisible in the context of the model used in this embodiment. In a different embodiment, however, a different model may exist in which a computer may be represented as an IT structure (see discussion infra of a complex IT structure), comprising several primitive IT structures; e.g., the following collection of primitive IT structures: processor, memory, DASD, and network interface.

A complex IT structure is a non-empty collection of IT structures, a defined set of relationships (see below) among these IT structures, and a description of this IT structure's characteristics. Examples of a complex primitive IT structure include:

1) a personal computer
2) a network of Lotus Domino servers
3) a zSeries sysplex
4) a collection of programs running on a particular computer
5) a collection of software and hardware required to run Ariba Buyer application
6) a hosted application service (e.g., a service including a service provider hosting an application; Ariba Buyer, in its data center, and providing service customers access to the application through a network; Internet)
7) a professional service (e.g., a service including a service provider perform installation and configuration of an application; Ariba Buyer, at a service customer data center)
8) a network service (e.g., a service providing access to Internet at a specified guaranteed minimum bandwidth)
9) a combined network/hosted application services (e.g., a service providing access to Internet at a specified bandwidth and optionally including web hosting such as hosting of customer's web pages accessed through Internet; and a hosted application service for e-mail).

In the process of formation of an IT structure, values of properties of elements of this IT structure's composition (see below) may change; e.g., assignment of a name to a computer may be required to include that computer in an IT structure.

The set of relationships is imposed by a particular IT structure, rather than being intrinsic for the primitive IT structures comprising the IT structure. Thus, multiple complex IT structures may be created from the same set of primitive IT structures, and uniqueness of the assigned name (i.e., its inequality to any other computer name) may be imposed on a primitive IT structure representing a computer, included in a complex IT structure.

An IT structure composition is the list of IT structures included in a complex IT structure, or an out-of-model entity describing the entity represented by a primitive IT structure (e.g., a String, or a reference to a DB record).

An IT structure composition element is an IT entity included in an IT structure composition.

An IT structure primitive composition is the list of primitive IT structures included in an IT structure, where all complex IT structures are replaced with their respective primitive compositions.

Figure 8:
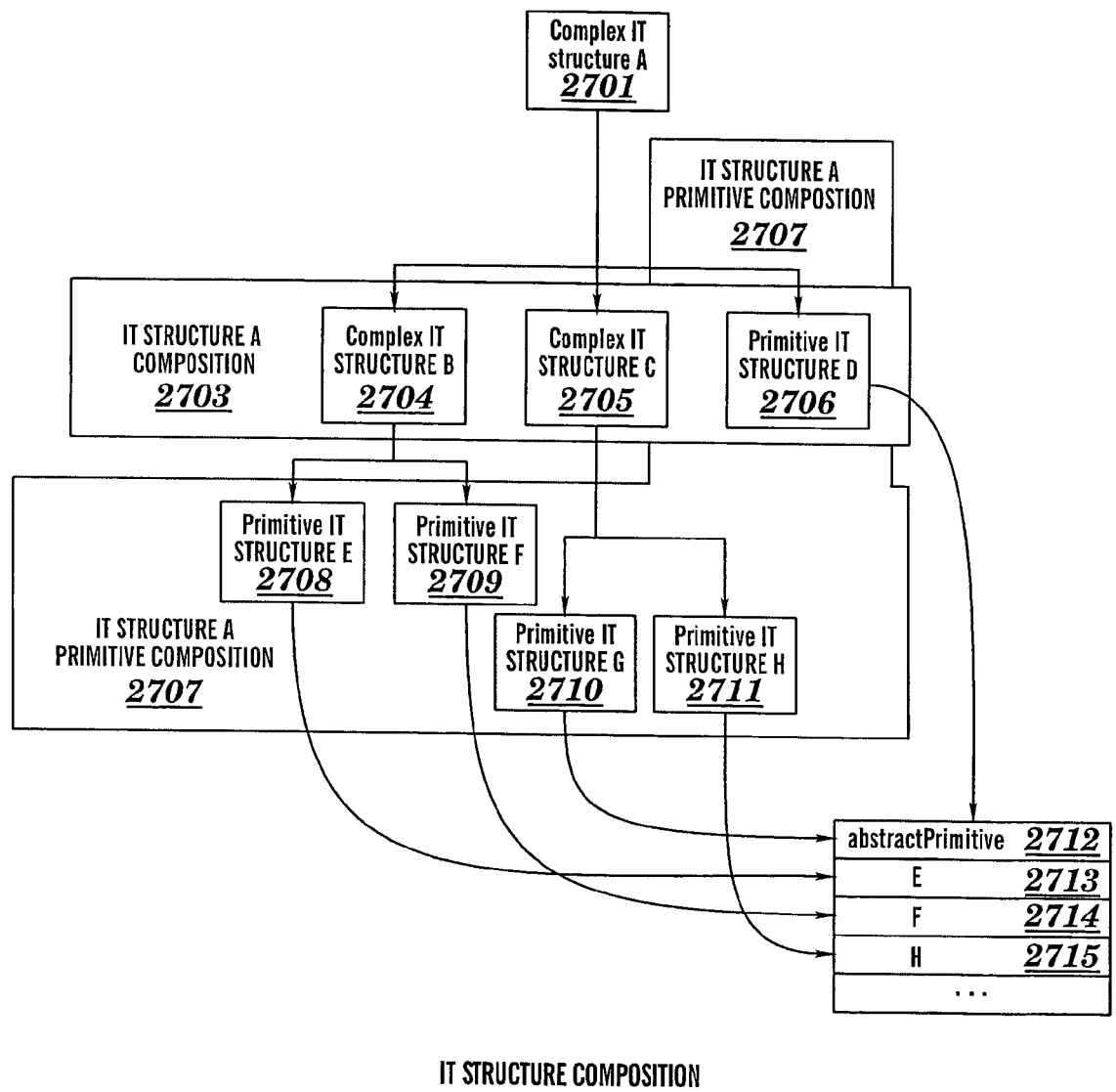
FIG. 8 is a diagram illustrating the concept of IT structure composition, in accordance with embodiments of the present invention.

FIG. 8 is a diagram illustrating the concept of IT structure composition, in accordance with embodiments of the present invention. A complex IT structure A 2701 includes in its composition 2703 two other complex IT structures B 2704 and C 2705, and one abstract primitive IT structure D 2706. Complex IT structure B includes in its composition two primitive IT structures E 2708 and F 2709, and complex IT structure C includes in its composition two primitive IT structures, an abstract primitive IT structure G 2710, and a primitive IT structure H 2711. Both abstract primitive IT structures, D and H, represent the abstractPrimitive out-of-model entity 2712, while all other primitive IT structures represent respective non-abstract out-of-model entities 2713, 2714, 2715. The IT structure A primitive composition 2707 includes all primitive IT structures shown (and no complex IT structures), namely primitive IT structures E 2708, F 2709, G 2710, H 2711, and D 2706.

An abstract IT structure is an IT structure whose composition includes at least one abstract IT entity. Examples of an abstract IT structure include:

1) An abstract IT structure may include an Intel computer with a single 400 MHz Pentium processor, 1024 MB of main memory, 10 GB of DASD, and an Ethernet network interface; however, since no particular model of computer is specified, this IT structure would be abstract.

2) At a different (higher) level of abstraction, the same IT structure may include just a computer, without specification of its technology or characteristics.

A virtual IT structure is a non-abstract IT structure whose composition includes at least one virtual IT entity.

A real IT structure is a non-abstract and non-virtual IT structure.

From the above definitions, it follows that a real IT structure only includes real IT entities in its composition. From the above definitions, it also follows that in a real IT structure, each IT entity in its composition uniquely corresponds to a physical IT entity.

Table 2 infra provides examples of IT structure composition.

TABLE 2

Examples of IT structure composition

| IT structure | Networking | Computers | Software | Labor |
|---|---|---|---|---|
| Abstract IT structure with high degree of abstraction | network | computer | Ariba Buyer application | |

TABLE 2-continued

Examples of IT structure composition

| IT structure | Networking | Computers | Software | Labor |
|---|---|---|---|---|
| Abstract IT structure with low degree of abstraction | TCP/IP network | platform | Ariba Buyer Application v7 | |
| Virtual IT structure | connectivity requirements | platform and associated parameters (memory, processor power, DASD space) model | Ariba Buyer v7 for AIX on RS/6000 | installation and management |
| Delivery-bound IT structure | LAN segments with symbolic IP addresses | | Ariba Buyer v7.02 for AIX on RS/6000 | specific installation activities; specific management activities |
| Real IT structure | LAN segments with real IP addresses | computer s/n specified | Ariba Buyer v7.02 for AIX on RS/6000, license # <lic. #> | skill level and quantity of labor by activity specified |

An abstract IT structure with a high level of abstraction may be "an Ariba Buyer application running on a computer, connected to a network". The degree of abstraction can be lowered by restating the previous clause in more specific terms—"an Ariba Buyer application running on an RS/6000 computer, connected to a TCP/IP network".

The corresponding virtual IT structure may be "an Ariba Buyer version 7.0 for AIX on RS/6000 application, running on an AIX v5.0 operating system and RS/6000 model F50 computer with one 320 MHz CPU, 640 KB of main memory, and 128 GB of DASD in a single disk, connected through a 10 Gbps Ethernet LAN to a TCP/IP network—and—labor associated with installation and management of the above".

Once resolved into a delivery-bound IT structure, the previous IT structure may turn into something like "an Ariba Buyer version 7.0 path level 17.2 for AIX on RS/6000 application, running on an AIX v5.0 patch level 5.0.3.2 operating system and RS/6000 model F50-3745 computer with one 320 MHz CPU, 640 KB of main memory, 128 GB of DASD in a single disk, and a NIC (network interface card), connected through a 10 Gbps Ethernet LAN to a TCP/IP network on a single segment with a symbolic IP address of a.b.c.d and specific installation and management activities associated with the above.

Once deployed in a data center, the corresponding real IT structure would be "an Ariba Buyer version 7.0 path level 17.2 for AIX on RS/6000 application, license # 178215-04, running on an AIX v5.0 patch level 5.0.3.2 operating system, license #514ABC-AE, and RS/6000 model F50-3745 computer, s/n 6734-FWU, with one 320 MHz CPU, 640 KB of main memory, 128 GB of DASD in a single disk, and a NIC (network interface card), connected through a 10 Gbps Ethernet LAN to a TCP/IP network on a single segment with a symbolic IP address of a.b.c.d and specific installation and management activities associated with the above, including quantity of labor and level of skills for each.

A delivery-bound IT structure is a virtual IT structure ready for provisioning in a particular delivery environment (see below) with no additional input/sources of information. "In a particular delivery environment" means "at the level of detail required by the provisioning process of the delivery environment". For example, a delivery-bound IT structure may include a specification of 10/100 Mbps Ethernet card, without regard to the manufacturer of that card.

An operating IT structure instance is a collection of physical hardware, software, networking, and labor, resulting from deployment of a real IT structure.

2.2.1 ITStructure Class n IT Structure is represented by a class ITStructure, which inherits from ITEntity class and has the following methods:

1) ITStructure(String name, String function, Vector functions, Vector operationalCharacteristics[, Boolean external])—constructor; the external parameter is optional, and indicates that the ITStructure represents an external entity.

Note: Type is not specified for an ITStructure class—it is always derived based on ITStructure composition using the type definition as a rule.

2) Vector getFunctions( )—returns a list of functions (String) supported by ITStructure (always non-null)

3) Vector setFunctions(Vector V)—adjusts IT structure for support of one or more functions whose names were previously returned by getFunction( ) method; the list V is a list of pairs (<function>,<value>), where <function> is one of the list returned by getFunction( ) method and <value> is the associated setting. The method returns an empty Vector if the method execution was successful, and a list of error messages otherwise. If an error occurs, the method has not altered the IT structure.

4) Vector getOperationalCharacteristics( )—returns a list of pairs of names (String) and values (String) of operational characteristics of this IT structure 5) Vector setOperationalCharacteristics(Vector V)—adjusts IT structure operational characteristics as specified by the input parameters. The input parameter is a list of pairs of (operational characteristic name (String), characteristic value), where operational characteristic name is one of the values returned by the getOperaitonalCharacteristics( ) method, and characteristic value is specific to the operational characteristic being modified. The list V corresponds to all of or a subset of the list returned by getOperationalCharacteristics( ) method. The method returns an empty Vector if the method execution was successful, and a list of error messages otherwise. If an error occurs, the method has not altered the IT structure.

6) Vector getResolutionValues( )—returns a list of pairs of names (String) and values (String) of abstraction resolution parameters of this IT structure 7) JavaClass resolve(Vector V), where V is Vector of pairs (String resolution_parameter, value)—returns a less abstract ITStructure instance, instantiated with the specified resolution parameters if execution was successful; returns a Vector of error messages if no resolution was possible (in which case the IT structure is left unmodified)

8) boolean isPrimitive( )—returns true if this IT structure is primitive 9) boolean isComplex( )—returns true if this IT structure is complex 10) Vector getComposition([String C1 [, C2 ... [, Cn]]])—for a complex IT structure, returns list of other IT structures comprising this IT structure; for a primitive IT structure, returns the list including the IT structure itself The optional list of parameters C1 ... Cn specify names of ITStructure subclasses to be returned by the getComposition( ) method. If C1 ... Cn are specified, only IT structures of subclasses with names C1 ... Cn will be returned by the getComposition( ) method.

11) Vector getPrimitiveComposition([String C1 [, C2 ... [, Cn]]])—returns primitive composition of an IT; returns the IT structure itself if invoked for a primitive IT structure. The optional list of parameters C1 ... Cn specify names of ITStructure subclasses to be returned by the getPrimitiveComposition( ) method. If C1 ... Cn are specified, only IT structures of subclasses with names C1 ... Cn will be returned by the getPrimitiveComposition( ) method.

12) Vector getInterfaces([String I1 [, I2 ... [, In]]])—returns the list of IT interfaces this IT structure possesses. The optional list of parameters I1 ... In specify names of ITInterface subclasses to be returned by the getInterfaces( ) method. If I1 ... In are specified, only IT interfaces of subclasses with names I1 ... In will be returned by the getInterfaces( ) method.

13) Vector getRelationships([String R1 [, R2 ... [, Rn]]])—returns a list of IT relationships elements of this IT structure's composition are involved in; returns an empty Vector if no IT relationships exist among elements of this IT structure's composition. The optional list of parameters R1 ... Rn specify names of ITRelationship subclasses to be returned by the getRelationships( ) method. If R1 ... Rn are specified, only IT relationships of subclasses with names R1 ... Rn will be returned by the getRelationships( ) method.

14) Vector getPrimitiveRelationships([String R1 [, R2 ... [, Rn]]])—returns a list of IT relationships elements of this IT structure's primitive composition are involved in; returns an empty Vector if no IT relationships exist among elements of primitive composition of this IT structure. The optional list of parameters R1 ... Rn specify names of ITRelationship subclasses to be returned by the getPrimitiveRelationships( ) method. If R1 ... Rn are specified, only IT relationships of subclasses with names R1 ... Rn will be returned by the getPrimitiveRelationships( ) method.

15) ITRelationship getRelationship(ITStructure A, ITStructure B)—returns the ITRelationship instance for relationship of IT structures A and B within the composition of this IT structure or null if IT structures A and B are not involved in an IT relationship 16) Vector setRelationship(ITStructure x, ITInterface xi, ITStructure y, ITInterface yi, Relationship r)—establishes the relationship r between IT structures x and y within the composition of this IT structure. Returns a null Vector if relationship was established successfully, and a Vector of error messages if relationship could not be established.

17) Vector setDependency({<add>|<remove>}, ITDependency x)—adds or removes the specified IT dependency to or from this IT structure. Returns a null Vector if dependency was added or removed successfully, and a Vector of error messages if dependency could not be added. Removal of an IT dependency is always successful. Addition of an IT dependency may fail if x contradicts an existing dependency—e.g., x indicates mutual exclusivity with IT structure Y and a dependency on presence of Y is already stated.

18) Vector getDependencies([String D1 [, D2 ... [, Dn]]])—returns a list of IT dependencies of this IT structure. The optional list of parameters D1 ... Dn specify names of ITDependency subclasses to be returned by the getDependencies( ) method. If D1 ... Dn are specified, only IT dependencies of subclasses with names D1 ... Dn will be returned by the getDependencies( ) method.

18a) Vector getPrimitiveDependencies([String D1 [, D2 ... [, Dn]]])—returns a list of IT dependencies among the elements of the IT structure primitive composition. The optional list of parameters D1 ... Dn specify names of ITDependency subclasses to be returned by the getPrimitiveDependencies( ) method. If D1 ... Dn are specified, only IT dependencies of subclasses with names D1 ... Dn will be returned by the getPrimitiveDependencies( ) method.

19) Vector addElement(ITStructure A)—adds IT structure A to the composition of this IT structure. Returns a null Vector if addition was successful, and a Vector of error messages if addition failed. In order to ensure uniqueness of identifiers (computer names, network addresses) within IT structures, each identifier within IT structure A being added is prefixed with string A.getName( )+".". As a part of the addition process, addElement( ) method verifies that:

a. addition of IT structure A to the composition of this IT structure does not violate any IT dependencies for any IT structure already included in the composition of this IT structure b. addition of IT structure A to the composition of this IT structure does not violate any IT dependencies for IT structure A and ensures that IT dependencies of the IT structure being added are satisfied. Each added IT structure composition element's name is prefixed with the IT structure name to ensure uniqueness.

20) Vector ensureDependencies(ITStructure A)—ensures that IT dependencies of the class requiresPresenceOf of ITStructure A in the composition of this IT structure are satisfied. If processing is unsuccessful, a Vector of error message(s) is returned, otherwise, a null Vector is returned.

21) Vector deleteElement(ITStructure A [, <force>])—removes IT structure A from the composition of this IT structure. Returns a null Vector if removal was successful, and a Vector of error messages if removal failed. <force> indicates that A should be removed regardless of relationships with or dependencies on it by other elements of this IT structure's composition.

22) Vector setOptimizationFunctions(Vector F)—specifies a prioritized list (starting with the highest priority and ending with the lowest) of optimization classes (see Optimization) to be applied to this IT structure. Returns a null Vector if processing is successful, and a Vector of error messages otherwise.

23) Vector getOptimizationFunctions( )—returns the prioritized list of optimization classes to be applied to this IT structure.

24) Vector optimize( )—performs optimization of the IT structure using the specified prioritized list of optimization classes and applying each optimization function to the IT structure in turn, starting with the highest and ending with the lowest priority of optimization classes. Returns a Vector, containing the optimized IT structure as its first element if optimization was successful, and a list of error messages otherwise.

25) Vector setTargetITDeliveryEnvironments(Vector D)—specifies a list of target IT delivery environments (see below) for this IT structure. Returns a list of error messages if an error occurs (e.g., invalid specification of a target IT delivery environment), and a null Vector otherwise.

26) Vector getTargetITDeliveryEnvironments( )—returns the list of target IT delivery environments for this IT structure.

27) getID( )—returns a real IT structure's unique identifier; returns null if invoked for a non-real IT structure.

28) setID( )—sets real IT structure unique identifier; NOOP for a non-real IT structure.

29) Vector SLmaintenance(Vector V)—optional, supported for Autonomic IT System Improvement Cycle (see below); obtains a list of pairs of operational characteristics and associated values provided by monitoring facilities, and performs adjustment of the operational characteristics to sustain the SL. Returns a null Vector if processing is successful and a list of error messages if processing is unsuccessful.

30) Boolean isExternal( )—returns true if this IT structure is an external entity, and false otherwise. An external IT structure may be defined for completeness, and represents an IT structure outside the normal operational boundaries, yet which can engage in IT relationships. External IT structures are excluded from the sets of entities returned by getComposition( ) or getPrimitiveComposition( ) methods of the ITStructure class, yet IT relationships can be established to them and will be included in the sets of entities returned by getRelationships( ) or getPrimitiveRelationships( ) methods of the ITStructure class. E.g., for an IT structure defining a server and network configuration for a Web service, a client (or a set of clients) connecting to the Web service through Internet may be defined as an external IT structure. External IT structures are exempt from error verification or optimization, and are ignored when an IT structure comparison is performed, or when a reverse-specification of an IT structure is performed. External IT structures are presumed to be outside of an IT delivery environment, and will not result in generation of real IT entities as a part of the translation or delivery binding processes.

2.2.2 Detailed Description of Non-Trivial Methods 2.2.2.1 Set Functions

A composition of an IT structure instance and relationships among elements of its composition may depend on particular function(s) this IT structure instance is intended to perform. The purpose of this method is to perform the necessary adjustments within IT structure instance that tailor IT structure composition and relationships among composition's elements as appropriate. This method also performs enforcement of function-specific rules.

The setFunctions( ) method is subclass-specific. Class ITStructure includes a placeholder that does nothing other than store the specified business function. ITStructure examples include:

1) IT structure X has three functions—A, B, C. However, these functions cannot be fulfilled indiscriminately (by their nature)—either A, or B and/or C, but not A and B, A and C, or A, B, and C can be supported by any instance of IT structure X. The setFunctions( ) method, when invoked, would ensure proper combination of functions requested from the instance of X, and prohibit improper modifications in the future.

2) Composition of instance of X may depend on the functions it performs. To perform function A, X may need to include an Intel server running Windows OS, an Oracle DB and a specific program package supporting function A. To perform functions B or C, X may need to include an RS/6000 server (whose power depends on whether only one of functions B and C, or both of these functions are supported), with a DB2 DB and specific program packages supporting functions B or C. So, the composition of X will be altered by the setFunctions( ) method appropriately, based on specification of functions.

2.2.2.2 Set Operational Characteristics

A composition of an IT structure instance and relationships among elements of its composition, given a particular set of functions supported by the IT structure instance, may depend on operational characteristics associated with support of particular functions. The purpose of this method is to perform the necessary adjustments within IT structure instance that tailor IT structure composition and relationships among composition's elements as appropriate. This method also performs enforcement of operational-characteristic-specific rules.

The setOperationalCharacteristics( ) method is subclass-specific. Class ITStructure includes a placeholder that does nothing other than store the specified operational characteristic values.

EXAMPLES

1) IT structure X function A potentially supports up to 500 users. Its response time depends on the power and amount of memory of the processor that runs function A and an increment in the number of supported users can be translated into a processor power and memory increments. An instance of X is created, whose requirement is to support up to 200 users. setOperationalCharacteristics(new Vector("users", 200)) can be used to specify that number and adjust the configuration of the Intel server supporting function A in the composition of instance of X to ensure it supports the required number of users.

2) Availability of IT structure X instance supporting function A may be 80% or 99.8%, depending on configuration of processors and software supporting function A. If a single set of hardware and software elements support function A, availability is 80%; if supporting hardware and software are duplicated and appropriate monitoring software is added to permit takeover between the two sets of hardware and software, availability is 99.8%. setOperationalCharacteristics(new Vector("availability", "high")) can be used to indicate that instance of X when supporting function A must provide 99.8% availability.

3) The above operational characteristics settings may be combined: setOperationalCharacteristics(new Vector(("users", 200), ("availability", "high")))

2.2.2.3 Resolve

A composition of an IT structure instance and relationships among elements of its composition, given a particular set of functions supported by the IT structure instance and given a particular set of operational characteristics associated with support of the particular set of functions, may depend on additional factors. A purpose of this method is to perform the necessary adjustments within IT structure instance that tailor IT structure composition and relationships among composition's elements as appropriate.

The resolve( ) method is subclass-specific. Class ITStructure includes a placeholder that does nothing other than store the specified resolution values.

Example: Two hardware and operating systems platforms exist that provide equivalent (both in terms of scale and cost) performance, permitting an instance of IT structure X to support the required number of users with equivalent operational characteristics for its function A. For example, the choice of either of the two hardware and operating system platforms for the composition of an instance of IT structure X providing function A will produce an equivalent result. Further, the delivery environment in which the instance of X will operate, support both combinations of hardware and operating system with equivalent costs and service levels. The resolve( ) method may be used to specify which of the two combinations of hardware and operating system platforms to use based on other factors. For example, IT developer's preference or similarity with hardware and operating system platforms of other IT structures involved in a solution.

Assume the two combinations of hardware and operating system platforms are (a) AIX on RS/6000 and (b) Linux on Intel. So, IT structure X may provide a resolution characteristic "platform preference" which may be specified as "AIX" or "Linux", resulting in the choice of (a) or (b) for the instance of IT structure X.

2.2.2.4 Set Relationship

Once an IT structure is added to the composition of the IT structure being developed, the developer may specify IT relationships between the added IT structure and other elements of the composition or primitive composition of the IT structure being developed.

Figure 2:
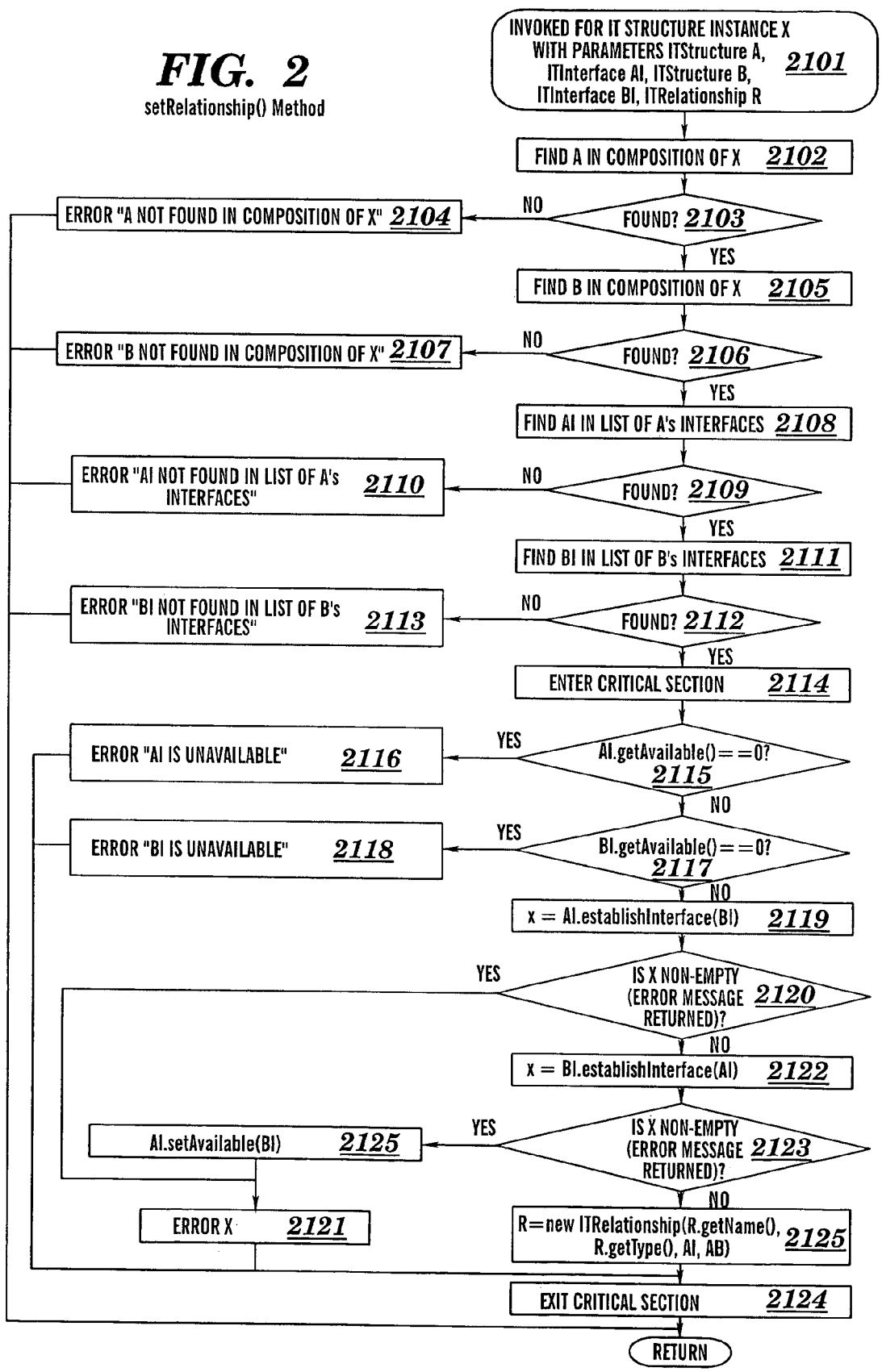
FIG. 2 is a flow chart depicting the logic of setRelationship( ) method, in accordance with embodiments of the present invention.

FIG. 2 is a flow chart depicting the logic of setRelationship( ) method, in accordance with embodiments of the present invention. The Vector setRelationship(ITStructure x, ITInterface xi, ITStructure y, ITInterface yi, Relationship r) establishes the relationship r between IT structures x and y within the composition of this IT structure. The setRelationship( ) method returns a null Vector if relationship was established successfully, and a Vector of error messages if relationship could not be established. The setRelationship( ) method for ITStructure instance X is invoked with parameters ITStructure A, ITInterface AI, ITStructure B, ITInterface BI, ITRelationship R 2101. The method attempts to find IT structure A in the composition of X 2102. If IT structure A is not found in the composition of X 2103, an error message is returned 2104 and processing terminates. The method then attempts to find IT structure B in the composition of X 2105. If IT structure B is not found in the composition of X 2106, an error message is returned 2107 and processing terminates. The method then proceeds to finding IT interface AI in the list of IT interfaces of IT structure instance A 2108. If AI is not found 2109, an error message is returned 2110 and processing terminates. The method then attempts to find IT interface BI in the list of IT interfaces of IT structure instance B 2111. If BI is not found 2112, an error message is returned 2113 and processing terminates.

Upon ascertaining presence of both specified IT structure instances A and B and IT interfaces AI and BI within A and B, the method execution enters a critical section 2114 which is used to serialize updates to the IT interface states. A critical section is a portion of the method which cannot be executed concurrently in a multi-threaded fashion, and entry to which must be serialized. No particular method of serialization for critical sections of programs is prescribed by this embodiment—known methods include (but are not limited to) semaphores, process queues, process locks, TS (Test and Set) instruction, CS (Compare and Swap) instruction.

The method then checks availability of IT interface AI by invoking the getAvailable( ) method of IT interface AI; if AI is unavailable 2115, an error message is returned 2116, previously entered critical section is exited 2124, and processing terminates. The method proceeds to checking availability of IT interface BI by invoking the getAvailable( ) method of IT interface BI; if BI is unavailable 2117, an error message is returned 2118, previously entered critical section is exited 2124, and processing terminates.

Upon ascertaining availability of both AI and BI interfaces, the method attempts to relate IT interfaces AI and BI. Vector x is allocated (not shown in the figure) to contain error message strings from attempts to establish the interface between AI and BI. The method attempts to update IT interface AI as interfacing with IT interface BI by invoking AI method establishInterface(BI), passing it BI as the parameter 2119. If an error occurs during the establishInterface(BI) method of AI invocation 2120, Vector x contains error messages, which are returned to the invoker of setRelationship( ) method of IT structure instance X 2121 upon exiting the critical section 2124. The method then attempts to update IT interface BI as interfacing with IT interface AI by invoking BI method establishInterface(AI), passing it AI as the parameter 2122. If an error occurs during the establishInterface(BI) method of AI invocation 2123, Vector x contains error messages, which are returned to the invoker of setRelationship( ) method of IT structure instance X 2121 upon exiting the critical section 2124, but only after the error cleanup is performed and the previously established update of IT interface AI is reversed by invoking its method setAvailable(BI) 2125.

If interface establishment was successful, IT relationship R is updated to contain the interface AI and BI 2125 prior to completion of method execution.

2.2.2.5 Add Element

FIG. 3 is a flow chart depicting the logic of addElement( ) method, in accordance with embodiments of the present invention. The Vector addElement(ITStructure A) method adds IT structure A to the composition of IT structure X. The IT structures A and X may each independently be an abstract IT structure, a virtual IT structure, or a real IT structure. However, the resulting IT structure will have the highest degree of abstraction of that of X and A. For example, if X is abstract the result will be abstract even if A is not abstract, and if A is abstract the result will be abstract even if X is not abstract. As another example, if either X or A is virtual, and both X and A are not abstract, the result will be virtual.

The addElement( ) method returns a null Vector if addition was successful, and a Vector of error messages if addition failed. The addElement( ) method of ITStructure instance X is invoked with parameter ITStructure A, referencing the ITStructure instance to be added to X's composition 2201. The method retrieves composition of X as a Vector C 2202. If C is null (there are no composition elements for X) 2203, this is the addition of the first element, and no additional checks are necessary. The method creates a composition Vector C for X 2204, adds ITStructure A to C 2205, and returns.

If ITStructure X is a primitive IT structure (X.isPrimitive( )=true) 2243, an error message is stored 2244 and processing terminates.

If ITStructure X already has non-empty composition 2203, the method iterates through X's composition elements making sure no IT dependencies of either X or A are violated by the addition of A to X. While there are elements in C 2206, the next unprocessed element E of C is obtained 2207, and its list of IT dependencies De is extracted using the getDependencies( ) method of E 2208.

While there are unprocessed elements in De (list of IT dependencies of ITStructure E) 2209, the following is performed. A critical section is entered 2210. The next element d of De is obtained 2211. If d (which belongs to the class ITDependency) indicates exclusion with class Y and IT structure A belongs to class Y or its subclass 2212, an error message is stored 2213, and upon exiting from the critical section 2214, processing terminates. Otherwise, critical section is exited 2215.

The method execution then proceeds to obtaining the list Da of IT dependencies of A using the getDependencies( ) method of A 2216. While there are unprocessed elements in Da (list of IT dependencies of ITStructure A) 2217, the following is performed. A critical section is entered 2218. The next element d of Da is obtained 2219. If d (which belongs to the class ITDependency) indicates exclusion with class Z and IT structure E belongs to class Z or its subclass 2220, an error message is stored 2213, and upon exiting from the critical section 2214, processing terminates. Otherwise, critical section is exited 2222.

When all possible combinations of potential dependencies of IT structure A and all elements of the composition of X are exhausted, and no violation has been found, the addElement( ) method invokes method ensureDependencies(A) 2245 to ensure that any of A's IT dependencies of the class requiresPresenceOf are satisfied. If ensureDependencies( ) method's processing was not successful 2246, any error messages returned by the ensureDependencies( ) method's invocation are returned, otherwise, A is added to the composition A is added to the composition C of IT structure X 2205.

Figure 7:
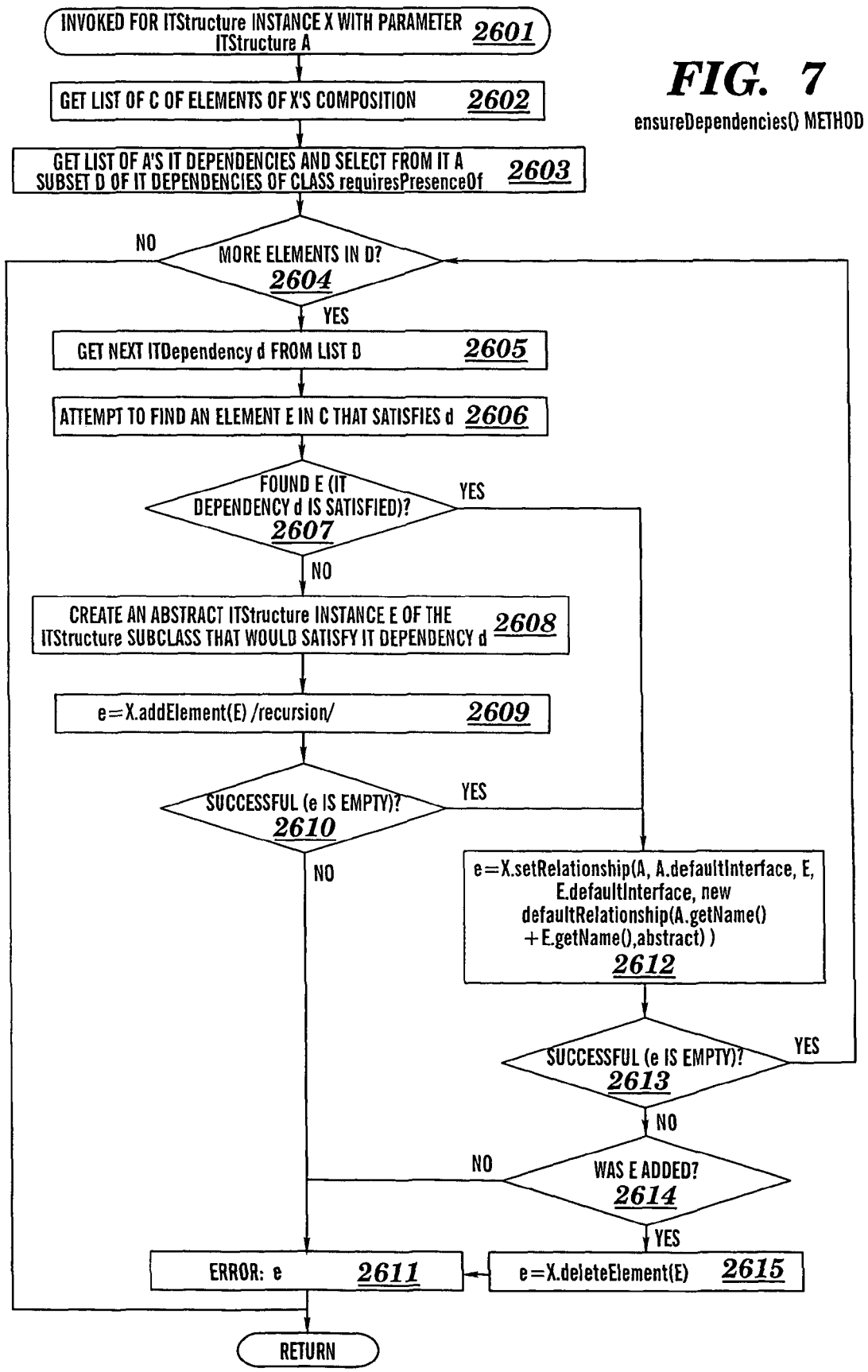
FIG. 7 is a flow chart depicting the logic of ensureDependencies( ) method, in accordance with embodiments of the present invention.

2.2.2.6 Ensure Dependencies z FIG. 7 is a flow chart depicting the logic of ensureDependencies( ) method, in accordance with embodiments of the present invention. The ensureDependencies(ITStructure A) method ensures that IT dependencies of the class requiresPresenceOf of ITStructure A in the composition of this IT structure are satisfied. If processing is unsuccessful, a Vector of error message(s) is returned, otherwise, a null Vector is returned. The ensureDependencies( ) method is invoked for IT structure instance X with parameter ITStructure A 2601. The method retrieves composition of X as Vector C 2602 and the list of A's IT dependencies, from which it selects a subset (list D) of IT dependencies of class requiresPresenceOf 2603. The method then iterates through list D of IT dependencies of class requiresPresenceOf of IT structure A, until the end of the list is reached 2604. Each element d of list D is an IT dependency d of class requiresPresenceOf. The method retrieves the next element d from the list 2605 and attempts to find an element of C (IT structure X composition) that satisfies the IT dependency d 2606. If an element E of C satisfying IT dependency d is found 2607, IT dependency d is considered to be satisfied.

ensureDependencies( ) method then creates an abstract IT structure E of ITStructure subclass that satisfies IT dependency d 2608 and attempts to add E to the composition of IT structure X using a recursive invocation of X.addElement(E) 2609. If execution of X.addElement(E) failed (i.e., E could not be added to X's composition—e.g., because it is exclusive with some element of X's composition) 2610, any error messages returned by X.addElement(E) are returned 2611 and processing terminates. Otherwise, addition of E to X's composition was successful, IT dependency d is now considered to be satisfied.

An abstract IT relationship (defaultRelationship) between E (either found in the composition C of IT structure X, or newly created) and A using defaultInterface of both is created and added to IT structure X) 2612. If establishment of the IT relationship was unsuccessful 2613, error message(s) are returned to the invoker 2611. If E was newly added 2614, it is removed 2615 to maintain the composition of IT structure X unchanged.

If establishment of the new IT relationship was successful 2613, the next element d of A's dependencies is considered.

2.2.2.7 Delete Element

Figure 4:
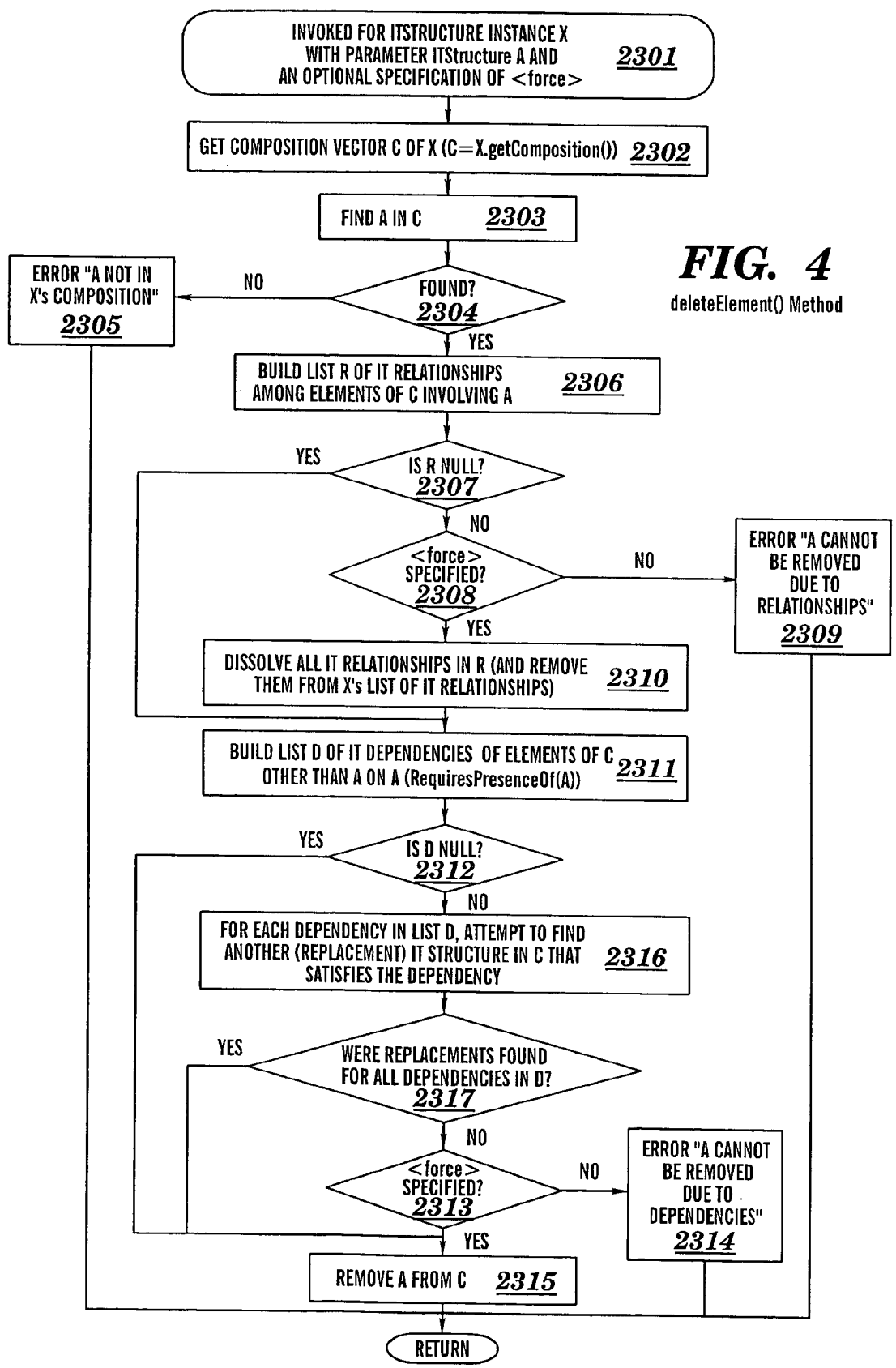
FIG. 4 is a flow chart depicting the logic of deleteElement( ) method, in accordance with embodiments of the present invention.

FIG. 4 is a flow chart depicting the logic of deleteElement( ) method, in accordance with embodiments of the present invention. The deleteElement(ITStructure A [, <force>]) method removes IT structure A from the composition of this IT structure. Returns a null Vector if removal was successful, and a Vector of error messages if removal failed. <force> indicates that A should be removed regardless of relationships with or dependencies on it by other elements of this IT structure's composition. In a first embodiment the <force> option is available for being selected, and in a second embodiment the <force> option is not available for being selected. Thus, the <force> option may not be specified because: (1) the <force> option is not available for being selected or (2) the <force> option is available for being selected but was not selected. The deleteElement( ) method is invoked for IT structure instance X with parameter ITStructure A and an optional specification of <force> 2301. The method retrieves composition of X as Vector C 2302 and attempts to find IT structure A in C 2303. If A is not found in C 2304, an error message is stored 2305 and processing terminates. Otherwise, the method proceeds through the attempt to remove A from C.

The method builds the list R of IT relationships of elements of C that involve A 2306. If R is not null (i.e., A is involved in IT relationships with at least one other element of composition of X) 2307, the method checks whether the <force> option was specified 2308, and if not, A cannot be removed from the composition of X, an error message is stored 2309, and processing terminates. If, however, <force> was specified, the method removes all IT relationships in the list R and removes them from the list of IT relationships of elements of C 2310.

The method then proceeds to check IT dependencies involving A. The method builds a list D of all dependencies of elements of C other than A itself on A 2311. If the list D is not null 2312, for each dependency in list D, the method attempts to find an element in C other than A that would satisfy the dependency 2316. If replacements were not found for any dependencies in list D 2317, the method checks whether the <force> option was specified 2313, and if not, A cannot be removed from the composition of X, an error message is stored 2314, and processing terminates.

Otherwise, if all previous checks indicate that removal of A will not damage IT structure X, or if the <force> option specification overrides the possible damage, the method removes A from C 2315.

2.3 IT Interfaces

An IT Interface is a characteristic of an IT structure, specifying a type of relationship this IT structure can engage in relative to other IT structures.

An abstract IT interface instance is an IT interface instance involving at least one abstract IT structure.

A virtual IT interface instance is a non-abstract IT interface instance involving at least one virtual IT structure.

A real IT interface instance is an IT interface instance involving only real IT structures.

A multi-connection IT interface is an IT interface to which multiple IT structures can relate (connect). For example, multiple invokers can call a single program—sometimes, concurrently.

A single-connection IT interface is an IT interface to which a single IT structure can relate (connect). For example, only a single cable can be plugged into a single printer port of a personal computer.

An available IT interface is an IT interface to which one or more IT structures can relate (connect).

A busy or Unavailable IT interface is an IT interface which has exhausted its ability to relate, and cannot be involved in any additional relationships (i.e., the maximum number of relationships have already been established). For example, a printer port of a personal computer is available if nothing is connected to it, and busy/unavailable if a printer cable is plugged into it.

2.3.1 ITInterface Class

An ITInterface class inherits from ITEntity class and has the following methods:

1) ITInterface(String name, Type type)—constructor, creates an ITInterface instance with specified name and type 2) boolean isSingleConnection( )—returns true if this ITInterface is a single-connection IT interface, and false otherwise 3) boolean isAvailable([int p])—returns true if ITInterface is available, false otherwise; optional parameter p indicates the specific connection for a multi-connection interface 4) setAvailable([ITInterface i])—makes ITInterface available; an ITInterface parameter i may be specified for multi-connection IT interfaces to indicate which of the multiple connections is to be made available 5) Vector establishInterface(ITInterface i [, int p])—establishes an interface with the parameter IT interface; returns an empty Vector if interface was established successfully, and a list of error messages otherwise. For a multiple-connection IT interface, may be optionally provided with the second parameter p specifying the connection.

6) int getAvailable( )—for multi-connection IT interfaces returns the number of available connections; always returns zero (unavailable) or one (available) for single-connection IT interfaces; always returns "high integer" for multi-connection IT interfaces with unlimited number of connections 7) int getRelated( )—returns the number of ITInterface instances related to this ITInterface 8) Vector getRelatedITInterfaces( )—returns a list of zero or more ITInterface instances related to this ITInterface 9) Vector verifyValidity(ITInterface Y)—returns null Vector if a connection between this IT interface instance and IT interface instance Y would be valid—i.e., the ITInterface subclass of this instance correlates with the ITInterface subclass of ITInterface instance Y; returns a Vector containing error message(s) if subclasses of X and Y do not correlate.

Note that the verifyValidity( ) method is a NOOP in the ITInterface class—each subclass of ITInterface, with the exception of DefaultInterface, overrides this method with the appropriate logic. Also note that an ITInterface cannot be instantiated—only ITInterface subclasses have practical uses.

2.3.2 ITInterface Subclasses

A number of different interfaces may exist among IT structures. Each IT structure, by definition, includes the DefaultInterface, which is used to establish relationships not involving real interfaces, such as "requires presence of . . . to install". DefaultInterface supports any relationships.

Other ITInterface subclasses are ("correlates" in this context means "can only be related to"):

InstalledOn(<single>)—IT structure is installed using this interface (correlates with Supports)

Supports({<single>|<multiple>})—IT structure(s) can be installed on this interface (correlates with InstallsOn)

ConnectsTo(<connection type>,{<single>|<multiple>})—can connect to IT structure(s) using <connection type>, correlates with ConnectsTo where:

<connection type>::={<direct>|<network>|<messaging>|<other>}

X ConnectsTo(<connection type>,{<single>|<multiple>}, Integer IPaddress, Integer NetMask, String transport [,Vector ports])—an additional constructor signature for ConnectsTo, where IPaddress is the IP address associated with this interface, NetMask is the associated netmask, transport is an identifier of the type of transport ("TCP" or "UDP"), and ports is a list of IP ports to be used (if not specified, dynamic port assignment is assumed).

Invokes(<invocation type>,<single>)—can invoke IT structure using <invocation type>, correlates with Invokable Invocable(<invocation type>,{<single>|<multiple>})—can be invoked by IT structure(s) using <invocation type>, correlates with Invokes where:

<invocation type>::={<direct>|<interrupt>|<other>}

Manages({<single>|<multiple>})—is managing IT structure(s), correlates with Manageable Manageable(<single>)—is managed by IT structure, correlates with Manages X Balances(<multiple>)—is balancing load for IT structures, correlates with BalancedBy X BalancedBy(<single>)—is balanced by a load balancer, correlates with Balances Table 3 shows valid ITInterface subclass correlations, wherein "yes" denotes a pair of correlated IT interfaces.

TABLE 3

Interface correlations

| | Default Interface | Installed On | Supports | Connects To | Invokes | Invocable | Manages | Manageable | Balances | Balanced By |
|---|---|---|---|---|---|---|---|---|---|---|
| Default Interface | yes | yes | yes | yes | yes | yes | yes | yes | yes | yes |
| InstalledOn | yes | | yes | | | | | | | |
| Supports | yes | yes | | | | | | | | |
| ConnectsTo | yes | | | yes | | | | | | |
| Invokes | yes | | | | | yes | | | | |
| Invocable | yes | | | | yes | | | | | |
| Manages | yes | | | | | | | yes | | |
| Manageable | yes | | | | | | yes | | | |
| Balances | yes | | | | | | | | | yes |
| BalancedBy | yes | | | | | | | | yes | |

The IT interface subclasses are summarized as follows in terms of IT1, IT2, IF1, and IF2:
IT 1: IT structure 1
IT2: IT structure 2
IF1: interface of IT structure 1
IF2: interface of IT structure 2
1) Installed On: a characteristic of IF1 permitting IT1 to be installed on IT2
2) Supports: a characteristic of IF2 permitting IT1 to be installed on IT2
3) ConnectsTo: a characteristic of IF1 permitting IT1 to connect to IT2
4) Invokes: a characteristic of IF1 permitting IT1 to invoke IT2
5) Invocable: a characteristic of IF2 permitting IT2 to be invoked by IT1
6) Manages: a characteristic of IF1 permitting IT1 to manage IT2
7) Manageable: a characteristic of IF2 permitting IT2 to be managed by IT1
8) Balances: a characteristic of IF1 permitting IT1 to balance load for IT2
9) BalancedBy: a characteristic of IF2 permitting IT2 to be balanced by IT1

Examples of IT interfaces are as follows:
A program is installed on a computer
A computer supports one or more programs to be installed on the computer
Computer A connects to computer B through a network
Program A invokes program B
Program B is invocable by program A
Program A manages system B
  System B is manageable by program A In this embodiment, labor entities are associated with other entities by means of defaultInterface and defaultITRelationship. In another embodiment, a special ITInterface, laborInterface, may be defined, and used to comprise a laborRelationship to relate a labor entity to another entity.

2.3.3 Detailed Description of Non-Trivial Methods

2.3.3.1 Set Available

Figure 5:
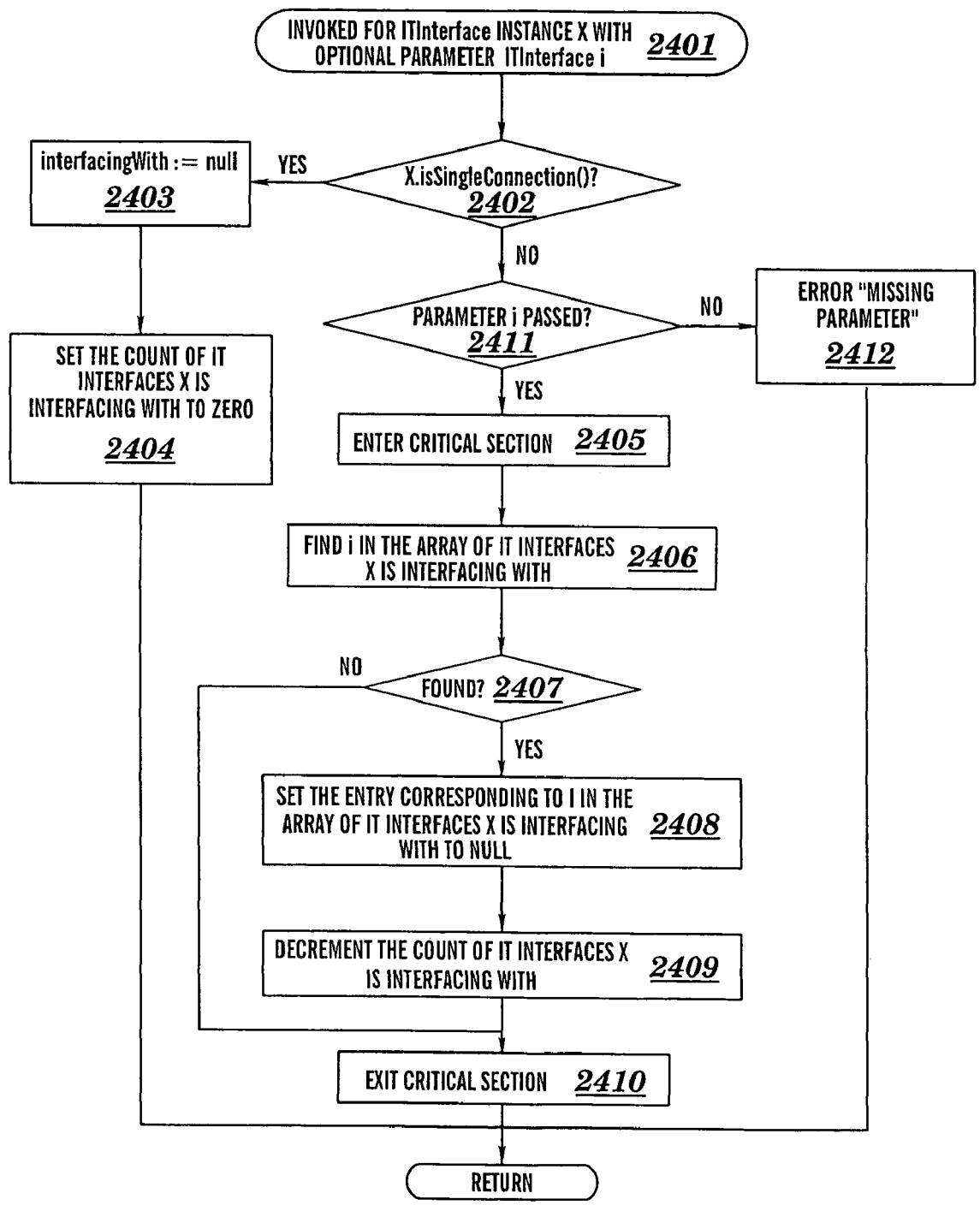
FIG. 5 is a flow chart, depicting the logic of setAvailable( ) method, in accordance with embodiments of the present invention.

FIG. 5 is a flow chart, depicting the logic of setAvailable() method, in accordance with embodiments of the present invention. The setAvailable([ITInterface i]) method makes ITInterface available; an ITInterface parameter i may be specified for multi-connection IT interfaces to indicate which of the multiple connections is to be made available. The setAvailable() method is invoked for ITInterface instance X with an optional parameter ITInterface i 2401. If IT interface instance X is a single-connection IT interface (X.isSingleConnection() returns true) 2402, the field interfacingWith in ITInterface X is set to null 2403, and the count of IT interfaces X is interfacing with is set to zero 2404. Note that it is the responsibility of the invoker to ensure that the corresponding IT interface that was interfacing with X (if any) also becomes available.

If ITInterface X is a multiple-connection IT interface 2402, processing ensures that a parameter i is passed, indicating which connection out of the multitude to make available. If parameter i is not passed 2411, and an error is signaled 2412, and processing terminates. The mechanism of signaling an error may vary, depending on implementation, and may include, but is not limited to, an error message, an exception, an ABEND, a log and/or a trace entry.

Upon ascertaining availability of parameter i 2311, processing enters a critical section 2405. ITInterface i passed as the parameter to method setAvaliable() is located in the array of IT interfaces ITInterface X is interfacing with 2406. If i is not found 2407, processing terminates after exiting a critical section 2410. If i is found 2407, the method sets the entry in the array of IT interfaces ITInterface X is interfacing with that corresponds to i to null 2408, decrements the count of IT interfaces X is interfacing with 2409, and exits the critical section 2410.

2.3.3.2 Establish Interface

Figure 6:
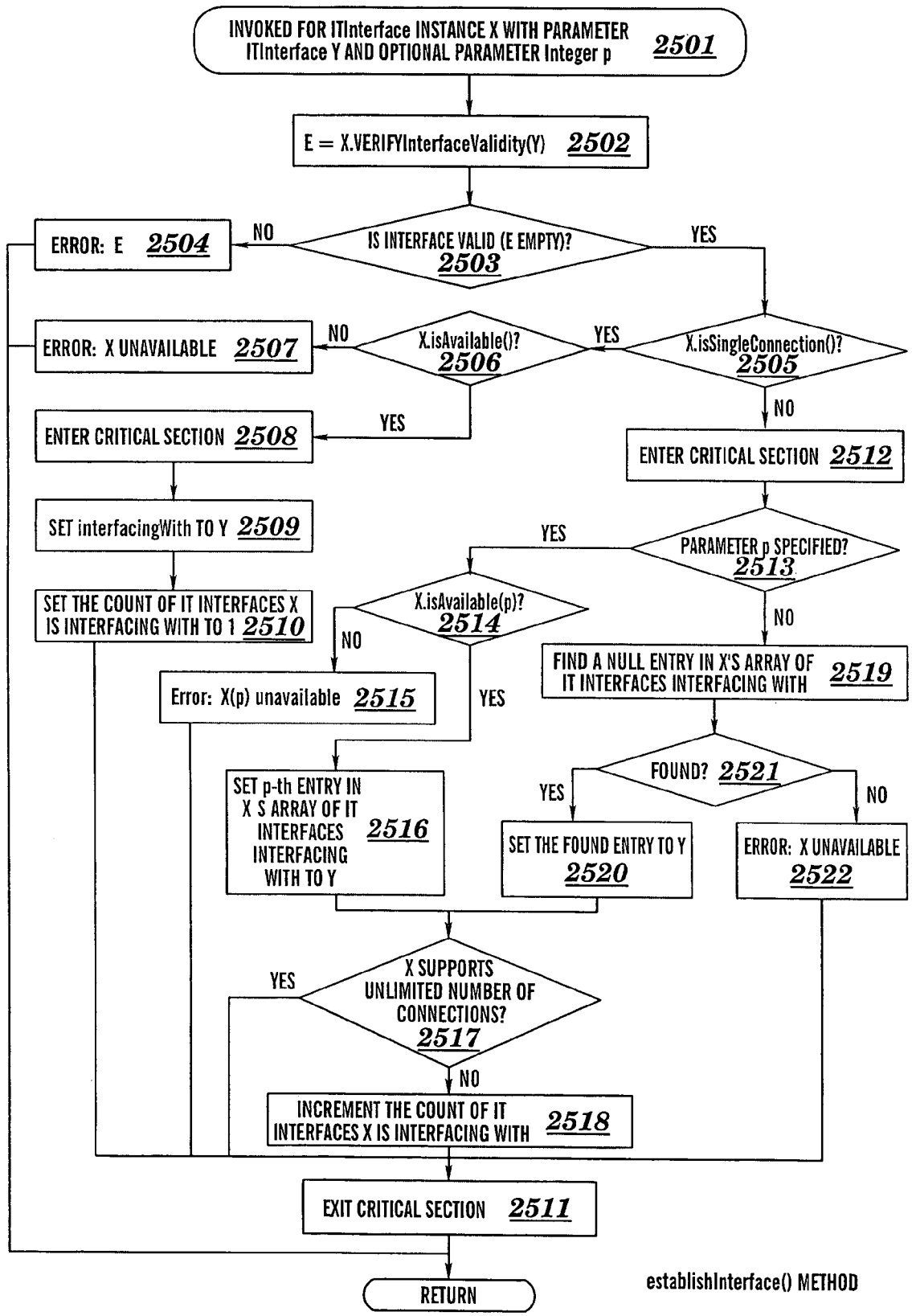
FIG. 6 is a flow chart depicting the logic of establishInterface( ) method, in accordance with embodiments of the present invention.

FIG. 6 is a flow chart depicting the logic of establishInterface() method, in accordance with embodiments of the present invention. The establishInterface(ITInterface i [, int p]) method establishes an interface with the parameter IT interface; returns an empty Vector if interface was established successfully, and a list of error messages otherwise. The establishInterface() method is invoked for ITInterface instance X with a parameter ITInterface Y and an optional parameter integer p 2501.

The method starts by verifying validity of establishment of connection between X and Y (by invoking method X.verifyValidity(Y)) 2502. If establishment of connection between X and Y is invalid (X.verifyValidity(Y) returns error message(s)) 2503, method establishInterface() returns the error message(s) returned by X.verifyValidity(Y) invocation 2504 and terminates processing.

If ITInterface X is a single-connection interface 2505, but X is available 2506, method establishInterface() returns and error message 2507 and terminates processing. Otherwise, if X is a single-connection interface 2505 and X is available 2506, a critical section is entered 2508 the interfacingWith reference of ITInterface X is set to Y 2509, the count of IT interfaces X is connected with is set to one 2510, the critical section is exited 2511, and processing completes successfully.

For a multiple-connection ITInterface X 2505, critical section is entered 2512. If the optional parameter p was specified on invocation of method establishInterface() 2513, but p-th entry of X's array of connections is not null (X.isAvailable (p)=false), indicating that the p-th connection of X is unavailable 2514, an error message is stored 2515, the critical section is exited 2511, and processing terminates. If, on the other hand, the p-th connection of X is available 2514, the p-th entry in X's array of connections is set to Y 2516.

If the optional parameter p was not specified on invocation of method establishInterface() 2513, an attempt is made to find an available (null) entry in X's array of connections 2519. If an available entry is found 2521, the found entry is set to Y 2520, otherwise an error message is stored 2522, and processing terminates after exiting the critical section 2511.

If a connection was established 2516 2520, if ITInterface X does not support an unlimited number of connections 2517, the count of connections of X is incremented 2518. The method establishInterface() then exits the critical section 2511 and completes its processing.

2.4 IT Relationships

An IT Relationship is a pair of associated (established) IT interfaces belonging to two different IT structure instances. Note that the notion of IT relationship is introduced for convenience. This notion is not absolutely necessary for the model, since a pair of established IT interfaces can always be considered in and of itself, but IT relationships represent a convenient way of tracking interfacing IT structure pairs.

A symmetric IT relationship is an IT relationship, involving IT interfaces of identical class. Examples of a symmetric IT relationship include:

1) IT structure A uses ConnectsTo interface to relate to IT structure B, and IT structure B uses ConnectsTo interface to relate to IT structure A.

2) IT structure A uses DefaultInterface to relate to IT structure B, and IT structure B uses DefaultInterface to relate to IT structure A.

An asymmetric IT relationship is an IT relationship, involving IT interfaces of different classes. As an example, IT structure A InstallsOn IT structure B, while IT structure B Supports IT structure A.

An abstract IT relationship instance is an IT relationship interface instance involving at least one abstract IT interface instance.

A virtual IT relationship instance is a non-abstract IT relationship instance involving at least one virtual IT interface.

A real IT relationship instance is an IT relationship instance involving only real IT interface instances.

2.4.1 ITRelationship Class

ITRelationship class inherits from ITEntity class and has the following methods:

1) ITRelationship(String name, Type type[, ITInterface A, B])—constructor, establishes a relationship <name> of type <type> using IT interfaces A and B, or defaultInterface if A and B are not specified.

2) boolean isSymmetric( )—returns true if relationship is symmetric, false otherwise 3) [ ] Interface getRelatedITInterfaces( )—returns the pair of ITInterface instances involved in a relationship ITRelationship cannot be instantiated—only ITRelationship subclasses have practical uses.

2.4.2 ITRelationship Subclasses

Subclasses of the ITRelationship class are predicated by the types of IT interfaces included in the model. The following IT relationships may exist given the types of IT interfaces defined above:

DefaultITRelationship—two IT structures are related in an unidentified way

InstallationITRelationship—IT structure 1 is installed on IT structure 2

CommunicationITRelationship(<connection type>)—IT structure 1 communicates to IT structure 2 using <connection type>

InvocationITRelationship(<invocation type>)—IT structure 1 invokes IT structure 2

ManagementITRelationship—IT structure 1 manages IT structure 2

2.5 IT Dependencies

An IT dependency is a characteristic of an ITStructure class, indicating requirements of this ITStructure class instances for presence or absence of this or other ITStructure class instances.

A symmetric IT dependency is an IT dependency which can be applied to ITStructure subclasses involved, regardless of the order of ITStructure subclasses in the IT dependency predicate. For example, IT structure A depends on IT structure B, and IT structure B depends on IT structure A in the same way. The order of A and B in the previous sentence may be reversed without a change in meaning of the sentence.

An asymmetric IT dependency is a non-symmetric IT dependency (i.e., it cannot be applied to ITStructure subclasses involved regardless of their order in the IT dependency predicate). For example: IT structure A depends on IT structure B, but IT structure B does not depend on IT structure A.

2.5.1 ITDependency Class

ITDependency class inherits from ITEntity class and has the following methods:

1) ITDependency(String name, String A, B)—constructor, establishes a dependency of ITStructure subclass A on ITStructure subclass B, where A and B are names of subclasses.

2) boolean isSymmetric( )—returns true if relationship is symmetric, false otherwise 3) [ ] String getDependentClasses( )—returns the pair of names of ITStructure subclasses involved in an IT dependency.

ITDepdendency cannot be instantiated—only ITDependency subclasses have practical uses.

2.5.2 ITDependency Subclasses

A number of different dependencies may exist among IT structures comprising (i.e., included in a complex IT structure's composition) or potentially comprising an IT structure (i.e., having a potential of being included in a complex IT structure's composition). For the purposes of this definition, the following dependencies (ITDependency subclasses) are considered (i.e., other dependencies may be defined as appropriate for the structural model):

1) RequiresPresenceOf—as in "IT structure 1 requires presence of IT structure 2"

2) ExclusiveWith—Negation of 1—as in "IT structure 1 is exclusive with IT structure 2", IT structure 1 cannot be installed or operate in the presence of IT structure 2

In this embodiment, no difference is made between requirement of presence for installation and requirement of presence for operation, and the corresponding exclusivity. In another embodiment, such distinction could be made.

2.6 IT Delivery Environment

An IT delivery environment (or delivery environment) is a collection of rules, policies, practices, and associated support functions, including labor, physical space, power supply, hardware, software, networking, and management facilities involved in operating a data center, as well as means of provisioning and deployment of the aforementioned support functions. IT delivery environment also includes a collection of all delivery-bound real IT structures operating in it or in process of being deployed.

IT delivery environment may be null if every IT structure in it operates independently, does not use any data center services, no data center infrastructure exist, and no rules or standards are imposed on IT structures by the delivery environment. For example: a stand-alone personal computer is operated in a null IT delivery environment.

A delivery-bound IT structure is a virtual IT structure that can be provisioned and deployed in a particular IT delivery environment.

2.6.1 ITDeliveryEnvironment Class

ITDeliveryEnvironment class inherits from ITStructure and is always a complex IT structure. ITDeliveryEnvironment composition includes all IT structures deployed in the delivery environment. ITDeliveryEnvironment composition may (and normally would) also include one or more IT structures representing data center infrastructure.

Unlike ITStructure, ITDeliveryEnvironment permits an empty composition—empty composition is valid for the null IT delivery environment.

In addition to the standard ITStructure methods, ITDeliveryEnvironment includes the following methods:

1) Vector verifyConformance(ITStructure A)—verifies conformance of an IT structure to the rules of the IT delivery environments. Returns an empty Vector if the parameter IT structure conforms to the IT delivery environment rules, and a Vector containing a list of error message strings if the parameter IT structure does not conform to the IT delivery environment rules. This method is a NOOP for the null IT delivery environment.

Example: A set of product standards may be established by a data center, such that for certain types of products only products included in the standard set may be used—e.g., operating systems may be restricted to UNIX, and Windows; e.g., UNIX hardware platforms may be restricted to RS/6000 model F50 or H50 and no other computer may be used to run UNIX. verifyConformance( ) method in this case would examine the composition of its parameter IT structure (recursively, if the parameter IT structure is complex) and ensure that it only includes products for operating systems and hardware platform for UNIX that are either within the established set of standards or have higher level of abstraction than specific operating system and specific type of hardware.

2) Vector addElement({<new>|<update>}, ITStructure A)—overrides the parent class addElement( ) method; performs delivery binding of a virtual IT structure. Returns a Vector containing a delivery-bound IT structure as the first element if delivery binding is successful, and a list of error messages otherwise. This method is a NOOP (i.e., returns the input virtual IT structure as the first element of the returned Vector) for the null IT delivery environment. <new> or <update> input parameter may be specified to indicate whether this is a binding of a newly added IT structure, or an update of an existing IT structure.

3) Vector deploy({<new>|<update>}, ITStructure A)—initiates deployment of a delivery-bound IT structure. Returns a Vector containing error messages if processing is unsuccessful, and a null Vector otherwise. <new> or <update> input parameter may be specified to indicate whether this is a deployment of a new IT structure, or a change to an existing IT structure.

4) NetworkSecurityPolicy getNetworkSecurityPolicy( )—returns network security policy established within the IT delivery environment. The NetworkSecurityPolicy class may be specific to a particular IT delivery environment.

5) setNeworkSecurityPolicy(NetworkSecurityPolicy S)—establishes a network security policy S for an IT delivery environment.

Note that all methods of ITDeliveryEnvironment class are subclass-specific. Class ITDeliveryEnvironment includes NOOP placeholders.

2.7 Extending Entity Model

The above model provides a foundation for building an IT class library. However, it is highly abstract and insufficient for effective modeling of IT. A set of general extensions, with its classes inheriting from the appropriate base IT classes, defining basic IT constructs, such as computers or network devices, is required as further foundation. Such extended class libraries exist—e.g., Common Information Model (CIM).

Figure 18:
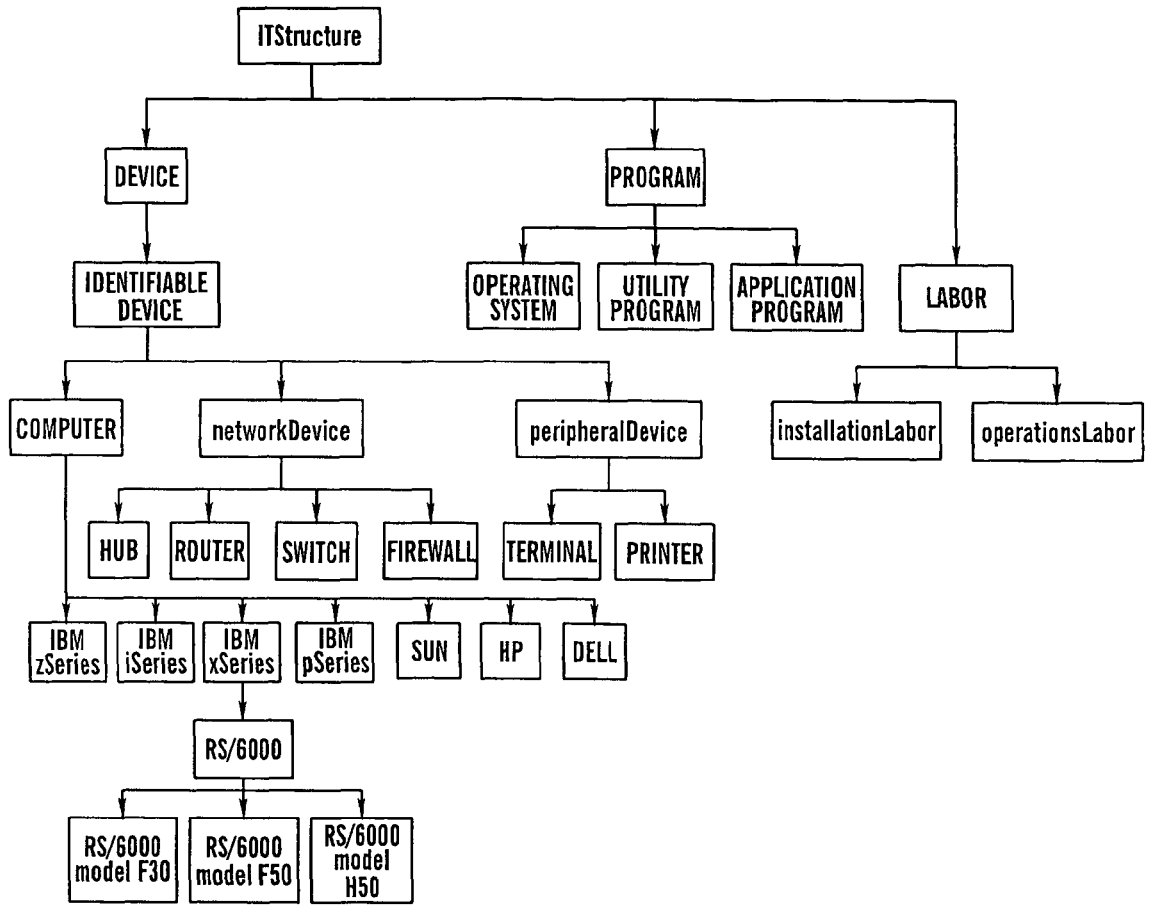
FIG. 18 is an extended class hierarchy example, in accordance with embodiments of the present invention.

Another example of such class hierarchy is described in FIG. 18, in accordance with embodiments of the present invention. FIG. 18 is an example of a set of extensions going from the class hierarchy origin (ITEntity) down to a set of specific computer models shown at a lowest hierarchical level as the virtual IT structures RS/6000 model F30, RS/6000 model F50, and RS/6000 model H50. FIG. 18 also shows intermediate hierarchical levels having successively lower degrees of abstraction. For example, consider the following example path through the hierarchical representation shown in FIG. 18: ITStructure, device, Identifiable Device, computer, IBM xSreies, RS/6000, RS/6000 model F50. In the preceding example, device is less abstract than ITstructure, IdentifiableDevice is less abstract than device, computer is less abstract than IBMxSeries, IBMxSeries is less abstract than RS/6000, and RS/6000 is less abstract than RS/6000 model F50. The lowest level IT structure of RS/6000 model F50 is a virtual IT structural, though not delivery bound.

Within the IT class hierarchy, class Device is included; the class Device embodies any types of hardware devices, and, in addition to all inherited and specific properties and methods associated with class Device, provides the following methods:

Int PeakPowerConsumption( )—returns the peak power consumption of the device (expressed in KW);

Boolean isRackMounted( )—returns true if the device is rack-mounted, and false otherwise;

Int requiredSpace( )—returns the number of rack slots a device requires if it is rack mounted, or the size of device footprint (expressed in square feed) if device is not rack mounted.

Within the IT class hierarchy, class Firewall is included; the class Firewall embodies any type of firewalls, and, in addition to all inherited and specific properties and methods associated with class Firewall, provides the following methods:

Vector getRules( )—returns the Vector of firewall rules associated with this firewall, or null if no rules have been specified for this firewall;

setRules([Vector rules)])—if not specified, the set of firewall rules is set to empty (no rules); otherwise, the set of firewall rules is set to the specified Vector of rule strings.

Class Program, also included in the IT class hierarchy, in addition to all the other properties and methods inherited or specific to class Program, possesses the properties IPTransportServer and Ports. Note that "application" and "software" are each to be construed as a member of the class Program.

IPTransportServer(["TCP"|"UDP"])—sets the IPTransportServer property value to "TCP" if a Program is a TCP server, "UDP" if a Program is a UDP server, or null, if a Program is not an IP transport server.

String getIPTransportServer( )—returns the value of the IPTransportServer property.

Ports is a Vector of TCP or UDP ports which the Program uses to accept communications.

setPorts([Vector <ports>])—sets the value of IP ports associated with the IP transport server; if not specified, dynamic port assignment is assumed, Vector getPorts( )—retrieves the list of ports associated with the IP transport server.

Associated with the above properties, is a list of clients, IPClients.

Vector getIPClients( )—returns a list of IP clients associated with the IP transport server.

setIPClients(Vector <IP address>)—associates a set of IP clients with the IP transport server, where <IP address> is either address of the host or network where each client is located.

The isSessionBased property of class Program indicates whether the program represented by the instance of class Program supports persistent sessions.

Boolean isSessionBased( )—returns the value of isSessionBased property of class Program, void setIsSessionBased({true|false}) otherwise sets the value of isSessionBased property to the specified Boolean value.

The expectedTxLoad property of class Program reflects the expected server load triggered by a single transaction on the scale of 0, 1, 2, 3 where 0 corresponds to unknown, 1 reflects low expected server load, 2 reflects medium expected server load, and 3 reflects high expected server load.

Integer getExpectedTxLoad( )—returns the value of expectedTxLoad property.

setExpectedTxLoad({0|1|2|3})—sets the value of expectedTxLoad property.

setPeakBandwidth(Int <peak bandwidth>)—sets the value of peak bandwidth this program may require, expressed in Mbps.

Int getPeakBandwidth( )—returns the peak value of bandwidth this program may require, expressed in Mbps.

Class Program may be associated with an ITServer object; this association is established by means of getITServer( ) and setITServer( ) methods.

ITServer getITServer( )—returns ITServer object associated with the Program, or null if none is associated.

setITServer(ITServer S)—associates a Program with ITServer S, or disassociates a Program from an ITServer if S is null.

An ITServer class, included in the IT class hierarchy, in addition to all the other properties and methods inherited or specific to class ITServer, has the following methods:

setITLBGroup(ITLBGroup G)—associates an ITServer with an instance of ITLBGroup, or disassociates ITServer from an instance of ITLBGroup if G is null.

ITLBGroup getITLBGroup( )—returns the associated ITLBGroup instance, or null if no ITLBGroup instance is associated.

setlbApplication(Program A)—sets an association with an instance of Program object which represents the application program requests to which should be load balanced.

Program getlbApplication( )—returns instance of class Program, requests to which should be load balanced, or null if no such program has been associated using setlbApplication( ) method.

An ITLBGroup class, included in the IT class hierarchy, in addition to all the other properties and methods inherited or specific to class ITLBGroup, has the following methods:

Vector getServerList( )—returns the list of ITServer objects comprising the load balanced group.

setServerList(Vector S)—sets the list of ITServer objects comprising the load balanced group.

ITLBMechanism getITLBMechanism( )—returns the instance of ITLBMechanism class, which contains the definition and parameters of the load balancing mechanism to be used setITLBMechanism(ITLBMechanism M)—sets the instance of ITLBMechanism class.

ITLBSessionPersistence getITLBSessionPersistence( )—returns the stored definition of the session persistence mechanism to be used; class ITLBSessionPersistence is a user-defined class which represents the session persistence mechanism to be used—source IP address/port, URL, or cookie-based string.

setITLBSessionPersistence (ITLBSessionPersistence S)—sets the definition of the session persistence mechanism to be used.

Class LoadBalancer is included in the IT class hierarchy, embodying any type of load balancer, and, in addition to all the other properties and methods inherited or specific to class LoadBalancer, having the following methods:

Vector getRules( )—returns the Vector of load balancing rules associated with this load balancer, or null if no rules have been specified for this load balancer.

setRules([Vector rules)])—if not specified, the set of load balancer rules is set to empty (no rules); otherwise, the set of load balancer rules is set to the specified Vector of rule strings.

Class ITLBMechanism is the parent for the following classes which describe individual load balancing mechanisms which have become de-facto industry standards: ITLBMechanismRoundRobin, ITLBMechanismLeastLoad, ITLBMechanismFastestResponse.

Class ITLBMechanismRoundRobin provides the following methods:

setWeightCoefficients(Vector weightCoefficients[ ])—sets weight coefficients associated with the round-robin algorithm for load balancing Vector getWeightCoefficients( )—returns the values of weight coefficients associated with the round-robin algorithm for load balancing Class ITLBMechanismLeastLoad provides the following methods:

setLoadMetrics(ITLBLoadMetrics loadMetrics)—specify least load algorithm load metrics, where class ITLBLoadMetrics is a user-defined class which provides a method returning a double precision value of the load metrics.

ITLBLoadMetrics getLoadMetrics( )—retrieve least load algorithm load metrics

Class ITLBMechanismFastestResponse provides the following methods:

setResponseString(String responseString)—sets the response string associated with the fastest response load balancing algorithm String getResponseString( )—retrieves the response string associated with the fastest response load balancing algorithm.

Within the IT class hierarchy, class ITIPTransportWrapper is included, to describe IP transport wrappers, and, in addition to all inherited properties and method, possesses the following properties and provides the following methods:

IPTransport(["TCP"|"UDP"])—sets the IPTransport property value to "TCP" if the non-compliant transport is TCP, "UDP" if the non-compliant transport is UDP, or null otherwise.

String getIPTransport( )—returns the value of the IPTransport property.

Vector getInPorts( )—returns the vector of TCP or UDP ports where the wrapper is to intercept the incoming communications.

setInPorts(Vector P)—sets the vector of TCP or UDP ports where the wrapper is to intercept the incoming communications.

Integer getOutPort( )—returns the number of TCP or UDP port where the wrapper is to open the pipe to.

The present invention discloses a translator (see Section 2.10 infra) to translate the abstract IT structure at the highest level (denoted as ITStrucure) to the virtual IT structures RS/6000 model F30, RS/6000 model F50, and RS/6000 model H50. To effectuate such translation, all of the intermediate IT structures shown in FIG. 18 may be stepped through in order to arrive at the final virtual IT structures (e.g., RS/6000 model F30, RS/6000 model F50, RS/6000 model H50, etc.). In some embodiments, however, the designer may provide sufficient input description (typically stored in libraries) so that the translator may not have to step through all of the intermediate IT structures shown in FIG. 18 to arrive at the final virtual IT structures. For example, a requirement that a particular IT structure can store and execute software may imply that the particular IT structure is a computer, so that the intermediate levels of device and IdentifiableDevice in the preceding example path could be skipped by the translator.

Figure 15:
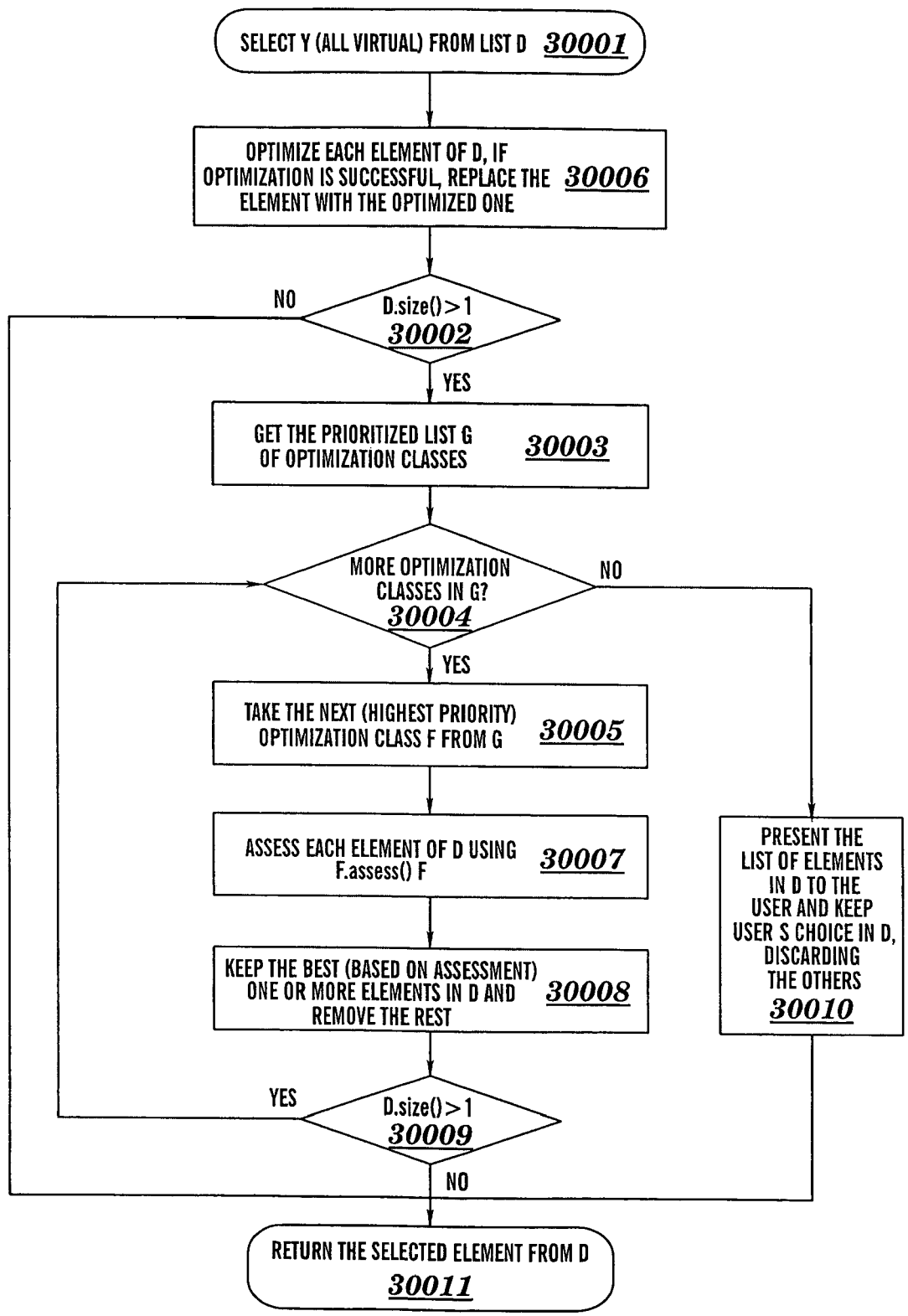
FIG. 15 is a flow chart depicting the process of selecting the best translation candidate from a list of translation candidates, in accordance with embodiments of the present invention.

Although each IT structure box in FIG. 18 is a primitive IT structure, a box appearing in the hierarchy of FIG. 15 could alternatively be a complex IT structure. For example, a box in the hierarchy could represent a client-server architecture as a complex IT structure having primitive elements of server and client.

1.7 Extended IT Delivery Environment

Similar to ITStructure subclasses, the ITDeliveryEnvironment class can have subclasses, used to define various delivery environments. All of ITDeliveryEnvironment subclasses must override two methods: verifyConformance( ) and addElement( ). The verifyConformance( ) method verifies whether a particular IT structure can be deployed and can operate within a given instance of an ITDeliveryEnvironment subclass. The addElement( ) method performs delivery binding of an IT structure to the IT delivery environment subclass instance if the IT structure has been previously verified via verifyConformance( ) to be deployable and operable within the IT delivery environment defined by the given instance of an ITDeliveryEnvironment subclass.

While this embodiment does not attempt to enumerate all possible delivery environments, an example ITDeliveryEnvironment subclass, called StandardizedITEnvironment is described. The key characteristic of the StandardizedITEnvironment is that it imposes product standards and restricts IT structures deployed and operated within it only to the allowable product set. So, the verifyConformance( ) method of StandardizedITEnvironment checks primitive composition of its argument target IT structure and indicates conformance only if every element of the primitive composition of the target IT structure belongs to the set of primitive IT structures permitted by the ITDeliveryEnvironment subclass. For example, the ITDeliveryEnvironment subclass may restrict a computer to be an IBM xSeries computer or an IBMzSeries computer.

Another embodiment for using the verifyConformance( ) method is a situation in which an IT structure is currently deployed in IT delivery environment A, but it is desired that this IT structure migrate to IT delivery environment B. Accordingly, this IT structure would be checked against the verifyConformance( ) method of delivery environment B to determine if this IT structure could be deployed in delivery environment B.

Figure 19:
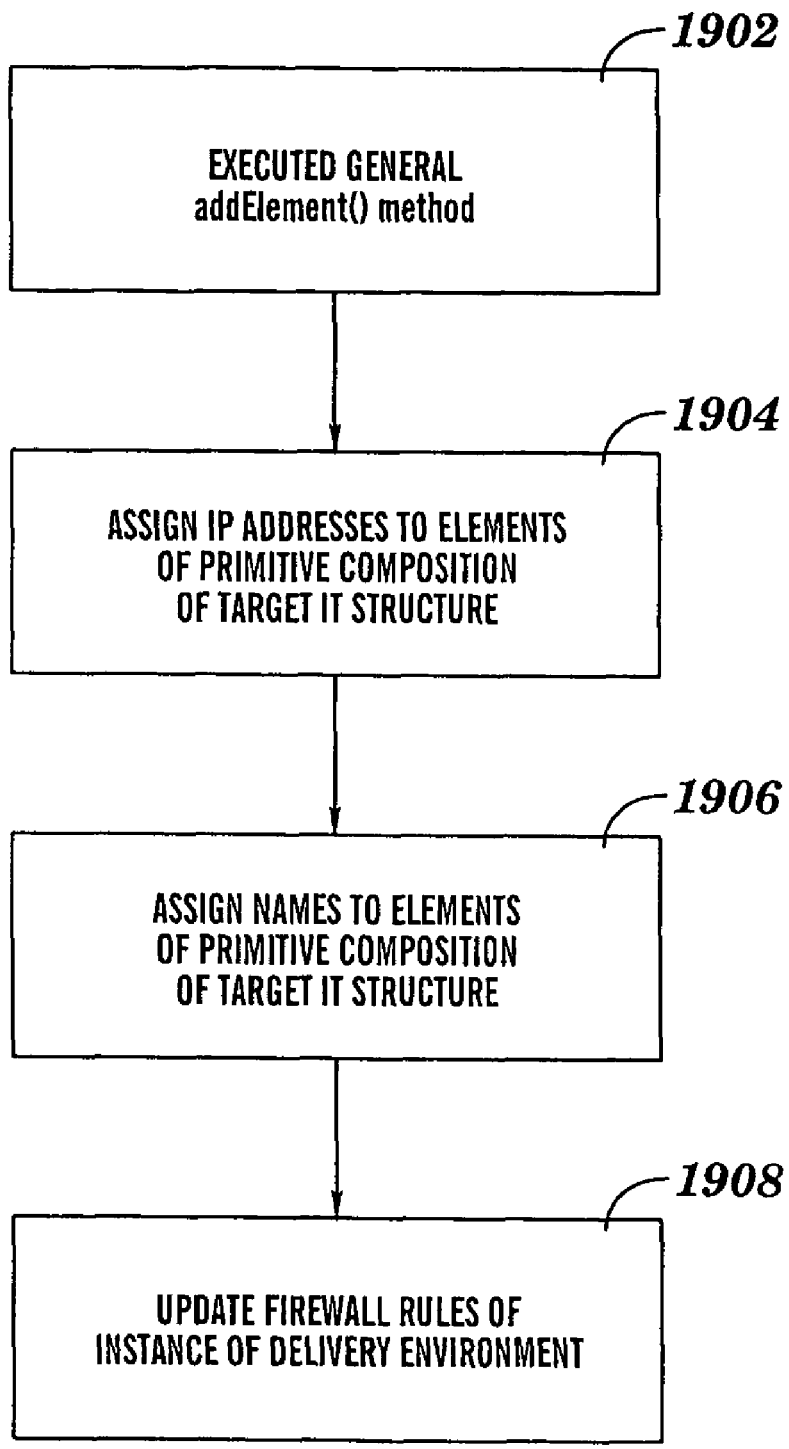
FIG. 19 is a flow chart for implementing delivery binding of an IT structure to a delivery environment, in accordance with embodiments of the present invention.

FIG. 18 is a flow chart depicting a modified addElement( ) method of StandardizedITEnvironment to perform delivery binding of the argument target IT structure to the instance of StandardizedITEnvironment, in accordance with embodiments of the present invention. The modified addElement( ) method effectuates IT delivery binding by invoking the general addElement( ) method of FIG. 3 with an addition of elements required to delivery bind the IT structure to a given IT delivery environment. As a part of this process, the modified addElement( ) method of FIG. 19 includes the general addElement( ) method 1902 of FIG. 3. If at least one element of the primitive composition of the delivery-bound IT structure requires access to the Internet, then the modified addElement( ) method assigns 1904 IP addresses to the elements of primitive composition of the target IT structure requiring IP addresses, these IP addresses being unique relative to the current primitive composition of the instance of StandardizedITEnvironment and adhering to the IP addressing policy of the instance of StandardizedITEnvironment. Similarly, the addElement( ) method assigns names 1906 to the elements of primitive composition of the target IT structure requiring names, and ensures uniqueness of these names relative to the current primitive composition of the instance of StandardizedITEnvironment and adherence of these names to the naming policies of the instance of StandardizedITEnvironment. If target IT structure requires access to the Internet through the firewall(s) provided by the instance of StandardizedITEnvironment, the firewall rules of the instance of StandardizedITEnvironment are updated 1908 to permit the appropriate communications.

2.8.1 Verifying Conformance of an ITStructure to an Exemplary Delivery Environment The exemplary delivery environment is a data center and is aimed at providing the highly-available branded infrastructure for Internet-accessible IT applications.

The data center is a new, state-of-the-art facility. It is built on today's technology and practices a philosophy of being a security-focused operation. Activities and services are monitored by an experienced technical staff 24×7 from the Network Operations Center (NOC). The facilities include 3,000 square feet of raised floor, a network operations monitoring center, conference rooms, administrative space and coffee room.

The physical space of the data center has a secure co-location in a 3,000 square foot room with 18" raised floor and is ADA (Americans with Disabilities Act)-compliant. The physical space includes 27"×39"×84" cabinets with internal vertical cable management and vented front and back doors. All hardware must fit into cabinets. No space other than cabinets is provided.

The electrical power to the data center from NYSEG (New York State Electric and Gas Company) is delivered by dual redundant feeds. The electric service in the building is connected to a parallel redundant UPS. There is a backup 1000 KW diesel generator with 7-day fuel reserve.

Primary Internet access of the data center is via AT&T Gigabit Ethernet over multi-mode fiber to their national fiber network node located in adjacent building. This network node has eight connections to the AT&T network. Alternate Internet access is via 100 Mbps Ethernet over single-mode fiber connection to the Cable & Wireless Network.

Security for the data center includes access control by Smart Card system issued by NOC personnel staffed 24×7× 365 (24 hours, 7 days a week, 365 days a year). Data center floor access is controlled by access card and biometric scan. Visitors are granted access by duly authorized representatives of the data center clients. A biometric scan and surrender of the visitor's driver's license for a proxy card is required for visitors to gain access from the lobby to the administrative area. Another biometric scan and use of the access card is required to enter the raised floor area.

Conformance factors for the IT structure to the above IT delivery environment (i.e., data center) include:

- Electric power availability, reliability (and possibly voltage)
- Ability to introduce devices out of the list of "supported" devices
- Ability to use specific software, or requirement to run specific software (e.g., for monitoring or virus defense)
- Availability of specific rack sizes/space
- Ability to use geometrically non-standard devices
- Compliance to physical network layer (jack types; switches/hubs; network speed)
- Compliance to monitoring/admin access (e.g., there may be a requirement to have an extra network interface per physical box for admin access)
- Possible conflict of application availability requirements to DE service window
- Network bandwidth requirements
- Internet availability requirements (dual-ISP, etc. . . . )

Architectural requirements with respect to network (layering, firewalls, IP addressing schema, network isolation requirements)

Network traffic requirements (e.g., "This IT Delivery Environment will allow only HTTP/HTTPS traffic from the Internet to your hosts"; "We do not allow outgoing traffic on port 25 directly, you must use one of our SMTP servers if you want to send email")

Application type limitations ("We do not allow mass-mailing applications")

Figure 9:
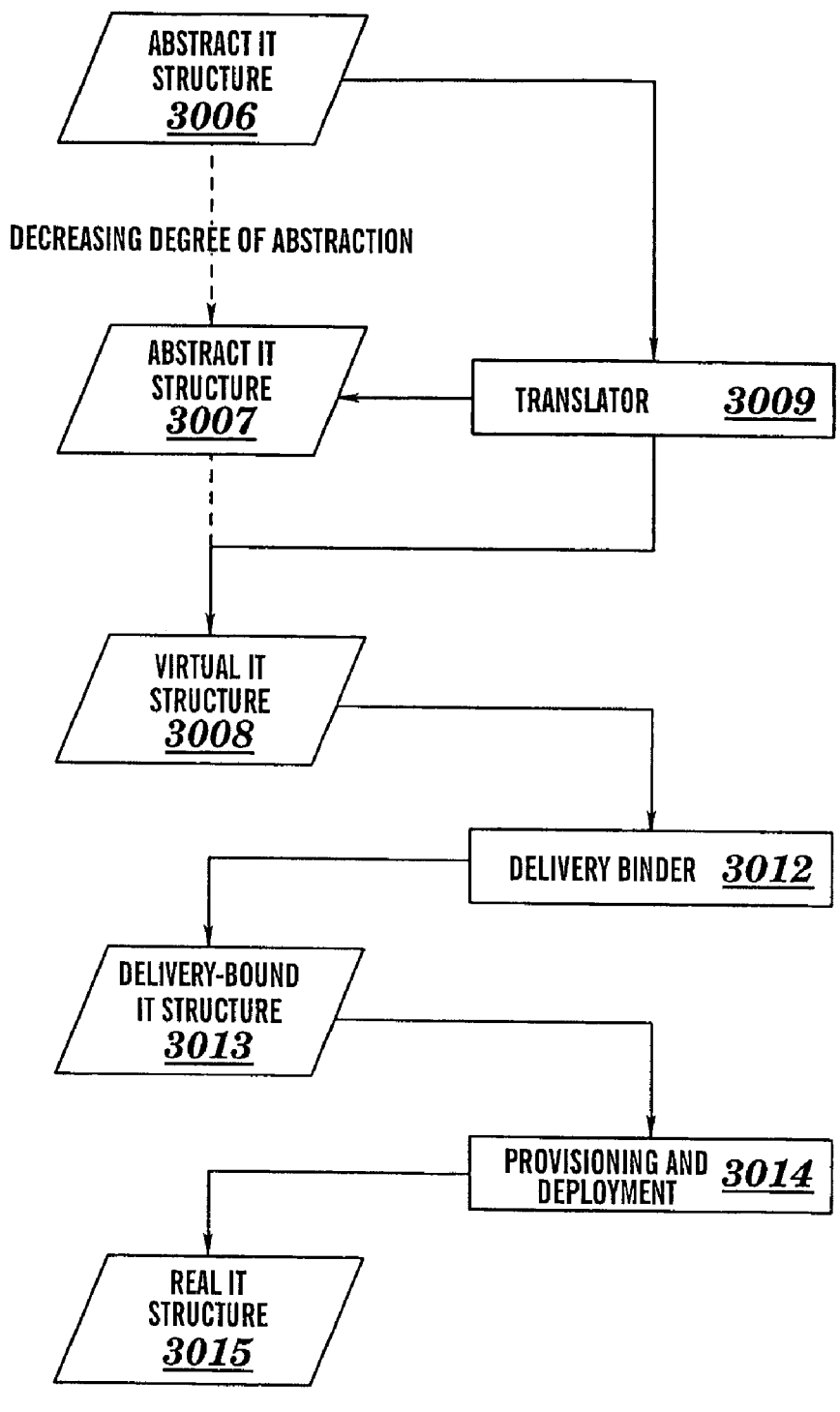
FIG. 9 is a chart depicting the IT development process, in accordance with embodiments of the present invention.
Figure 10:
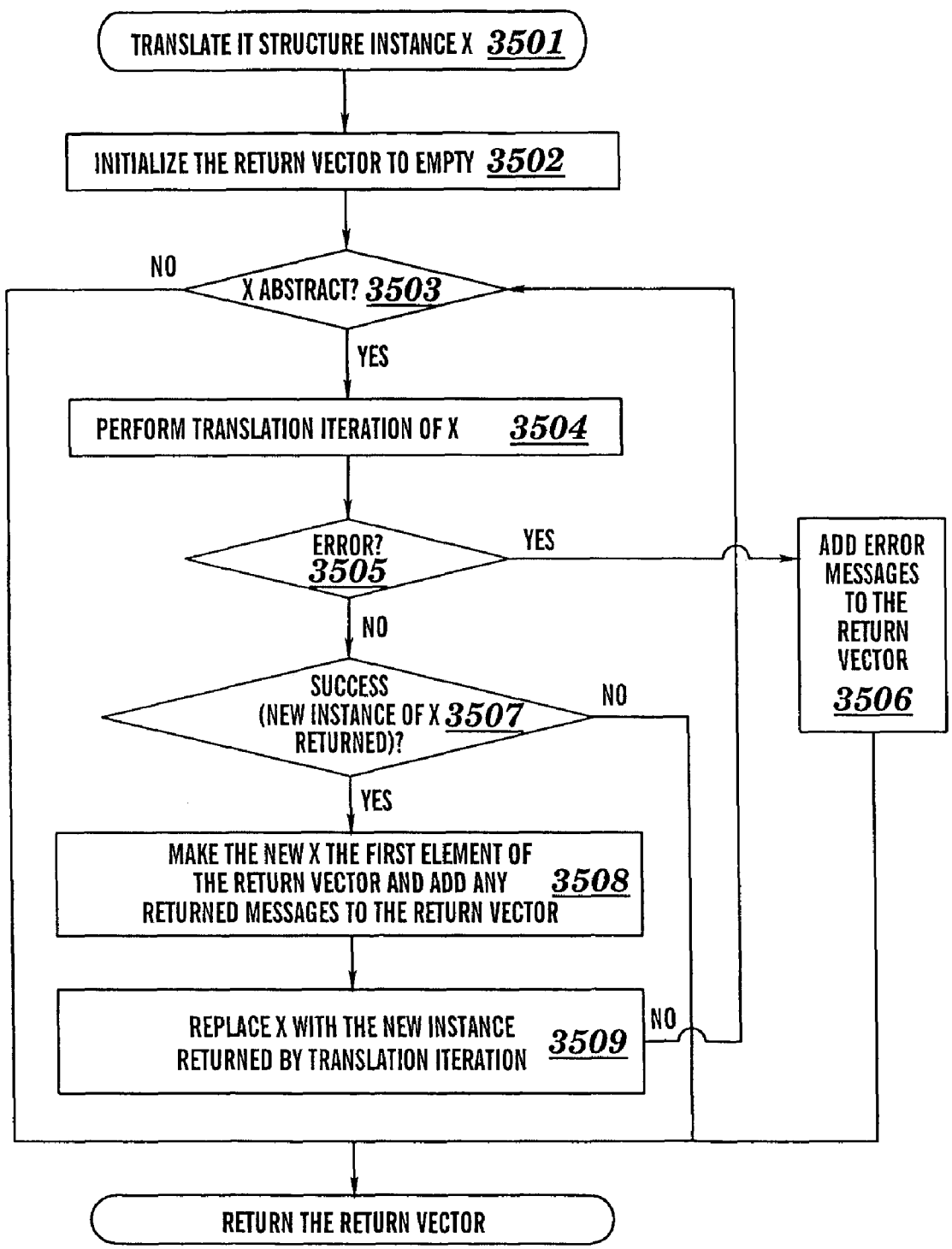
FIG. 10 is a flow chart depicting the process of translation of an IT structure instance, in accordance with embodiments of the present invention.

Security level provided by IT Delivery Environment versus IT structure security requirements 2.9 IT Development Process FIG. 9 is a chart depicting the IT development process, in accordance with embodiments of the present invention. Translator 3009 (see Sec. 2.10; FIG. 10) may be used in a translation process to translate an abstract IT structure 3006 into another abstract IT structure 3007 having a lower degree of abstraction than abstract IT structure 3006. This translation process may be recursively repeated until the abstract IT structure 3006/3007 has been translated into a virtual IT structure 3008 or until the translation process aborts due to an unsuccessful translation attempt. Alternatively, a single translation of abstract IT structure 3006 by translator 3009 may produce the virtual IT structure 3008. The virtual IT structure 3008 serves as input to the delivery binder 3012 (see Sec. 2.11; Sec. 2.2.2.5, addElement( ) method, FIG. 3), which translates the virtual IT structure into a delivery-bound IT structure 3013, elements of which are then provisioned and deployed 3014 (see Sec. 2.12; deploy( ) method), resulting in a real IT structure 3015 operating in the appropriate IT delivery environment.

2.10 Translation

Figure 11:
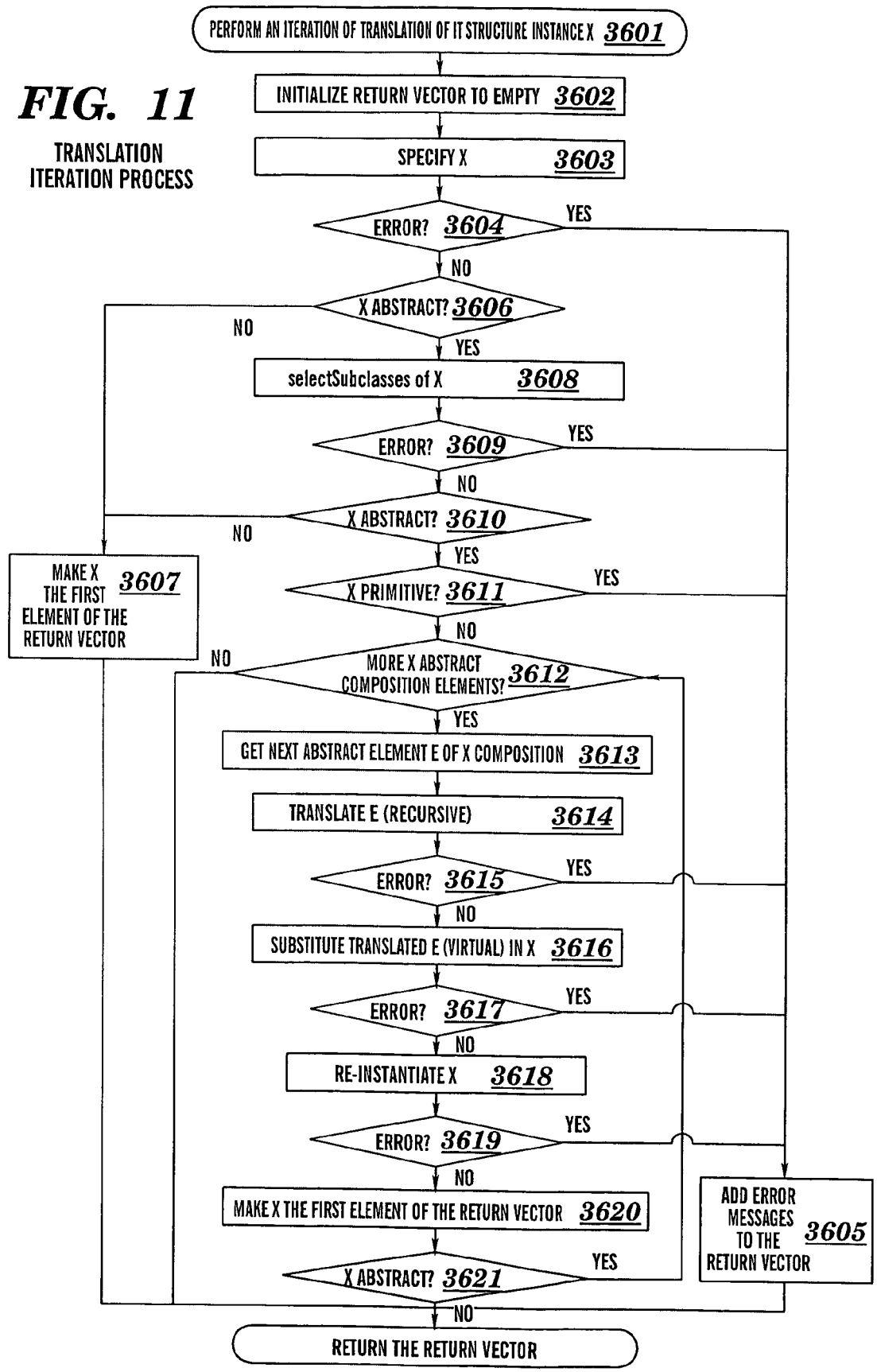
FIG. 11 is a flow chart depicting the translation iteration process, in accordance with embodiments of the present invention.

Translation is performed on an abstract IT structure instance with the intention of obtaining a virtual IT structure, which can then be optimized and bound to one or more IT delivery environment to obtain one or more real IT structure. FIGS. 10 and 11 collectively describe an IT translator (IT-RAN) adapted to translate an abstract IT structure to the virtual IT structure.

FIG. 10 is a flow chart depicting the process of translation of IT structure instance X 3501, in accordance with embodiments of the present invention. The process starts by initializing the return Vector 3508 to an empty Vector 3502. If X is not abstract 3503, no translation is necessary, and a null return Vector is returned to indicate that no action was performed (and no errors occurred).

The process then performs a series of iterations until either an error occurs or a virtual IT structure is obtained. The process invokes the translation iteration process 3504, as described infra in relation to FIG. 11, to iteratively translate the abstract elements of X (i.e., the IT structures in the composition of X) until an instantiation of X following said iterative translation is virtual. If an error is indicated by the translation iteration (by returning error message(s)) 3505, any error messages returned by the translation iteration process are added to the return Vector 3506 and processing terminates. If translation iteration processing did not indicate an error 3505, a check is performed to ascertain whether the translation iteration processing was successful 3507 (i.e., the translation iteration process returned a new instance of IT structure X), and if so, the new instance of IT structure X returned by the translation iteration process is made the first element of the return Vector 3508, and the current instance of IT structure X is replaced with the new instance of IT structure X returned by the translation iteration process 3509. The process then loops back to the check of whether the instance of IT structure X is still abstract 3503.

FIG. 11 is a flow chart depicting the translation iteration process, which is performed for an IT structure instance X 3601, in accordance with embodiments of the present invention. The process iterates through the abstract elements of X's composition to perform a translation of each abstract element of X, wherein the iterations end when a re-instantiation of X results in X being virtual (i.e., being in a virtual state).

The process starts by initializing the return Vector 3620 to an empty Vector 3602. The process then invokes the process of specification for X 3603, which may be a NOOP if X is fully specified, or, if X is not fully specified, will ensure full specification of characteristics of X. If an error occurs during the specification process for X 3604, any error messages returned by the specification process are added to the return Vector 3605 and processing terminates.

The process then checks whether X is abstract 3606, and if X is no longer abstract (i.e., X is now virtual), the process makes X the first element of the return Vector 3607 and returns.

If X is still abstract 3606, the process invokes selection of subclasses for X 3608. If an error occurs during subclass selection 3609, any error messages returned by the subclass selection process are added to the return Vector 3605 and processing terminates.

If subclass selection did not indicate an error 3609, the process checks whether X is still abstract 3610, and if X is no longer abstract (i.e., X is now virtual), the process makes X the first element of the return Vector 3607 and returns.

If X is still abstract 3610, the process checks whether X is primitive 3611, and if so, the process places a translation error message in the return Vector 3607 and processing terminates. The reason for this is that subclass selection process for a primitive IT structure has searched all possible subclasses of X (including any existing virtual IT structures) and has not found one that would represent a satisfactory translation result for X—i.e., no possible virtual IT structure exists that would satisfy functional, operational, and other requirements and/or constraints imposed on X.

If X is complex 3611, the process iterates through abstract elements of X's composition 3612. Because X is still abstract, by definition of abstract IT entities, X's composition includes at least one abstract element. Each iteration through X's composition finds the next abstract element E of X's composition 3613 and recursively invokes the translation process for E 3614. If an error occurs during translation of E 3615, any error messages returned by the recursive invocation of the translation process are added to the return Vector 3605 and processing terminates.

Figure 14:
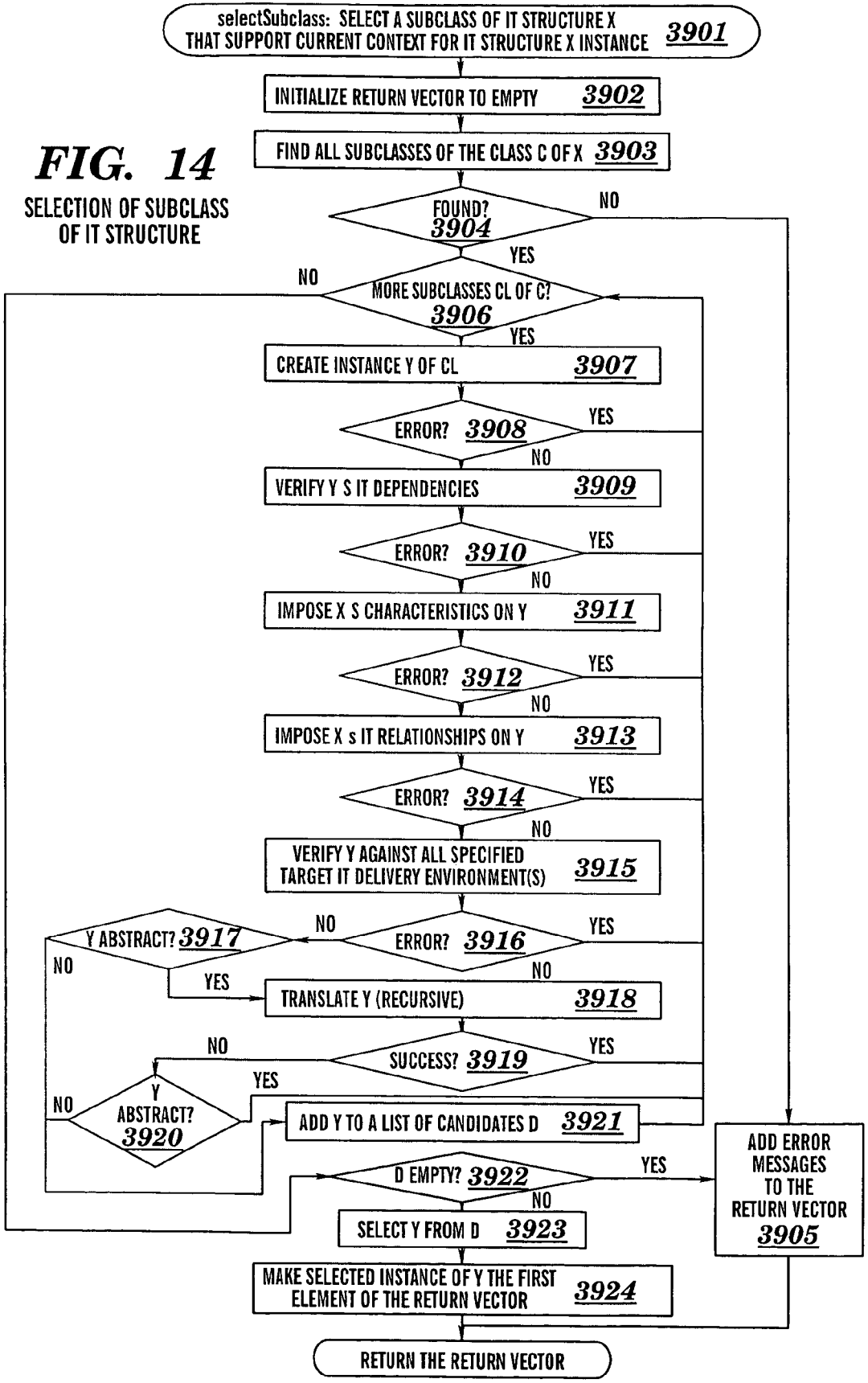
FIG. 14 is a flow chart depicting the process of selection a subclass of an IT structure, in accordance with embodiments of the present invention.

If translation process is successful and returns a new instance of E 3615, the new instance of E (denoted as $E_{NEW}$) is substituted for the current instance of E in the composition of X 3616. The process of substitution (not shown, but an analogous process is shown in FIG. 14) involves ensuring that any IT dependencies in X involving E are still satisfied, any IT relationships in X involving E are still valid and established, any characteristics of X (functional, operational, or other) are still supported, and X is still valid for any IT delivery environment for which it is targeted.

X (with $E_{NEW}$ substituted therein) is then re-instantiated 3618 to form an interim IT structure instance. If an error occurs during re-instantiation of X 3619 (e.g., if the interim IT structure instance is not virtual), error messages are added to the return Vector 3605 and processing terminates.

X (now re-instantiated) is then made the first element of the return Vector 3620. If X is no longer abstract 3621 (i.e., it is virtual), the return Vector (including X as its first element) is returned and processing terminates. If X is still abstract 3621, processing iterates to finding the next abstract composition element of X 3612.

Figure 12:
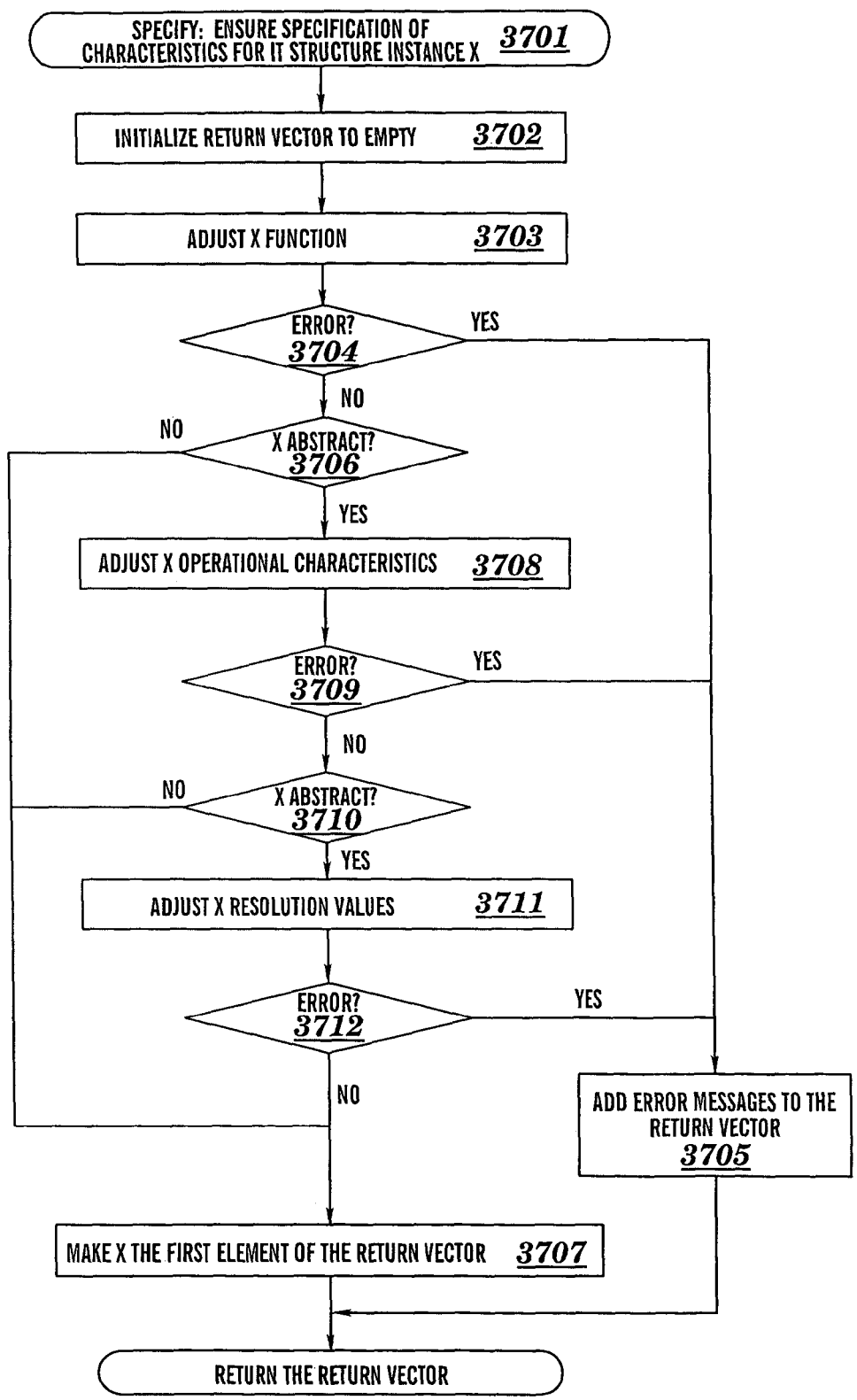
FIG. 12 is a flow chart depicting the process of ensuring specification of characteristics of an abstract IT structure instance, in accordance with embodiments of the present invention.

FIG. 12 is a flow chart depicting the process of ensuring specification of characteristics of abstract IT structure instance X 3701, in accordance with embodiments of the present invention. The process starts by initializing the return Vector 3707 to an empty Vector 3702. The process then invokes the adjustment process for the X's function(s) 3703. The adjustment process for a particular characteristic of an IT structure may be a NOOP if that characteristic is fully specified, or, otherwise, will ensure full specification of that characteristic. If an error occurs during the adjustment of X's function(s) 3704, any returned error messages are added to the return Vector 3705 and processing terminates.

The process then checks whether X is still abstract 3706. It is conceivable that as a result of invocation of setFunctions( ) method of X, X became virtual. If this is the case, X is made the first element of the return Vector 3707 and processing terminates.

If X is still abstract 3706, the process invokes the adjustment process for the X's operational characteristics 3708. If an error occurs during the adjustment of X's operational characteristics 3709, any returned error messages are added to the return Vector 3705 and processing terminates.

The process then once again checks whether X is still abstract 3710. It is conceivable that as a result of invocation of setOperationalCharacteristics( ) method of X, X became virtual. If this is the case, X is made the first element of the return Vector 3707 and processing terminates.

If X is still abstract 3710, the process invokes the adjustment process for the X's resolution values 3711. If an error occurs during the adjustment of X's resolution values 3712, any returned error messages are added to the return Vector 3705 and processing terminates, otherwise, the process makes X the first element of the return Vector 3707 prior to completion.

Figure 13:
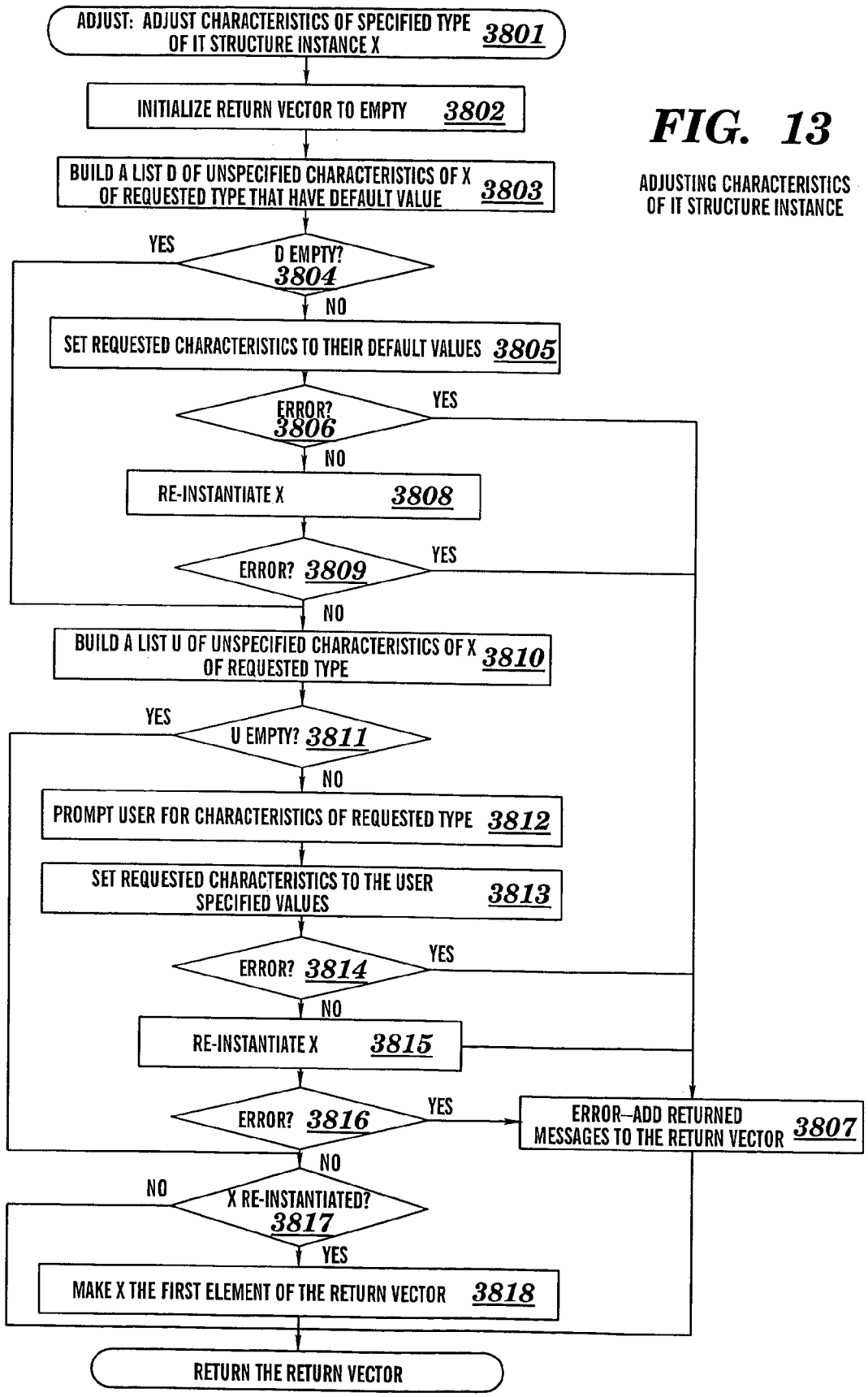
FIG. 13 is a flow chart depicting the process of adjusting a particular set of characteristics of an IT structure instance, in accordance with embodiments of the present invention.

FIG. 13 is a flow chart depicting the process of adjusting a particular set of characteristics of IT structure instance X 3801, in accordance with embodiments of the present invention. The process starts by initializing the return Vector to an empty Vector 3802. The process then builds a list D of unspecified characteristics of the requested type that have default values 3803. If D is not empty 3804 (i.e., at least one unspecified characteristic of the requested type has a default value), the unspecified characteristics are set to their default value 3805 using the appropriate method (i.e., setFunctions( ) for functional characteristics, setOperationalCharacteristics( ) for operational characteristics, and resolve( ) for resolution values). If an error occurs during the appropriate method invocations 3806 (i.e., if the requested characteristics could not be set to their corresponding default values), any error messages are added to the return Vector 3807 and processing terminates.

If default setting for the unspecified characteristics of the requested type was successful 3806, X is re-instantiated 3808. If an error occurs during the attempt to re-instantiate X 3809 (i.e., there is an internal logic error in X—X has accepted the default settings for the unspecified characteristics of the requested type, but now cannot be instantiated using these settings), any error messages are added to the return Vector 3807 and processing terminates.

The process then builds a list U of unspecified characteristics of the requested type 3810 (i.e., those that remain unspecified after any defaults were set). If U is not empty 3811 (i.e., at least one characteristic of the requested type remains unspecified), the process prompts the user for specification of the unspecified characteristics of the requested type 3812 and sets the now specified characteristic values using the appropriate method 3813. If an error occurs during the appropriate method invocations 3814 (i.e., if the requested characteristics could not be set to the values specified for them by the user), any error messages are added to the return Vector 3807 and processing terminates.

A number of possibilities exist as alternatives to addressing the user, comprising:

consulting an internal policy, possibly, associated with the target IT delivery environment(s), generating a value for each unspecified characteristic of the requested type that would not violate internal logic of the class of IT structure X, ignoring the fact that a particular characteristic is unspecified, requiring the users to always provide a default value for all characteristics of IT structures.

If setting of the user-specified values for the unspecified characteristics of the requested type was successful 3814, X is re-instantiated 3815. If an error occurs during the attempt to re-instantiate X 3816 (i.e., there is an internal logic error in X—X has accepted the user settings for the unspecified characteristics of the requested type, but now cannot be instantiated using these settings), any error messages are added to the return Vector 3807 and processing terminates.

The process then checks whether X was re-instantiated during preceding steps 3817, and if so, makes the new instance of X the first element of the return Vector 3818, otherwise (no error has occurred, but X was not re-instantiated—this is a NOOP processing case), an empty (as originally created) return Vector is returned upon completion of the process.

FIG. 14 shows the process of selection a subclass of IT structure X, in accordance with embodiments of the present invention. The instances of IT structure X would support characteristics of the instance (abstract) of IT structure X, relationships imposed on the instance of IT structure X, dependencies of IT structure X, and be valid for the IT delivery environments to which the instance of IT structure X is targeted 3901. The process starts by initializing the return Vector to an empty Vector 3902. The process then finds all subclasses of the class C of X 3903 (i.e., those classes in the class library that inherit from C directly or indirectly (by inheriting from a class that inherits from C directly or indirectly)). If no subclasses of C are found 3904, an error is indicated 3905 and processing terminates. The reason for indicating an error is that X is abstract, and therefore must have a way to be translated to a virtual IT structure instance. The translation process ensures that X is fully specified, and therefore, no other means of reducing abstraction than finding a less abstract class for X remain—and that just proved to be impossible.

If at least one subclass of C was found 3904, the process iterates through the list of subclasses CL of C 3906. An instance Y of subclass CL is created 3907. If an error occurs when creating an instance of CL 3908, CL is ignored (although an error message may be stored in the return Vector, as inability to create an instance of CL indicates an error in CL definition) and the next value of CL is taken.

If instance Y of class CL was created successfully 3908, Y's IT dependencies are verified 3909. If an error is detected by verification of Y's IT dependencies 3910, CL is discarded and the next value of CL is taken.

The process then attempts to impose all characteristics of IT structure instance X on Y 3911. If any characteristics of X could not be imposed on Y and an error occurred 3912, CL is discarded and the next value of CL is taken.

If transfer of characteristics from X to Y was successful 3912, any IT relationships of X are imposed on Y 3913. If Y cannot support all of X's IT relationships 3914, CL is discarded and the next value of CL is taken.

If transfer of IT relationships from X to Y was successful 3914, Y is now verified against all IT delivery environments to which X is targeted 3915. If an error is indicated 3916, CL is discarded and the next value of CL is taken.

Now that Y supports the context of X, a check is performed to determine whether Y is abstract 3917. It is conceivable that Y was virtual from the beginning, or that one or a combination of the actions performed for the transfer of X's context to Y caused Y to become virtual. The reason this check was not performed before this point is that until it is known that Y can support the context of X, Y's type is irrelevant.

If Y is virtual 3917, it is added to the list of translation candidates D 3921, and the next value of CL is taken.

If Y is abstract 3917, a translation of Y is attempted 3918 (recursive invocation of the translation process). If an error occurs during translation of Y or if no error occurs but Y is not translated anyway (NOOP) 3919, CL is discarded and the next value of CL is taken.

If Y was successfully translated 3919, but the result of the translation is still an abstract IT structure 3920, CL is discarded and the next value of CL is taken.

Discarding a subclass of C that does not translate into a virtual IT structure is not a necessity but a design choice. It would be equally valid to include the abstract IT structure Y in the list of candidates D in hopes of subsequent user intervention and manual modification of class source of the class CL of Y such that translation of Y to a virtual IT structure becomes possible. The design choice may be made for conciseness and minimization of complicated actions by the user.

If Y is now virtual 3920, Y is added to the list of translation candidates D 3921 before the next CL value is taken, Upon completion of iteration through the subclasses CL of C, if the list of translation candidates D is empty 3922 (i.e., no translation candidates were found), an error is indicated 3905 and processing terminates.

If the list of translation candidates D contains at least one translation candidate 3922, the process of translation candidate selection is performed 3923, resulting in selection of a single translation result Y from the list of translation candidates D, which is made the first element of the return Vector 3924 prior to completion of the process.

FIG. 15 is a flow chart depicting the process of selecting the best translation candidate Y from a list of translation candidates D (all virtual) 30001, in accordance with embodiments of the present invention. The process starts by optimizing each element of D (using its optimize( ) method), and, if optimization is successful, replacing the element of D with the result of its optimization 30006. If the list of candidates D has a single element 30002, no further action is performed and the one element of D is returned.

If the list of translation candidates D has more than one element to choose from 30002, the prioritized list of optimization classes (getOptimizationFunctions( ) method) is retrieved 30003. The process then iterates through the list G of optimization classes 30004, always taking the next (i.e., the highest priority) optimization class F from the list 30005. The process then assesses each element of D using the assessment function A associated with the optimization class F 30007 and only keeps in D the elements for which A produces the best result 30008, discarding all others.

If more than one element remains in D 30009 (i.e., optimization resulted in equally good result for multiple elements of D), the process iterates to the next assessment function.

If after the application of a sequence of assessment functions, D only has a single element 30009, that element is returned as the one selected for translation from the list of candidates D.

If all assessment functions are exhausted before D is reduced to a single element 30004, the list of elements in D is presented to the user and the user's choice acts as the tie-breaker 30010—the user can select a single element from the list and the others will be discarded prior to the process completion.

Prompting the user for a tie-breaker decision is a design choice. Other designs are possible, including those in which other means of breaking the tie are employed (e.g., random choice), and those in which multiple elements of D are returned and, as a result, the user is presented with multiple equally valid translations. The reason for the choice of human intervention as the tie-breaker is the extremely low probability of having multiple applications of assessment functions to multiple different optimized IT structure instances produce identical results.

2.11 Binding

An IT structure instance X can be added to another IT structure Y by inclusion of X into the composition of Y by means of the addElement( ) method of Y. The process of addition of IT structure instance X to Y is called binding.

2.11.1 Delivery Binding

A virtual IT structure targeted to a particular IT delivery environment may be delivery-bound (i.e., translated into a delivery-bound virtual IT structure) by means of invoking the addElement( ) method of the target ITDeliveryEnvironment class instance.

2.12 Initiating Deployment of a Delivery-Bound IT Structure

Deployment of a delivery-bound IT structure is initiated by invoking the method deploy( ) of the particular ITDeliveryEnvironment class instance.

2.13 Fall-Back Policy

In several places above it has been noted that it is not always possible to transition from an abstract IT structure to, eventually, a real IT structure. A trivial cause of this may be unavailability of the appropriate materials in a provisioning system. More complex cases are possibly, in which, although materials are available, the right combination of them cannot be derived, or, worse, a wrong choice was made in a decision tree of one of the steps of translation to make delivery binding impossible. In many of these cases, returning to a previous step in the IT development process may resolve the problem. Therefore, a fall-back policy is implemented throughout the IT development process, such that, should a condition be reached preventing the production of a real IT structure as a result of a step of the IT development process, a return to the appropriate previous step of the IT development process is performed and a different decision is made, resulting hopefully in a positive outcome of the IT development process.

2.14 IT Agents

An IT agent is a program, installed on or embedded within OS of a computer, or embedded within microcode or hardware of a device, which gathers information about hardware configuration of a computer or a device, software installed on a computer, and network connectivity of a computer or a device, and transmits this information to a requester.

IT agents may transmit gathered information to a requester unsolicited or in response to a request. IT agents possess proper OS authorization and proper network connectivity to be able to transmit gathered information.

IT agents are a particular case of software agents in general, and therefore their implementation is OS- and possibly hardware-dependent.

External discovery functions other than agents may be used to obtain some or all of the required information.

Depending on the degree of sophistication of an IT agent, an IT agent may or may not be able to provide certain types of information—e.g., an IT agent may or may not contain logic permitting it to examine customization and configuration parameters of a particular program. For the purposes of this embodiment, it is assumed that an IT agent always possesses the degree of sophistication required to accomplish its task and furnish the information necessary to fulfill a particular function. If this is not the case, and some of the required information may not be provided by an IT agent, a manual completion step may be required in some of the methods described below, enabling the user to provide the missing information.

Depending on a security policy and network connectivity of a particular IT delivery environment, some IT agents may be unable to gain access to some of the information they intend to gather, or to transmit some of the gathered information. For the purposes of this embodiment, it is assumed that an IT agent always possesses the necessary authority to gather the information it needs and is capable of transmitting this information whenever such transmission is required. If this is not the case, and some of the required information may not be provided by an IT agent, a manual completion step may be required in some of the methods described below, enabling the user to provide the missing information.

IT agents are assumed to be present on all computers and smart devices comprising a real IT structure.

2.15 Reverse-Specifying an IT Structure

In order to accomplish some of the functions described below, it may be necessary to perform a process of delivery-binding "in reverse", having an operational configuration as input, and deriving from it a real and a virtual IT structure. The process relies on the information gathered by IT agents and builds a real IT structure first, including all IT entities within an IT structure being examined. Once a real IT structure is built, a corresponding virtual IT structure is produced by discarding the information imposed on an IT structure by the delivery binding process associated with a particular IT delivery environment, and replacing real primitive IT structures in an IT structure composition with their respective virtual primitive counterparts.

While the reverse-specification process will recreate composition and IT relationships of an IT structure, it will not produce IT dependencies or any methods beyond those present in the real or virtual primitive IT structures and IT relationships used to comprise the reverse-specification.

Figure 16:
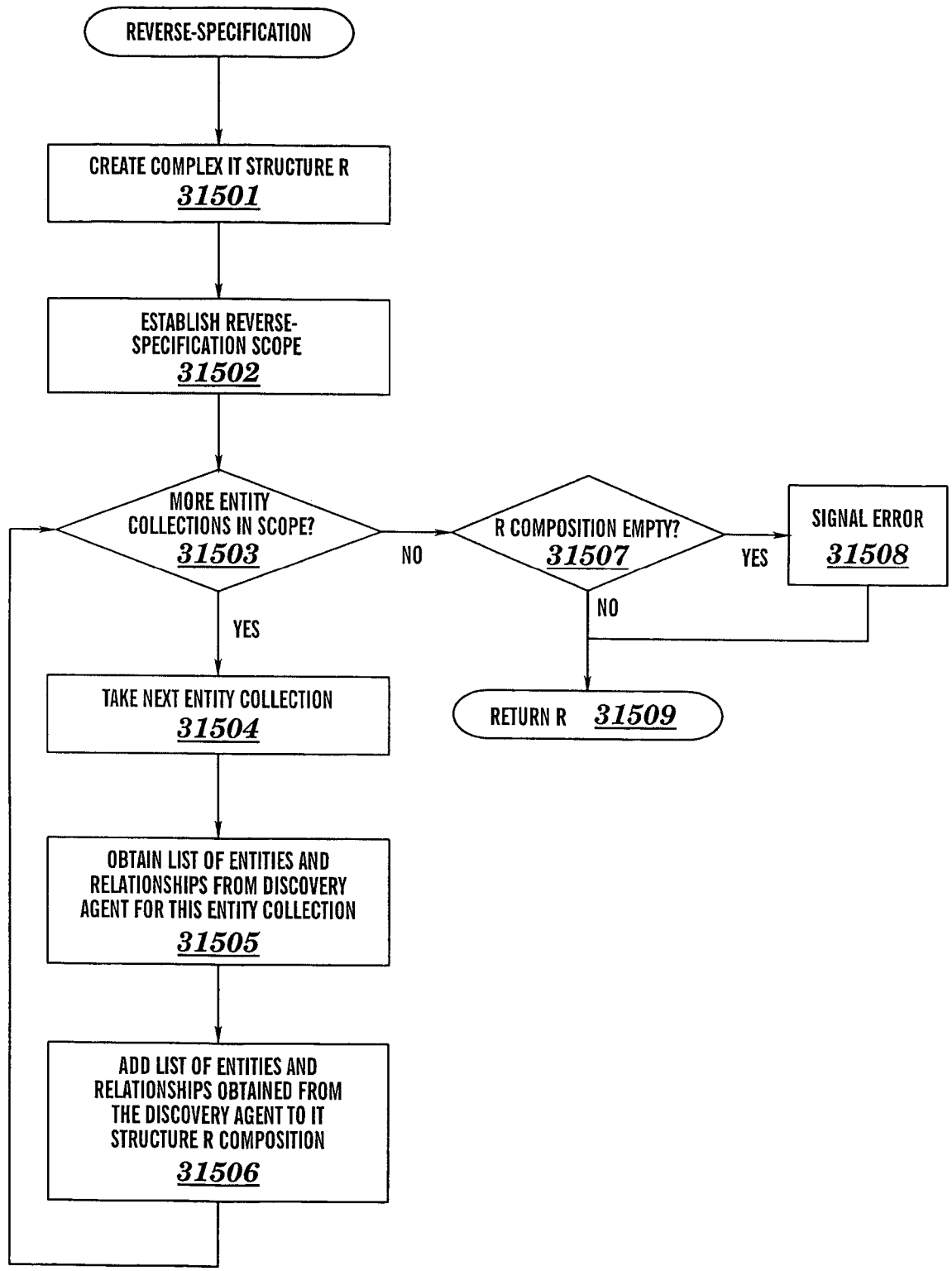
FIG. 16 is a flow chart depicting a reverse specification process, in accordance with embodiments of the present invention.

The process of reverse-specification is illustrated in FIG. 16, in accordance with embodiments of the present invention. The process starts by creating a complex IT structure R, with empty composition 31501. The process proceeds to establishing reverse-specification scope 31502. This is necessary to bound the reverse-specification process to the necessary subset of the IT delivery environment. The scope of reverse specification is a list of IT entities (most likely, computers) indicated by a user. If the scope is not provided, all IT entities supplied with agents are considered within the scope—e.g., the whole IT delivery environment. While there are unprocessed entity collections in scope (an entity collection is a group of IT entities reachable by a single discovery agent—e.g., a computer with its full software stack) 31503, consider the next unprocessed entity collection 31504. Obtain the list of entities and relationships from the associated discovery agent 31505, and add this list to the composition of IT structure R 31506. When all the entity collections are processed 31503, if composition of R is empty 31507, en error is indicated 31508. The resulting IT structure R is returned to the invoker 31509. The resulting IT structure R may result from either reverse specifying an IT delivery environment or from reverse specifying an IT system instance.

2.16 Comparing IT Structures

In some cases, it may be advantageous to compare two IT structures. IT structure classes can be compared by comparing their source code using conventional means of program comparison (e.g., delta-compare utility). The process of comparing two IT structure instances is described infra.

The process of comparing IT structures assumes one of the two cases, based on the usage of results of a comparison (these are the practical cases when a comparison would be useful—the method of comparison is not restricted to these situations):

1) The IT structure instances being compared are an original and its reverse-specification—for deployment verification and detection of unauthorized modifications.

2) The IT structure instances being compared are instances of the same IT structure subclass—for testing of IT structure methods by the user.

Figure 17:
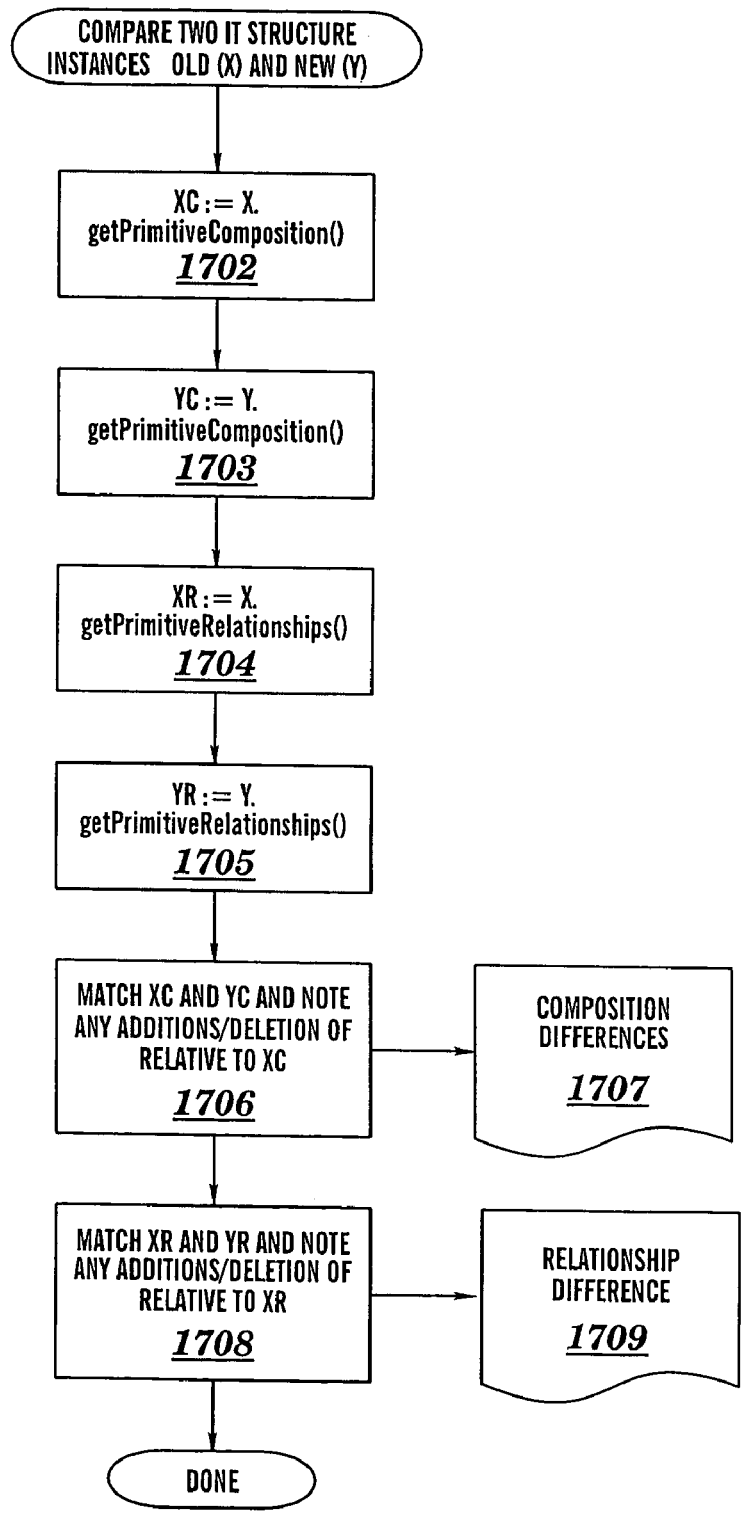
FIG. 17 is a flow chart depicting a process for comparing two IT structure instances, in accordance with embodiments of the present invention.

FIG. 17 describes the process of comparing two IT structure instances. The process obtains as input two IT structure instances, termed "old" (X) and "new" (Y) A1. The process obtains primitive compositions (getPrimitiveComposition( )) of the old 1702 and the new 1703 IT structure instances. The process then obtains primitive relationships list (getPrimitiveRelationships( )) of the old 1704 and the new IT 1705 structures.

The process then matches elements of the old and the new IT structure instances primitive compositions and determines any additions or deletions in (assumed) derivation of the new IT structure from the old 1706, and reports any additions or deletions in the new IT structure relative to the old one 1707.

The process then performs a similar matching for IT relationships of the old and the new IT structure instances 1708 and reports any differences 1709.

The process then produces a report (textual and/or graphical), showing any differences, and marking them as additions or deletions.

3. IT Structure Visualization

Visualization of IT structures supports usability for IT development tools. At different times during a development of an IT structure, an IT developer may desire to view different configurations relating to an IT structure such as, inter alia: a network topology configuration; a systems management configuration; a configuration of IT dependencies among IT structure composition elements; and a configuration of IT Relationships among IT structure composition elements.

3.1 Invocation of Fundamental IT Structure Methods

To visually represent various configurations relating to an IT structure X, method getPrimitiveComposition( ) for X may be invoked. This invocation of getPrimitiveComposition( ) returns the list of primitive IT structures comprising IT structure X. Depending on what information is being visualized, various additional methods operating on X may be invoked, including: getPrimitiveRelationships( ) for visualization of networks (e.g, communications networks) or other types of IT relationships; and getPrimitiveDependencies( ) for visualization of IT dependencies. For visualizing IT dependencies, the present invention may exploit the fact that the ITStructure class is enhanced with method getPrimitiveDependencies( ) which returns a list of IT dependencies among elements of IT structure primitive composition. Thus, to display network topology, the set of IT relationships returned by the getPrimitiveRelationships( ) method may be a specific subset of the set of IT relationships that includes IT relationships of the subclass "communicates with". This specific subset represents network paths among primitive IT structures returned by getPrimitiveComposition( ). Other subsets of IT relationships may be used for various other displays; e.g., "is managed" and "managed by" can be used to generate a visual representation of an IT structure that includes management structure as shown in FIG. 29 described infra.

3.2 Visualization of Networks

IT structures may involve complex networks. An IT developer may review and analyze various aspects of networking involved in the composition of an IT structure. The present invention discloses infra methodology for displaying multiple overlayed and interconnected networks on a screen in a fashion that enables the IT developer to easily comprehend the network.

FIG. 21A depicts a display of a network comprising devices, network segments, and vertical connectors, in accordance with embodiments of the present invention. The devices are hardware devices and/or software devices and are represented by rectangular icons and may comprise, inter alia, computers, routers, firewalls, software packages or modules, etc.

The network segments may represent a hub or VLANS (virtual LANs) implemented in network switches (which could be present as entities within the IT class hierarchy). The network segments may also represent a token ring MAU (media-access unit) or Ethernet 10B2 coaxial cable in a network topology configuration. The network segments are represented in FIG. 21A by horizontal lines, wherein a network segment may comprise subsegments and nodes. For example, network segment 4000 comprises subsegments 4005 and 4006 and nodes 4001-4003.

The vertical connectors are vertical lines that represent physical connectors or circuitry that electrically connects devices to network segments. For example, the vertical connector 4012 is coupled to the device 4010 at IP address 192.168.72 and connects the device 4012 to network segment 4000 at node 4001. The vertical connectors may represent cables connecting devices engaged in communication IT relationships to aforementioned hubs or VLANS. Another way to define a subclass of ITRelationship class—physicallyConnected—would indicate a connection via Ethernet cable or radio.

Devices are electrically and/or logically coupled to each other by paths which are combinations of network segments and/or vertical connectors. The devices names and IP addresses may be generated as a result of delivery binding.

3.2.1 Displaying Network Diagrams

The display method of the present invention places related components close to one another to utilize space efficiently and reduce or minimize the length of connections as well as the number of intersections and interleaves among connections and devices. A "connection" is a network segment, a vertical connector, or a combination thereof. The method of the present invention is performed by executing a goal function method in which goal values are computed. The goal function method assigns weights to the network segments, the vertical connectors, and overlays of devices and network segments. The goal function method also limits or precludes overlay of devices and network segments. An "overlay of devices" overlays (and thus obscures) a first device on the screen by a second device. The goal function method will be described in detail infra in conjunction with FIG. 24

FIG. 21B depicts relationships between the network display of FIG. 21A and a two-dimensional matrix representing the screen layout, in accordance with embodiments of the present invention. Thus, FIG. 21B depicts an overlay pattern of the network segments and the vertical connectors overlayed on the matrix in accordance with the distribution of the devices in the cells of the matrix and in accordance with the description of the configuration of devices, network segments, and vertical connectors provided in step 4200 of FIG. 22 as described infra.

In FIG. 21B, the positive directions associated with the mutually perpendicular X and Y coordinate axes are defined to be the horizontal and vertical directions, respectively. An initial phase of the display method calculates the size of a two-dimensional matrix to be used for representing the screen layout. Each cell of the matrix contains one device or is empty; and each cell may contain no more than one device. Each displayed device is placed in a unique cell of this matrix. The initial size of the matrix may be determined as follows. The initial height (NY) of the matrix in the vertical direction may be a function of the number of network segments in the IT structure. The initial width (NX) of the matrix in the horizontal direction may be a function of the number of devices on a network segment of the IT structure having the highest number of devices attached thereto as compared with all other network segments of the IT structure. The number of cells (N) in the matrix is the product of NX and NY.

Initially, devices may be distributed approximately uniformly in the matrix cells so as to initially form a set of filled matrix cells without regard as to which device fills (i.e., placed in) each such filled matrix cell. The method then performs multiple iterations, each iteration trying to minimize the goal value for the prevailing IT structure. Each iteration considers all possible pairs of matrix cells (such that at least one cell in the pair is non-empty) and swaps the matrix cells of a pair if a swap would reduce the goal value. Pairs of cells, representing devices with identical sets of network segments to which they are connected, may be ignored. The method may terminate when an iteration has not resulted in reduction of the goal value, when the iteration has not reduced the goal value by more than a predetermined tolerance (e.g., absolute tolerance, percent, etc.) relative to the goal value at the end of the immediately preceding iteration, when the goal value does not exceed a predetermined upper limiting goal value, when a maximum predetermined number of iterations has elapsed, etc.

In one embodiment, the display method does not use location of network segments in its decisions, such that the method does not make a decision that depends on where any of the network segments is located. Placement of a network segment may be determined as a function of location of devices connected to the network segment. Network segment placement determination may be performed within the goal function method. However, on every invocation of the goal function method as a side-effect of execution of the goal function method, locations of network segments may be calculated and stored, so that the network segments can be used for post-iteration processing such as for being rendered on the screen.

FIGS. 22-24 describe the display method in detail, in accordance with embodiments of the present invention.

Figure 22A:
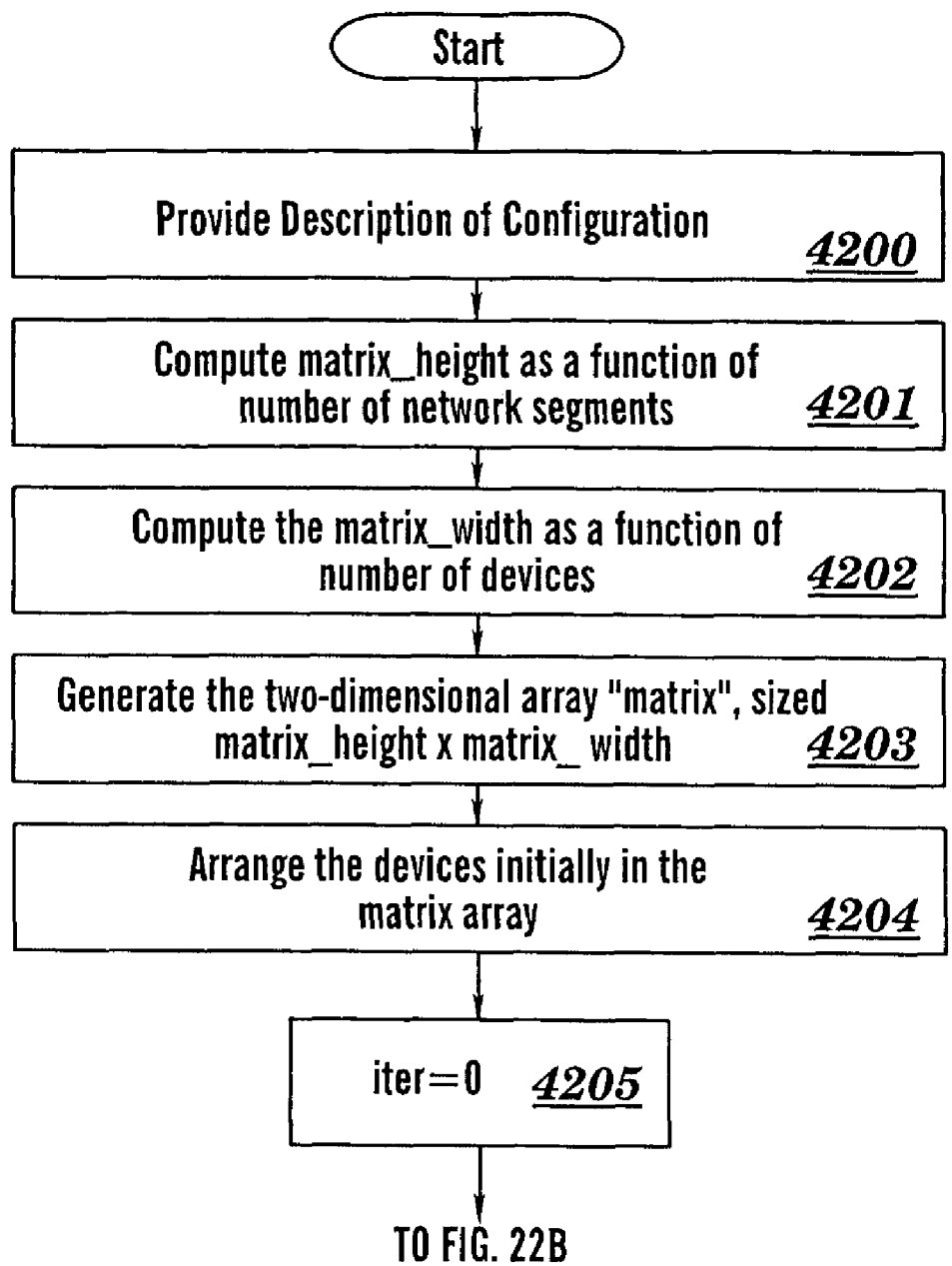

FIGS. 22A and 22B (collectively "FIG. 22") is a flow chart describing matrix generation and matrix cell swapping, in accordance with embodiments of the present invention. FIG. 22 comprises steps 4200-4219.

Step 4200 provides a description of a configuration of devices, network segments, and vertical connectors relating to at least one IT structure. The description describes how the devices, the network segments, and the vertical connectors are mutually coupled. The configuration may be, inter alia, a network topology configuration, a configuration of IT relationships among IT structure composition elements, or a configuration of IT dependencies among IT structure composition elements.

In step 4201, the matrix height (i.e., in the vertical direction and denoted as matrix_height or NY) may be calculated as a function of the number of network segments in the IT structure. In one embodiment, this function relating to step 4201 returns double the number of network segments in the IT structure. Thus the rows may be indexed from 0 to (NY−1).

In step 4202, the matrix width (i.e., in the horizontal direction and denoted as matrix_width or NX) is calculated as a function of the number of devices on a network segment having the highest number of devices attached thereto as compared with all other network segments of the IT structure. In one embodiment (noting that the devices can be connected to network segments by vertical connectors both from both above and below), this function relating to step 4202 returns three quarters of the number of devices on the network segment with the highest number of devices in the IT structure, rounded up to the nearest integer. Thus the rows may be indexed from 0 to (NX−1).

Step 4203 generates the matrix using the dimensions NX and NY determined in steps 4201-4202, Step 4204 initially distributes the devices in the cells of the matrix using the dimensions NX and NY previously calculated in steps 4201-4202. Thus, the devices are initially distributed to form an initial distribution of the devices in the cells of the matrix. The devices in the IT structure may be initially distributed approximately uniformly and in no particular order (e.g., randomly with respect to the devices) among cells of the matrix. In an embodiment, the number of iterations is limited by a predetermined value (MaxIter), and therefore the iteration counter (Iter) is initialized to zero in step 4205. In another embodiment, the maximum number of iterations may be unspecified and the number of iterations may be limited by the approximation to the goal value as described supra (e.g., maximum value of goal value, change in goal value between successive iterations, etc.) In yet another embodiment, the number of iterations may be limited by both the number of iterations and the approximation to the goal value, whichever is achieved sooner. Each iteration comprises execution of steps 4206-4219.

Each cell of the matrix contains content, said content being a device of the network or a null content. A null content is defined as an absence of a device. A cell is said to be empty if the cell contains a null content. A cell is said to be non-empty if the cell contains a device. Thus, swapping two cells of the matrix mean swapping the content of the two cells. Consider two cells of matrix denoted as cell A and cell B. As a first example in which cell A initially contains device X and cell B initially contains device Y, swapping cells A and B means transferring device X from cell A to cell B and transferring device Y from cell B to cell A. As a second example in which cell A initially contains device X and cell B initially contains a null content, swapping cells A and B means transferring device X from cell A to cell B and transferring the null content from cell B to cell A (i.e., making cell A empty). As a third example in which cells A and B each initially contain null content, swapping cells A and B cannot change the content of cells A and B from their initially null content.

In step 4206, the goal value is computed as described infra in conjunction with FIG. 24. Steps 4207 and 4208 respectively initialize internal loop counters i and j to zero. Even though the matrix is two-dimensional, its cells can be examined linearly, without consideration to their position in the two-dimensional matrix. The cells are enumerated, starting from 0 and ending with matrix_size-1 (or N−1), wherein matrix_size is equal to the product of matrix_width and matrix_height (i.e., N=NX*NY). Counters i and j represent cells i and j, respectively, within this linear enumeration.

In FIG. 22, steps 4209-4215 form a first loop over cell i and steps 4206-4217 form a second loop over cell j, wherein the first loop is an inner loop relative to the second loop. Thus cells i and j are processed in (i,j) pairs according to the first and second loops of FIG. 22 in a sequential order described by the notation (j=0, 1, . . . , N−1), i=0, 1, . . . , N−1) subject to i unequal to j.

Step 4209 decides whether the cells i and j should be considered for swapping (i.e., for being swapped), using a criteria such as: at least one cell of cells i and j is non-empty (i.e., said one cell contains a device therein) and cells i and j contain devices that do not have identical sets of network segments to which the devices in cells i and j connect. If the cells i and j should not be considered for swapping, then the process iterates to the next value of j in step 4214. Otherwise, step 4410 is next executed.

If the cells i and j should be considered for swapping in step 4209, the contents of cells i and j are swapped in step 4210, and a new goal value is computed in step 4211 in accordance with the algorithm described in FIG. 24. In step 4212, the new goal value is compared to the previous goal value. If the new goal value is not less than the previous goal value (i.e., goal value has not decreased), cells j and j are swapped in step 4213 to effectively reverse the swapping previously performed in step 4210.

Step 4214 increments j by 1 to its next value. Step 4215 determines whether j is less than matrix_size. If j is less than matrix_size then the process loops to step 4209; otherwise, step 4216 is next executed which increments i by 1 to its next value Step 4217 determines whether i is less than matrix_size. If j is less than matrix_size then the process loops to step 4208; otherwise, step 4218 is next executed which increments Iter to its next value.

Step 4219 determines whether Iter is less than MaxIter. If Iter is less than MaxIter, then the process loops to step 4206 to execute the next iteration comprising steps 4206-4219. The next iteration will initially compute a lower goal value in step 4206 than was computed in the immediately preceding iteration, since each swapping of cells in step 4211 that is not offset by the inverse swapping of step 4213 lowers the computed goal value. Each iteration is characterized by a first distribution of devices in the cells of the matrix at the beginning of each iteration, wherein the first distribution of the first iteration is the initial distribution determined in step 4204, and wherein the first distribution of each iteration after the first iteration is the distribution of devices in the cells of the matrix at the end of the immediately preceding iteration. Therefore each iteration has an improved first distribution of devices in the cells of the matrix as compared with the first distribution of devices in the cells of the matrix for the immediately preceding iteration. Accordingly, each iteration has a potential for lowering the goal value relative to the lowest goal value computed in the immediately preceding iteration.

If Iter is not less than MaxIter in step 4219, then the distribution of the devices in the cells of the matrix is a final distribution of said devices, and the process continues with execution of the algorithm depicted in the flow chart of FIG. 23, described infra. As stated supra, the use of MaxIter is only one of several alternatives for determining when to stop iterating. The goal value relating to the final distribution of devices is lower than the goal value relating to the initial distribution of devices.

FIG. 23 is a flow chart describing rearrangement of network segments, in accordance with embodiments of the present invention. The rearrangement of network segments contributes to formation of an overlay pattern of the network segments and the vertical connectors overlayed on the matrix in accordance with the final distribution of the devices in the cells of the matrix and in accordance with the description of the configuration provided in step 4200 of FIG. 22. As a side effect of execution of the goal function method, a list of network segments and their placement are determined. FIG. 23 verifies this list of network segments and their placement to eliminate any conflicts, i.e., to ensure that network segments drawn on a single horizontal row on a screen will not intersect. FIG. 23 includes steps 4301-4312. The method of FIG. 23 iterates through the list of network segments using counters i and j to represent the network segments.

Step 4301 initializes i to 0, and step 4302 sets j to i+1. In FIG. 23, steps 4303-4309 form a first loop over network segment i and steps 4302-4311 form a second loop over network segment j, wherein the first loop is an inner loop relative to the second loop. Thus i and j are processed in (i, j) pairs according to the first and second loops of FIG. 23 in a sequential order described by the notation ((j=i+1, i+2, . . . , S), i=0, 1, . . . , S−1), wherein S is the total number of network segments.

Step 4303 determines whether network segments i and j have the same vertical position. If network segments i and j do not have the same vertical position, then the method next executes step 4308 which increments j by 1 to j+1. If network segments i and j have the same vertical position in step 4303, then step 4304 is next executed.

Steps 4304-4305 collectively determine whether network segments i and j overlap horizontally. In particular, step 4304 determines whether the rightmost end of network segment i is to the right of the leftmost end of network segment j, and step 4305 determines whether the rightmost end of network segment j is to the right of the leftmost end of network segment i. If steps 4304-4305 collectively determine that network segments i and j do not overlap horizontally, then the method next executes step 4308 which increments j by 1 to j+1.

If steps 4304-4305 collectively determine that network segments i and j overlap horizontally, then the method next executes steps 4306-4307 which are illustrated in FIGS. 27 and 28 in accordance with embodiments of the present invention. In FIG. 27, network segments i and j, respectively represented by network segments 192.168.6.X and 192.168.2.X, overlap horizontally. In step 4306, the method comprises moving down one row all network segments and all devices whose vertical coordinate is greater than the vertical coordinate of network segment i (i.e., network segment 192.168.6.X), resulting in the vertically downward movement of network segment 192.168.3.X, the device disposed between vertical connectors 192.168.4.1 and 192.168.3.1, the device disposed between vertical connectors 192.168.2.2 and 192.168.3.2, and the device disposed between vertical connectors 192.168.2.3 and 192.168.3.3). In step 4307, the method comprises moving down one row the network segment j (i.e., network segment 192.168.2.X), resulting in the vertically downward movement of network segment 192.168.2.X) and all devices connected to network segment j whose vertical coordinate is greater than the vertical coordinate of network segment j and that were not moved in step 4306. Note that there are no such devices in FIG. 27 to be moved in step 4307. FIGS. 27 and 28 represent the rendered network diagram before and after, respectively, the moves of network segments mandated by steps 4306-4307, where network segments i and j are the two network segments superimposed on the network diagram in row 3 of FIG. 27, and are no longer superimposed in FIG. 28.

In step 4308, j is incremented by 1. Step 4309 determines whether j is less than the number of network segments. If j is less than the number of network segments, then the method loops back to step 4303. If j is not less than the number of network segments, then step 4310 is next executed. Step 4310 increments i by 1.

Step 4311 determines whether i is less than the number of network segments minus 1. If i is less than the number of network segments minus 1, then the method loops back to step 4302. If j is not less than the number of network segments minus 1, then in step 4312 the final distribution of device with the overlay pattern of the network segments and vertical connectors are displayed on the display screen and the method of FIG. 23 ends.

FIG. 24 is a flow chart of steps 4401-4412 for describing the goal function method for computing a goal value called "Goal", in accordance with embodiments of the present invention. Counters i and j represent network segments i and devices j, respectively. Step 4401 initializes Goal to zero. Step 4402 initializes i to zero. Step 4403 computes and stores the horizontal position of network segment i, as described by the horizontal matrix coordinates of the leftmost and the rightmost devices connected to the network segment i.

Step 4404 increments Goal by the product of a weight (denoted as h_weight) and the width of network segment i (i.e., the difference of the horizontal matrix coordinates of the rightmost and leftmost devices attached the i-th network segment). Step 4405 sets j equal to zero. Step 4406 increments Goal by the product of: a weight (denoted as v_weight) and the length of the vertical connector between the i-th network segment's j-th device and the i-th network segment.

If the vertical connector between the i-th network segment j-th device and the i-th network segment crosses any device, Goal is incremented by a penalty value in step 4407. Since such device crossings impair the quality of the visual representation of the network on the screen, it may be desirable in some embodiments to assign a penalty value that exceeds the weights of network segments and vertical connectors (e.g., by one or two orders of magnitude).

Step 4408 increments counter j by 1. Step 4409 determines if j is less than the number of devices of the i-th network segment. If j is less than the number of devices of the i-th network segment, then the process loops back to step 4406. If j is not less than the number of devices of the i-th network segment, then step 4410 is next executed.

Step 4410 increments i by 1. Step 4411 determines if i is less than the number of network segments. If i is less than the number of network segments, then the process loops back to step 4403. If i is not less than the number of network segments, then step 4412 returns the value of Goal to the invoker (e.g., step 4206 or 4211 of FIG. 22).

FIGS. 25-26 illustrate how the swapping of two non-empty cells of the matrix can affect the goal value, in accordance with embodiments of the present invention. Denoting C23 and C44 as the cells in (row 2, column 3) and (row 4, column 4), respectively, the device "elearningODS" in cell C23 and the device "emailODS-email_server" in cell C24 in FIG. 25 are shown as having been swapped in FIG. 26. This swapping increases the goal value for this example. Although the length of the Network Segment 192.168.3.X has decreased somewhat, said decrease was more than offset by increasing the length of the Vertical Connectors 192.168.3.1, 192.168.7.1 and 192.168.6.2. Moreover, the goal function method now introduced a penalty for Vertical Connector 192.168.7.1 crossing the Device in row 2, column 4.

The relative values of weights of network segments, vertical connectors and penalties may influence the layout and visual clarity of the rendered network diagram that the algorithm builds. These weights and penalties can be determined experimentally, by assuming initially equal weights for network segments and vertical connectors, and taking the penalty value approximately equal to a multiplier (e.g., 50) on the average value of the weights for the network segments and vertical connectors. Trying different network configurations to vary the balance between h_weight (see step 4404 of FIG. 24) and v_weight (see step 4406 of FIG. 24) provides an empirical technique for determining values of these weights and penalties that result in a desirable visual image on the display screen.

The weight of each network segment may be a same network segment weight for each network segment, and the weight of each vertical connector may be a same vertical connector weight for each vertical connector. Alternatively, the network segment weight, the vertical connector weight, and the penalty may each independently be described by a plurality of values. For example, some network segments may be weighted differently from other network segments, some vertical connectors may be weighted differently that other vertical connectors, and some penalties may be weighted differently than other penalties. To illustrate, some device connections may be more important to the user for visualization purposes than other device connections and the user may accordingly desire a higher quality visual representation in relation to the more important device connections than in relation to the less important device connections, thereby resulting in multiple weights for at least one connector parameter (i.e., network segment weight, vertical connector weight, penalty). Moreover, the weights and penalties may have predetermined numerical values or may be dynamically computed in accordance with an algorithm.

In FIG. 24, the goal value is computed as a linear combination of: a product of the length and weight of each network segment, a product the length and weight of each vertical connector, and the penalty. Generally, the goal value is computed as a function of a length and weight of each network segment, a length and weight of each vertical connector, and a penalty for each crossing of a device by a network segment. The functional dependence of the goal value on any of the relevant parameters (i.e., network segment weight, vertical connector weight, and penalty) may be linear or nonlinear. For example, the goal value may depend nonlinearly on the length of at least one network segment, the length of at least one vertical connector, the penalty, and combinations thereof.

Moreover, the computation of the goal value may comprise computing values of cross-coupling terms involving said parameters (e.g., the product of network segment weight and the square root of the vertical connector weight). In other words, the scope of the present invention includes any functional dependence of the goal value that results in an acceptable display image of a configuration relating to an IT structure.

3.3 Visualization of IT Dependencies, IT Relationships, and Systems Management FIG. 29 illustrates a display for visualizing IT relationship, in accordance with embodiments of the present invention. In FIG. 29, four computers are present: eLearningODS-AppServer_1, eLearningODS-AppServer_2, eLearningODS-DBServer, and managementServer. Each of the computers communicates with the other computers, as reflected by the bi-directional IT relationship representation "communicates with".

Computers have various types of programs installed on them. For example, OS AIX 4.3.2 is installed on eLearningODS-DBServer, and DB DB2 UDB v7.0.1 is installed on OS AIX 4.3.2.

Both instances of Application eLearning_ap 1.7.2 invoke DB DB2 UDB v7.0.1 (and thus, DB DB2 UDB v7.0.1 is invoked by both instances of eLearning_ap 1.7.2), as shown by the asymmetric IT relationship representation "Invokes".

Tivoli_Monitoring program is managing the two application and one DB servers (and thus, the two application and one DB servers are managed by Tivoli_Monitoring program), as shown by the asymmetric IT relationship representation "Manages".

The computers eLearningODS-AppServer_1 and eLearningODS-DBServer are mutually coupled to each other through the asymmetric IT relationship "Communicates with".

In one embodiment, multiple relationships genres are shown as combined in a single display, (e.g., FIG. 29). In particular, FIG. 29 includes a management genre, a communications genre, and an invocation genre. In another embodiment, the user can select the relationship genres desired for display. For example, the user may select relationships of a single genre for display such as only management relationships, wherein only the management relationship diagram will be displayed. Similarly, the user may select only invocation relationships, wherein only the invocation diagram of programs will be displayed.

The display algorithms described in the flow charts of FIGS. 22-24 are applicable to generating a display of IT relationships as follows, using FIG. 29 for illustrative purposes in comparison with FIG. 21A. The rectangles of FIG. 29 (e.g., rectangle 4510) simulate the devices of FIG. 21A. The horizontal lines of FIG. 29 (e.g., horizontal line 4511) simulate the network segments of FIG. 21A. The vertical lines of FIG. 29 (e.g., vertical line 4512) simulate the vertical connectors of FIG. 21A.

Generally, the present invention discloses a method for generating a display of a configuration of IT relationships among IT structure composition elements such that each displayed device (i.e., displayed rectangle) represents an IT structure composition element. The displayed horizontal segments and vertical connectors form paths such that each path links a first device with a second device and represents an IT relationship between the first device and the second device. Each path has two ends and either end or both ends of the path may have a terminating arrow to denote the asymmetry or symmetry of the relationship. A path is unidirectional if one end, and only one end, of the path has a terminating arrow denoting an asymmetric relationship (e.g., eLearningODS-DBServer "manages" Tivoli_Monitoring). A path is bidirectional if both ends of the path has a terminating arrow denoting a symmetric relationship (e.g., eLearningODS-AppServer_1 "Communicates with" eLearningODS-DBServer, and vice versa). The display algorithm will display the terminating arrows.

FIG. 30 illustrates a display for visualizing IT dependencies, in accordance with embodiments of the present invention. In FIG. 30, an arrow represents an IT dependency. Thus, Application eLearning_ap 1.7.2 requires presence of DB; more specifically, DB2; more specifically, UDBv7. Similarly, eLearning_ap 1.7.2 requires presence of Middleware; more specifically, ApplicationServer; more specifically, WAS (WebSphere Application Server); more specifically, WASv2. Similarly, DBv7 requires presence of an OS; more specifically, AIX; more specifically, AIXv4. Similarly, WASv2 requires presence of an OS; more specifically, AIX; more specifically, AIXv4. Similarly, AIXv4 requires presence of a Computer; more specifically, RS/6000.

The display algorithms described in the flow charts of FIGS. 22-24 are applicable to generating a display of IT dependencies as follows, using FIG. 30 for illustrative purposes in comparison with FIG. 21A. The rectangles of FIG. 30 (e.g., rectangle 4520) simulate the devices of FIG. 21A and more generally represent IT structure composition elements. The horizontal lines of FIG. 30 (e.g., horizontal line 4521) simulate the network segments of FIG. 21A. The vertical lines of FIG. 30 (e.g., vertical line 4522) simulate the vertical connectors of FIG. 21A.

Generally, the present invention discloses a method for generating a display of a configuration of IT dependencies among IT structure composition elements such that each displayed device represent an IT structure composition element (e.g., a hardware element, a software element, a labor or service entity, etc). The displayed horizontal segments and vertical connectors form paths such that each path links a first device with a second device and represents an IT dependency between the first device and the second device. Each path has two ends and either end or both ends of the path may have a terminating arrow to denote the asymmetry or symmetry of the dependency. A path is unidirectional if one end, and only one end, of the path has a terminating arrow denoting an asymmetric dependence (e.g., Application eLearning_ap 1.7.2 requires presence of DB). A path is bidirectional if both ends of the path has a terminating arrow denoting a symmetric dependence. All dependencies shown in FIG. 30 are asymmetric. The display algorithm will display the terminating arrows.

4. Generation of IT Structure Configuration Elements

An IT generator comprises software that generates a deliverable (i.e., an end result of a development activity) from knowledge of IT structures and/or other aspects of an IT development model. There are two types of generators: basic generators, which generate output in relation to any IT structure (e.g., a generator of a cross-reference listing); and extended generators, which generate output in relation to specific types of IT structures.

This section discloses extended generators for: firewall rule set generation; load balancing script generation, and generation of wrappers for non-compliant applications.

4.1 Firewall Rule Generation

Using a formal specification of an IT structure makes it possible to automatically generate firewall rules, thereby making firewall rule generation a more efficient process than a manual firewall rule generation process. Moreover, automatic firewall rule generation is less subject to human error and more readily accommodates dynamic changes in IT structures than is manual firewall rule generation. In addition, manual firewall rule generation may not able to effectively solve the firewall rule generation problem, such as: when several applications and/or several boxes share the same firewall; when the security-related infrastructure includes several objects (e.g., firewall, programmable switches); etc.

Automatic firewall rule generation facilitates proper definition of firewall objects and groups which increases the firewall efficiency (i.e. throughput). For example, for a subset of firewall-protected objects sharing the same network protocol, a single set of rules describing the same protocol is more efficient than specifying the protocol-related rules separately for each of the machines.

4.1.1 Use of IT Structures For Deriving Input For Firewall Rules

The IP address for a real IT structure is a real IP address. The IP address for any other IT structure is a unique integer which adheres to the IP address structure rules, but does not necessarily represent a valid IP address within a context of any particular delivery environment; i.e., any placeholder IP addresses are replaced with real IP addresses as a part of delivery binding.

Thus, to obtain information about network topology of an IT structure and required communications, one may use the method getPrimitiveRelationships( ) for an IT structure and examine all the ConnectsTo ITInterfaces referenced by all the CommunicationITRelationship classes obtained from the getPrimitiveRelationships( ) method.

4.1.2 Firewall Rule Generation Algorithm

The following assumptions are made in conjunction with the embodiments described herein with the understanding that a person skilled in the art should have no difficulty relaxing these assumptions as indicated infra for each assumption:

1) one network interface per computer (the scope of the invention generally includes multiple network interfaces per computer);

2) valid transports are Transmission Control Protocol (TCP) or User Datagram Protocol (UDP) (the scope of the invention generally includes any other applicable transport layer protocols that become standard or significantly utilized in the future);

3) UDP communications are symmetrical (the scope of the invention generally includes both symmetric and asymmetric UDP communications), wherein symmetric UDP communications allow bidirectional communication between two computers, and wherein asymmetric UDP communications allow only unidirectional communication between two computers; and 4) each software component can be a TCP server or a UDP server or both.

5) TCP or UDP clients are separated from corresponding servers by no more than one firewall (the scope of the invention generally includes multiple firewalls on a path between clients and servers).

A firewall rule includes "source", "destination", "protocol", and "action" values, where "action" is "deny" or "allow", "source" and "destination" are each a triplet of (IP address, netmask, IP transport port), and "protocol" is "TCP" or "UDP". The communications are assumed to be initiated from the source and directed at the destination. When a firewall is configured, the embodiments described herein utilize the default firewall rule is that nothing is allowed (default action is "deny"), and any permitted communications are permitted as a result of added explicit firewall rules with action "allow". However, the scope of the present invention also includes embodiments in which the default firewall rule is that the data transmission is allowed (default action is "allow"), and any forbidden communications are forbidden as a result of added explicit firewall rules with action "deny".

The firewall rule denies or allows data transmission from the IP transport port of the "source" to the IP transport port of the "destination".

Figure 31A:
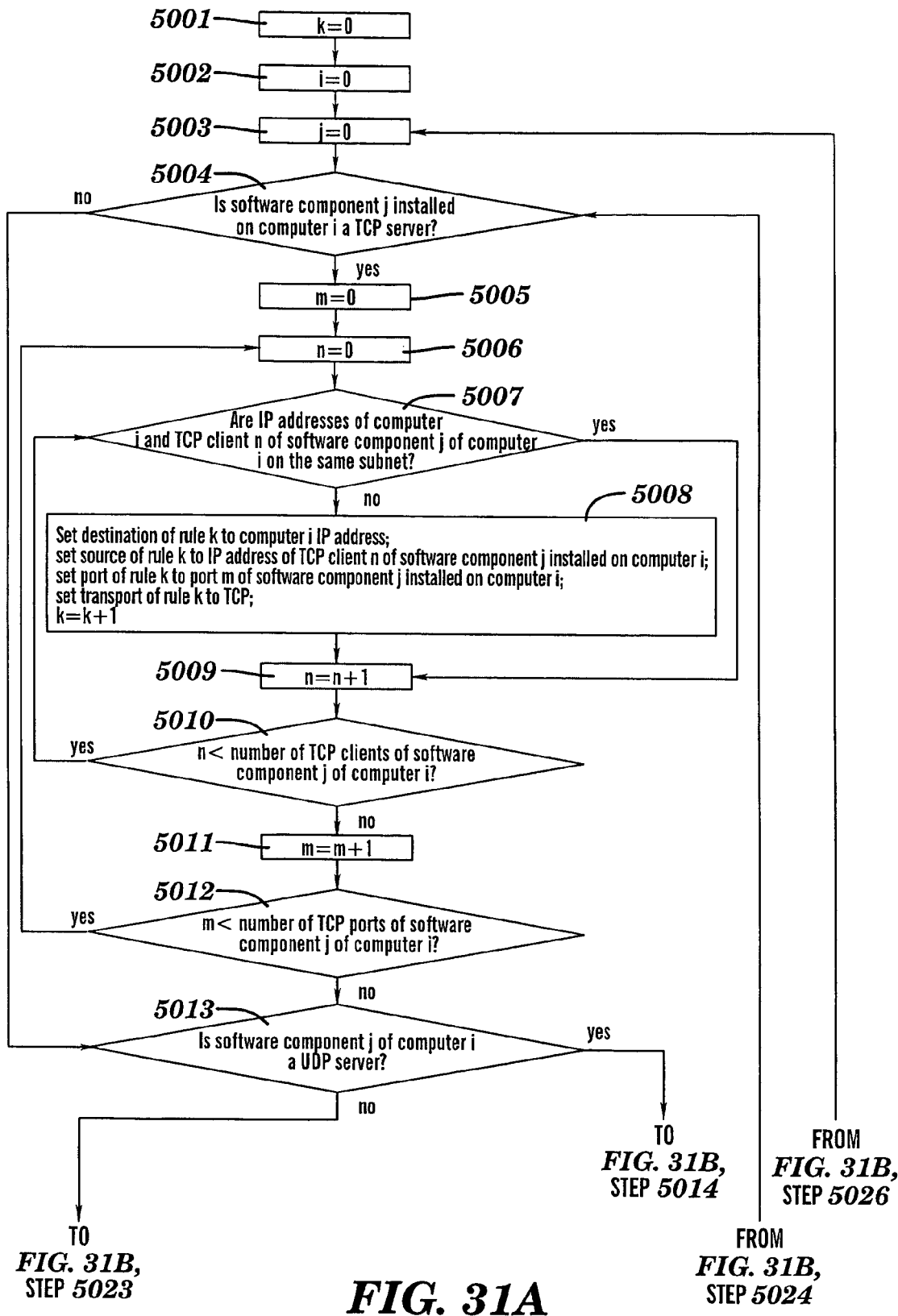
FIGS. 31A-31C is a flow chart describing firewall rule generation and assignment of the generated firewall rules to firewalls, in accordance with embodiments of the present invention.
Figure 31B:
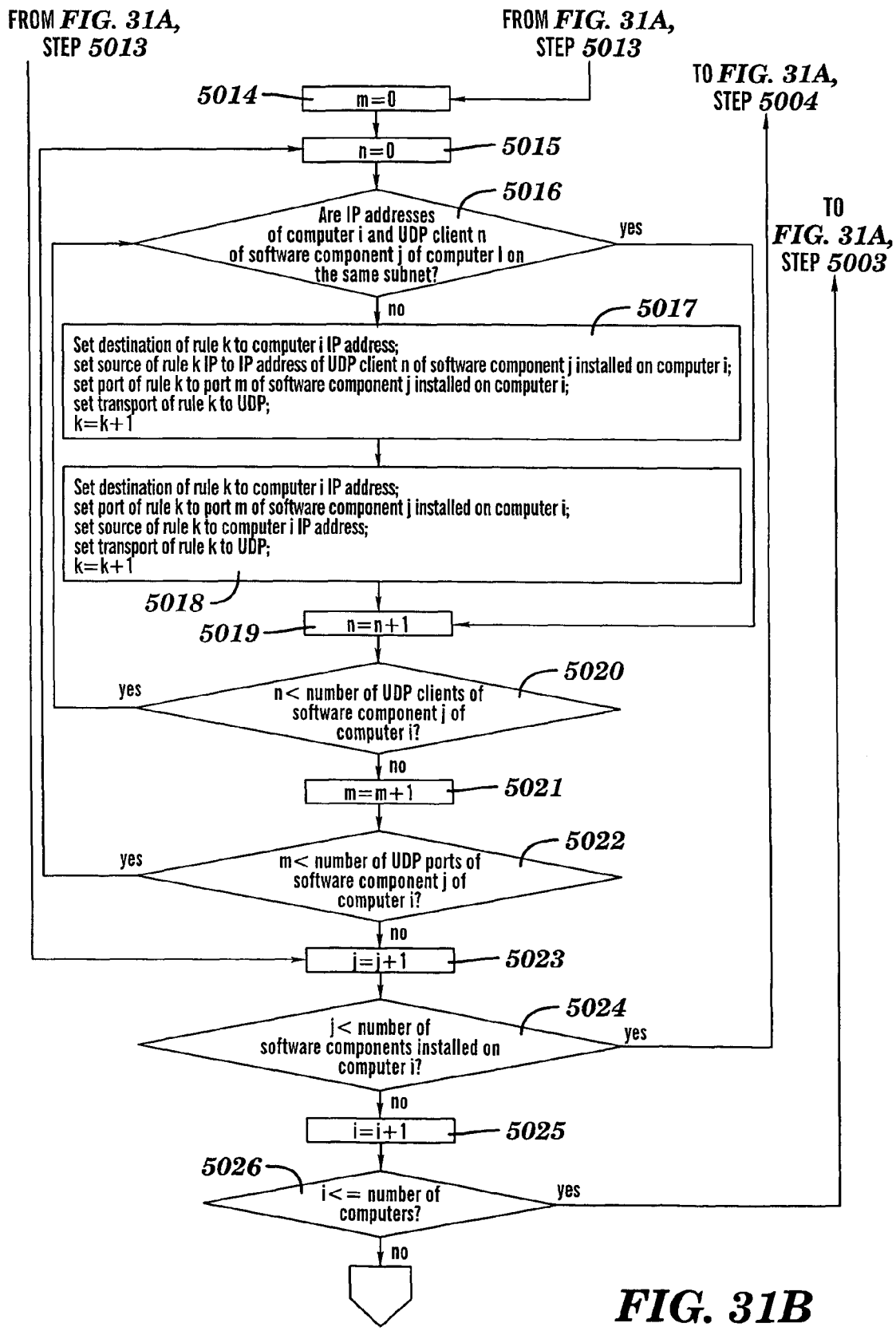
Figure 31C:
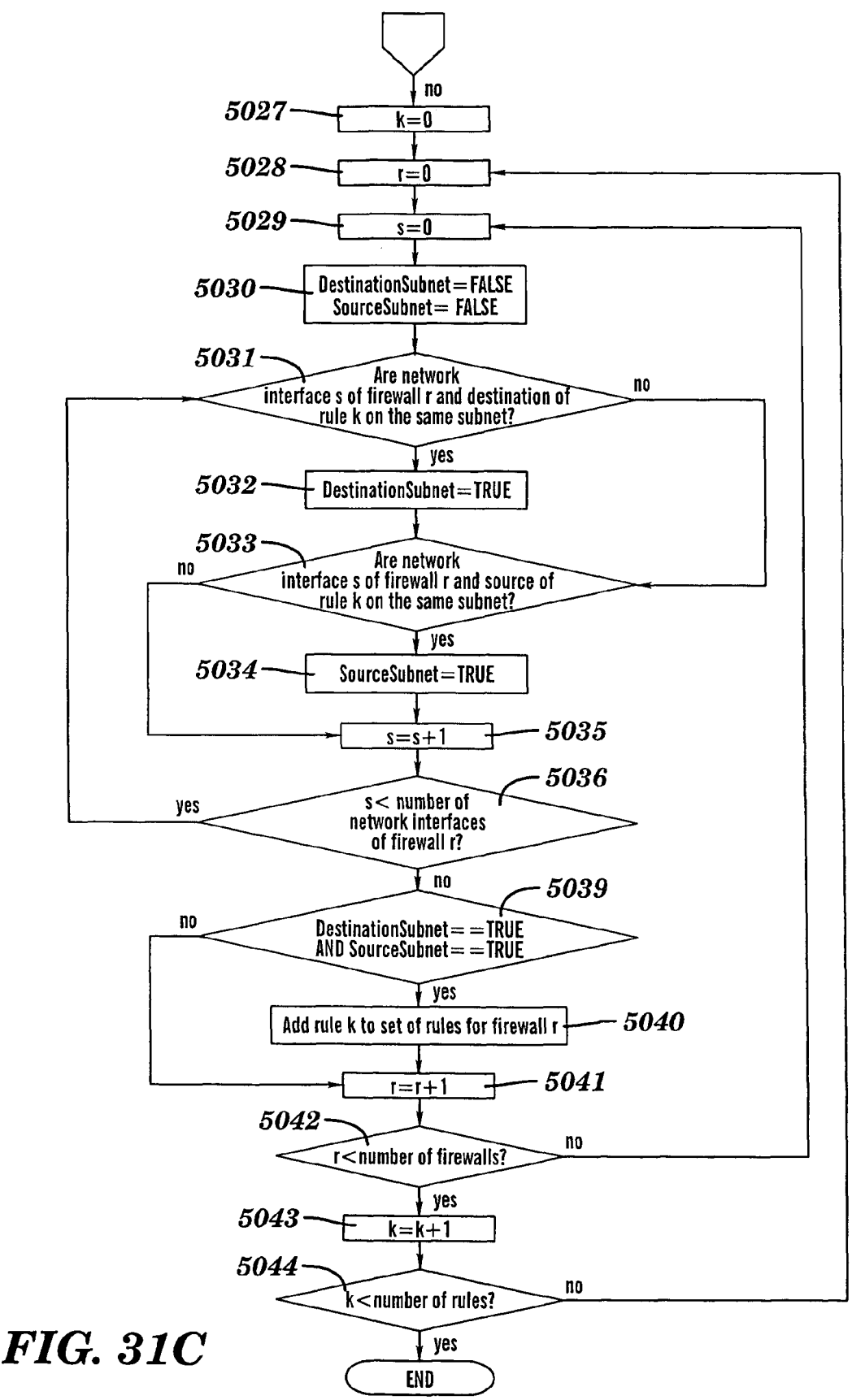

FIGS. 31A-31C (collectively, FIG. 31) is a flow chart comprising steps 5001-5041 which describe firewall rule generation and assignment of the generated firewall rules to firewalls, in accordance with embodiments of the present invention. FIGS. 31A-31B comprise steps 5001-5026 (firewall rule generation), whereas FIG. 31C comprises steps 5027-5041 (assignment of generated firewall rules)

The counters k, i, j, m, and n in FIGS. 31A-31B are used as follows. Counter k indexes the firewall rules. Counter i indexes the computers within an IT structure primitive composition. Counter j indexes the software components installed on a given computer. Counter m indexes TCP ports and UDP ports on which a software component is listening. Counter n indexes clients of a given software component. A "client" is a program or a computer. Counter r indexes firewalls. Counter s indexes network interfaces of a given firewall.

Step 5001 initializes counter k (corresponding to firewall rule k) to zero. The method iterates through all the computers i in the given IT structure primitive composition, using the loop over counter i comprising steps 5003-5026. Method getPrimitiveComposition( ) is used to obtain the list of entities comprising the IT structure. The list of computers is obtained as a subset of the entities comprising the IT structure, returned by the getPrimitiveComposition( ) method.

Counter i is initialized to zero in step 5002.

For each computer i, the method iterates through the software components j installed on the computer i, using the loop over j comprising steps 5004-5024. Method getPrimitiveComposition( ) is used to obtain the list of entities comprising an IT structure. Method getPrimitiveRelationships( ) is used to obtain the list of relationships among the primitive composition of the IT structure. The list of software components installed on a computer is obtained by generating the list of computers and the list of software components as subsets of the IT structure primitive composition. Then, the list of IT relationship is subset to installation IT relationships, and these are used to correlate software components with computers on which software components are installed.

Counter j is initialized to zero in step 5003.

In steps 5004 to 5012, firewall rules for TCP servers are generated for computer i, and in steps 5013 to 5020, firewall rules for UDP servers are generated for computer i.

The first step 5004 of steps 5004-5012 for generating firewall rules for TCP servers ascertains whether the j-th software component installed on i-th computer is a TCP server as follows.

If the j-th software component installed on i-th computer is not a TCP server, then the method branches to step 5013 so as to bypass TCP port processing.

If the j-th software component installed on i-th computer is a TCP server, then step 5005 initializes the TCP port counter m to zero, and the method iterates through all TCP ports m on which the software component j is listening in steps 5006-5012. Step 5006 initializes client counter n to zero.

Step 5007 ascertains whether the computer's IP address (IPAddr1) and the n-th TCP client's IP address (IPAddr2) belong to the same subnet. A "subnet" is defined by the IP protocol definition as "network segment in which any two communicating entities can communicate directly (in one hop)". Step 5007 is implemented by ascertaining whether the expression (IPAddr1 .AND. NetMask1) .XOR. (IPAddr2 .AND. NetMask2) is equal to 0. "Netmask" is defined by the IP protocol as "a four-byte number (represented in the decimal notation the same way as IP address), where (in its binary representation) 0 correspond to the portion of the IP address used to address the host inside the subnet, and 1 correspond to the portion of the IP address used to address the subnet in the Internet"). The terminology "same subnet" and "common subnet" have the same meaning herein.

If the condition in step 5007 is satisfied, then the method bypasses the firewall generation of step 5008 and next performs step 5009, because the source and destination IP addresses are on the same subnet, and therefore do not have any routers (including firewalls) between them.

If the condition in step 5007 is not satisfied, then the k-th firewall rule is generated in step 5008 by specifying: the computer's IP address as comprised by the "destination" component of the firewall rule; n-th client IP address as comprised by the "source" component of the firewall rule; m-th TCP port as the IP transport port comprised by the "destination" component of the firewall rule; "TCP" as the "protocol" component of the firewall rule; and "allow" as the "action" component of the firewall rule unless it is necessary to trigger some additional action (e.g., logging, following a denial of a particular traffic pattern). Any TCP port of computer i may be the IP transport port comprised by the "destination" component of the firewall rule. The netmask for both the "source" and "destination" components of the firewall rule is determined in accordance with the IP protocol definition stated supra.

After the k-th firewall rule is generated, the counter k of the firewall rules is incremented by 1 such that the incremented value of k points to the next firewall rule to be generated, followed by execution of step 5009.

Step 5009 increments counter n of the TCP clients by 1 for the given software component j to point to the next TCP client n.

Step 5010 ascertains whether n is less than the number of TCP clients of the j-th software component. If n is less than the number of TCP clients of the j-th software component (i.e., the list of the TCP clients for the given software component j is not yet exhausted), then the method loops back to step 5007; otherwise step 5011 increments the port counter m by 1 for the given software component j.

Step 5012 determines whether m, which points to the TCP port currently being processed, is less than the number of TCP ports for the given software component j. If m is less than the number of TCP ports for the given software component j, then the method loops back to step 5006; otherwise step 5013 is next performed.

In steps 5013 to 5020, firewall rules for UDP servers are generated for computer i. Step 5013 ascertains whether the j-th software component installed on i-th computer is a UDP server. If the j-th software component installed on i-th computer is not a UDP server, then the method branches to step 5023 so as to bypass UDP port processing.

If the j-th software component installed on i-th computer is a UDP server, then step 5014 initializes UDP port counter m to zero, and the method iterates through all UDP ports m on which the component is accepting datagrams.

Step 5015 initializes client counter n to zero. Step 5016 ascertains whether the computer's IP address and the n-th UDP client's IP address belong to the same subnet, which is done by ascertaining that the expression (IPAddr1 .AND. NetMask1) .XOR. (IPAddr2 .AND. NetMask2) is equal to 0. For simplicity, the preceding expression does not cover the case of one subnet being a proper substring of the other. Persons skilled in the art will understand that the preceding expression can be expanded to cover subnet mask values of different lengths.

If the preceding condition in step 5016 is satisfied, then the method bypasses the firewall generation of steps 5017-5018 and next performs step 5019, because the source and destination IP addresses are on the same subnet, and therefore do not have any routers (including firewalls) between them.

If the preceding condition in step 5016 is not satisfied, then a pair of symmetrical firewall rules is next generated. The first firewall rule of the pair is generated in step 5017, and the second firewall rule of the pair is generated in step 5018.

In step 5017, the first firewall rule of the pair is generated in step 5017 as firewall rule k by specifying: the computer's IP address as comprised by the "destination" component of the firewall rule; n-th client IP address as comprised by the "source" component of the firewall rule; m-th UDP port as the IP transport port comprised by the "destination" component of the firewall rule; UDP as the "protocol" component of the firewall rule; and "allow" as the "action" component of the firewall rule unless it is necessary to trigger some additional action (e.g., logging, following a denial of a particular traffic pattern). Any UDP port of computer i may be the IP transport port comprised by the "destination" component of the firewall rule. The netmask for both the "source" and "destination" components of the firewall rule is determined in accordance with the IP protocol definition stated supra. After the first firewall rule is generated, the counter k of the firewall rules is incremented by 1 such that the incremented value of k points to the second firewall rule of the pair to be generated in step 5018.

In step 5018, the second firewall rule of the pair is generated as firewall rule k in step 5018 by specifying: n-th client IP address as comprised by the "destination" component of the firewall rule, the computer's IP address as comprised by the "source" component of the firewall rule, m-th UDP port as the IP transport port comprised by the "destination" component of the firewall rule, UDP as the "protocol" component of the firewall rule; and "allow" as the "action" component of the firewall rule unless it is necessary to trigger some additional action (e.g., logging, following a denial of a particular traffic pattern). Any UDP port of computer i may be the IP transport port comprised by the "destination" component of the firewall rule. The netmask for both the "source" and "destination" components of the firewall rule is determined in accordance with the IP protocol definition stated supra. After the second firewall rule is generated, the counter k of the firewall rules is incremented by 1 such that the incremented value of k points to the next firewall rule to be generated, followed by execution of step 5019.

Step 5019 increments counter n of the UDP clients by 1 for the given software component j to point to the next UDP client n.

Step 5020 ascertains whether n is less than the number of UDP clients of the j-th software component. If n is less than the number of UDP clients of the j-th software component (i.e., the list of the UDP clients for the given software component j is not yet exhausted), then the method loops back to step 5016; otherwise step 5021 increments the port counter m by 1 for the given software component j.

Step 5022 determines whether m, which points to the UDP port currently being processed, is less than the number of UDP ports for the given software component j. If m is less than the number of UDP ports for the given software component j, then the method loops back to step 5015; otherwise step 5023 is next performed.

In step 5023, the counter j of the software components installed on the i-th computer is incremented by 1.

Step 5024 determines if all software components for the computer i have been processed. If all software components installed on computer i have been not been processed, then the method loops back to step 5004 to process the next software component installed on computer i. If all software components installed on computer i have been processed, then step 5025 is next executed.

In step 5025, the counter i of the computers within the given IT structure primitive composition is incremented by 1.

Step 5026 determines whether all computers have been processed. The number of computers is determined as the size of the list of computers obtained by subsetting the output of the getPrimitiveComposition( ) method of the IT structure. If all computers have not been processed, then the method loops back to step 5003 to process the next computer as designated from incrementing i in step 5025. If all computers have been processed, then step 5027 is next executed in FIG. 31C.

The generated firewall rules are stored as an attribute of a Firewall class instance using method setRules( ).

In steps 5027-5042 of FIG. 31C, the method iterates through all the firewall rules previously generated in steps 5001-5026 of FIGS. 31A-31B and assigns each firewall rule to the appropriate firewall based upon IP address of the source and destination components of the firewall rule.

The counters k, r, and s in FIG. 31C are used as follows. Counter k indexes the firewall rules. Counter r indexes firewalls within the given IT structure primitive composition. Counter s indexes network interfaces of firewall r.

Step 5027 initializes counter k (corresponding to firewall rule k) to zero.

In step 5028, the counter r of the firewalls within the given IT structure primitive composition is initialized to zero. The list of firewalls is obtained by subsetting the output of the getPrimitiveComposition( ) method of the IT structure to the list of objects of class Firewall.

In step 5029, the counter s of the network interfaces of firewall r is initialized to zero. The list of network interfaces is obtained by subsetting the output of the getInterfaces( ) method of firewall r to the ConnectsTo subclass list.

In step 5030, Boolean variables DestinationSubnet and SourceSubnet are initialized with FALSE value. Per previous assumption, either no firewall or a single firewall may be placed between a source and a destination. At this point in the method processing, all firewall rules have been generated and are kept together in a single list. It is now necessary to assign each of the generated firewall rules to the appropriate firewall, as performed by the subsequent steps. The method iterates through all firewall rules (index k), all firewalls (index r), and all network interfaces (index s). The method adds a firewall rule k to only those firewalls r where both the "source" and the "destination" portions of firewall rule k are located on the same subnet with the network interface of a single firewall. This is designed by both DestinationSubnet and SourceSubnet having the values of TRUE, and indicates that a firewall for which this firewall rule pertains has been found. If DestinationSubnet and SourceSubnet both have values of FALSE, this indicates that no firewall separates this client from this server (a permissible Condition).

Step 5031 ascertains whether the s-th network interfaces of the r-th firewall and the destination component's IP address of the k-th firewall rule belong to the same subnet, which is implemented by ascertaining whether the expression (IPAddr1 .AND. NetMask1) .XOR. (IPAddr2 .AND. NetMask2) is equal to 0. For simplicity, the preceding expression does not cover the case of one subnet being a proper substring of the other. Persons skilled in the art will understand that the preceding expression can be expanded to cover subnet mask values of different lengths.

If the condition in step 5031 is not satisfied, then the method branches to step 5033. If the condition in step 5031 is satisfied, then step 5032 is next executed, which sets the Boolean variable DestinationSubnet to the value of TRUE.

In step 5033, the method ascertains whether the s-th network interfaces of the r-th firewall and the source component's IP address of the k-th firewall rule belong to the same subnet, which is implemented by ascertaining whether the expression (IPAddr1 .AND. NetMask1) .XOR. (IPAddr2 .AND. NetMask2) is equal to 0.

If the condition in step 5033 is not satisfied, then the method branches to step 5035. If the condition in step 5033 is satisfied, then step 5034 is next executed, which sets the Boolean variable SourceSubnet to the value of TRUE.

In step 5035, the counter s of the network interfaces of r-th firewall is incremented by 1.

Step 5036 determines whether all network interfaces of the r-th firewall have been processed. If all network interfaces of the r-th firewall have not been processed, then the method loops back to step 5031 to process the next network interface s of the r-th firewall. If all network interfaces of the r-th firewall have been processed, then step 5039 is next executed.

In step 5039, the method ascertains whether both DestinationSubnet and SourceSubnet are TRUE. If both DestinationSubnet and SourceSubnet are not both TRUE, then the methods branches to step 5041; otherwise step 5040 is next executed. In step 5040, the k-th firewall rule is appended to the ruleset of r-th firewall via setRules( ) method as explained supra.

In step 5041, the counter r of firewalls within the given IT structure primitive composition is incremented by 1.

Step 5042 determines whether all firewalls have been processed. If all firewall have not been processed, then the method loops back to step 5029 to process the next firewall. If all firewall have been processed, then step 5043 is next executed.

In step 5043, the counter k of firewall rules generated is incremented by 1.

Step 5044 determines whether all firewall rules have been processed. If all firewall rules have not been processed, then the method loops back to step 5028 to process the next firewall rule otherwise, the method ends.

4.1.3. Firewall Rules Generation Example

Figure 32:
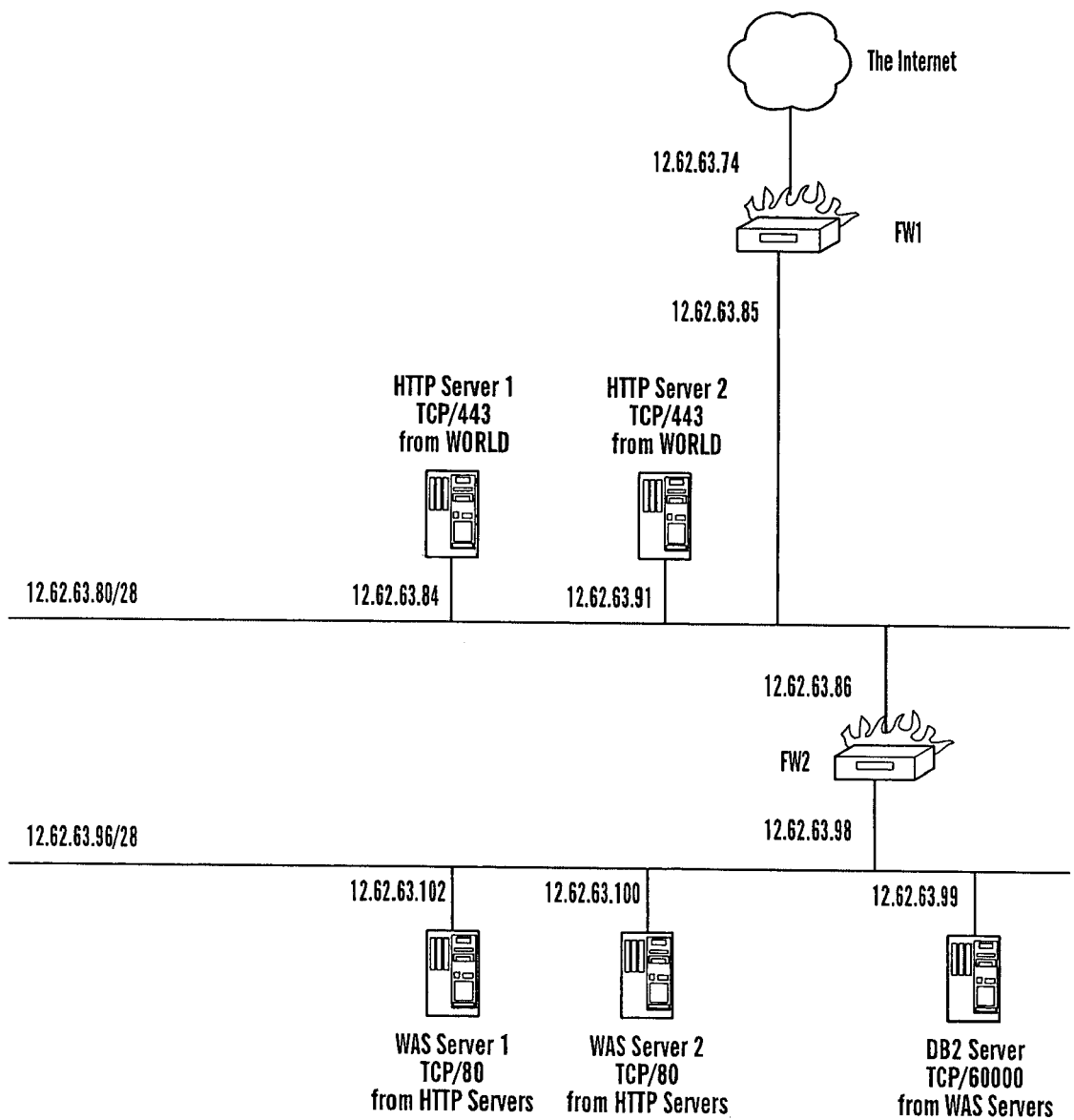
FIG. 32 depicts a configuration illustrating the method of FIGS. 31A-31B, in accordance with embodiments of the present invention.

FIG. 32 depicts a sample configuration illustrating the method of FIGS. 31A-31C, in accordance with embodiments of the present invention. In FIG. 32, the sample configuration comprises:

1) a front end (Internet-facing) firewall FW1 interconnecting the Internet and the presentation tier subnet 12.62.63.80/28;

2) a back end (business and data tier firewall) FW2 interconnecting the presentation tier subnet 12.62.63.80/28 and the business and data tier subnet 12.62.63.96/28;

3) two HTTP servers: 12.62.63.84 and 12.62.63.91 connected to the presentation tier subnet;

4) two WAS servers: 12.62.63.100 and 12.62.63.102 connected to business and data tier subnet; and 5) DB2 server 12.62.63.99 connected to the business and data tier subnet;

The relevant software components are running on the servers as follows:

1) HTTP Server software component on HTTP Servers 1 and 2;

2) WAS Server software component on WAS Servers 1 and 2; and

3) DB2 Server software component on DB2 Server

Browser clients from any location on the Internet (0.0.0.0) are to be permitted to connect to the HTTP Servers 1 and 2.

HTTP Servers 1 and 2 serve any static content and also redirect incoming HTTP requests to WAS Servers 1 and 2 for any dynamic content. No Internet-based browser client is allowed to connect to WAS Servers 1 and 2 directly. Hence, HTTP connections to WAS Servers 1 and 2 are only allowed from HTTP Servers 1 and 2.

DB2 client connections to Database Server are only allowed from WAS Servers 1 and 2.

For the described sample configuration, the corresponding IT structure would comprise the following objects (only relevant properties of the IT entities are shown for clarity) shown in Tables 4A and 4B.

TABLE 4A

| | Firewalls: | |
|---|---|---|
| Firewall name | IP address of the Network Interface 1 | IP address of the Network Interface 2 |
| FW1 | 12.62.63.74 | 12.62.63.85 |
| FW2 | 12.62.63.86 | 12.62.63.98 |

TABLE 4B

| | | Servers: | | | |
|---|---|---|---|---|---|
| Server name | IP address of the Network Interface | Software Component 1 | | | |
| | | Name | Protocol | Port | Clients |
| HTTP Server 1 | 12.62.63.84 | HTTP Server | TCP | 443 | 0.0.0.0 |
| HTTP Server 2 | 12.62.63.91 | HTTP Server | TCP | 443 | 0.0.0.0 |
| WAS Server 1 | 12.62.63.102 | WAS Server | TCP | 80 | 12.62.63.84, 12.62.63.91 |
| WAS Server 2 | 12.62.63.100 | WAS Server | TCP | 80 | 12.62.63.84, 12.62.63.91 |
| DB2 Server | 12.62.63.99 | DB2 EE | TCP | 60000 | 12.62.63.100, 12.62.63.102 |

Table 4C depicts the firewall rules that will be produced by the firewall rule generation algorithm:

TABLE 4C

| | Source | | Destination | | | | |
|---|---|---|---|---|---|---|---|
| Rule No. | IP address | Port | IP address | Port | Protocol | Action | Assigned to Firewall |
| 1 | 0.0.0.0 | Any | 12.62.63.84 | 443 | TCP | Allow | FW1 |
| 2 | 0.0.0.0 | Any | 12.62.63.91 | 443 | TCP | Allow | FW1 |

TABLE 4C-continued

| Rule No. | Source IP address | Port | Destination IP address | Port | Protocol | Action | Assigned to Firewall |
|---|---|---|---|---|---|---|---|
| 3 | 12.62.63.84 | Any | 12.62.63.102 | 80 | TCP | Allow | FW2 |
| 4 | 12.62.63.91 | Any | 12.62.63.102 | 80 | TCP | Allow | FW2 |
| 5 | 12.62.63.84 | Any | 12.62.63.100 | 80 | TCP | Allow | FW2 |
| 6 | 12.62.63.91 | Any | 12.62.63.100 | 80 | TCP | Allow | FW2 |

4.2 Load Balancing Script Generation

A load balancer distributes software application executions efficiently among a group of servers so that no individual server is overburdened. Each such group of servers is called a "load balance group". A load balancer may be a commercially available load balancer identified by a make and model. Alternatively, the load balancer may be an in-house load balancer, a customized load balancer, etc.

In order to function, the load balancer is provided with load balancing rules comprising: specification of the load balance groups, a load balancing algorithm for each load balancing group, and the input parameters required by the load balancing algorithms being utilized.

The present invention discloses automatic generation of the load balancing rules, which may take the form of an executable script in the rule definition language of the load balancer being used.

4.2.2 Load Balancing Rule Generation Algorithm

The load balancing rule generation algorithm comprises the following high-level steps:

1) define load balanced groups;
2) for each load balanced group, define load balancing mechanism and its parameters and define session persistence mechanism; and
3) generate the load balancing script in the rule definition language of the load balancer being used.

Load balanced groups may be defined, in an embodiment, programmatically by cycling through the ITServers associated with each of Programs in the IT structure primitive composition and returning, as the result, the lists of ITServers running instances of the same Program and located on the same subnet, wherein each of the said lists is then designated as a load balanced group. In another embodiment, the definition of load balanced groups is performed interactively by the user via GUI by clicking on the displayed images of the computers comprising every group to be load balanced, and then selecting the software application, requests to which should be load balanced. Each load balanced group comprises a plurality of computers or servers.

For each load balanced group, a load balancing mechanism and its parameters may be defined, based upon the heuristic rules described herein. If the expected server load triggered by a single transaction is high, then the load balancing mechanism to be used is Least Load. If the expected server load triggered by a single transaction is small to medium, then the load balancing mechanism to be used is Round Robin. Finally, if the expected server load triggered by a single transaction is unknown, then Fastest Response load balancing mechanism is to be used. The expected server load triggered by a single transaction is defined by the value of the property ExpectedTxLoad of the class Program.

The "Round Robin" load balancing mechanism assigns servers in a looping fashion from a sequential list of servers. The server IP address at the top of the list is assigned to the next new session and then moves to the bottom of the list; the next server IP address at the top of the list is handed out to the next new session and then moves to the bottom of the list; etc.

The "Least load" load balancing mechanism assigns to the next new session the server having the minimum load (e.g., CPU utilization, or other appropriate metric).

The "Fastest response" load balancing mechanism assigns to the next new session the server having the fastest time of response to the request for service (based on current activity, or as measured by a test request).

For each load balanced group, session persistence mechanism may be defined, based upon the heuristic rules described herein. Session persistence is the mechanism guaranteeing that the load balancer would send all the requests pertaining to the same application session to the same server for the duration of the application session. There are several known ways of providing the session persistence, including: 1) source IP/port based (the load balancer forwards IP packets with the same source IP or source IP/protocol/port triplet to the same server); 2) cookie-based (the load balancer inserts a string representing the session ID into a cookie returned to the client with the first HTTP response); and 3) URL-based (the load balancer inserts a string representing the session Id into URL before sending HTTP redirect to the client).

If the application program, requests to which should be load balanced, does not support or use user sessions, then no session persistence needs to be provided by the load balancer, and any incoming request should be load balanced according to the load balancing mechanism selected. Otherwise, requests pertaining to the same session need to be forwarded to the same instance of the application. If the clients of the application are not Internet-based nor use NATted or otherwise masqueraded IP addresses, then source IP/port based session persistence mechanism is to be used. Otherwise, if the cookies are allowed in the application, then the cookie-based load balancing mechanism is to be used. Otherwise, URL-based session persistence mechanism is to be used.

Figure 33A:
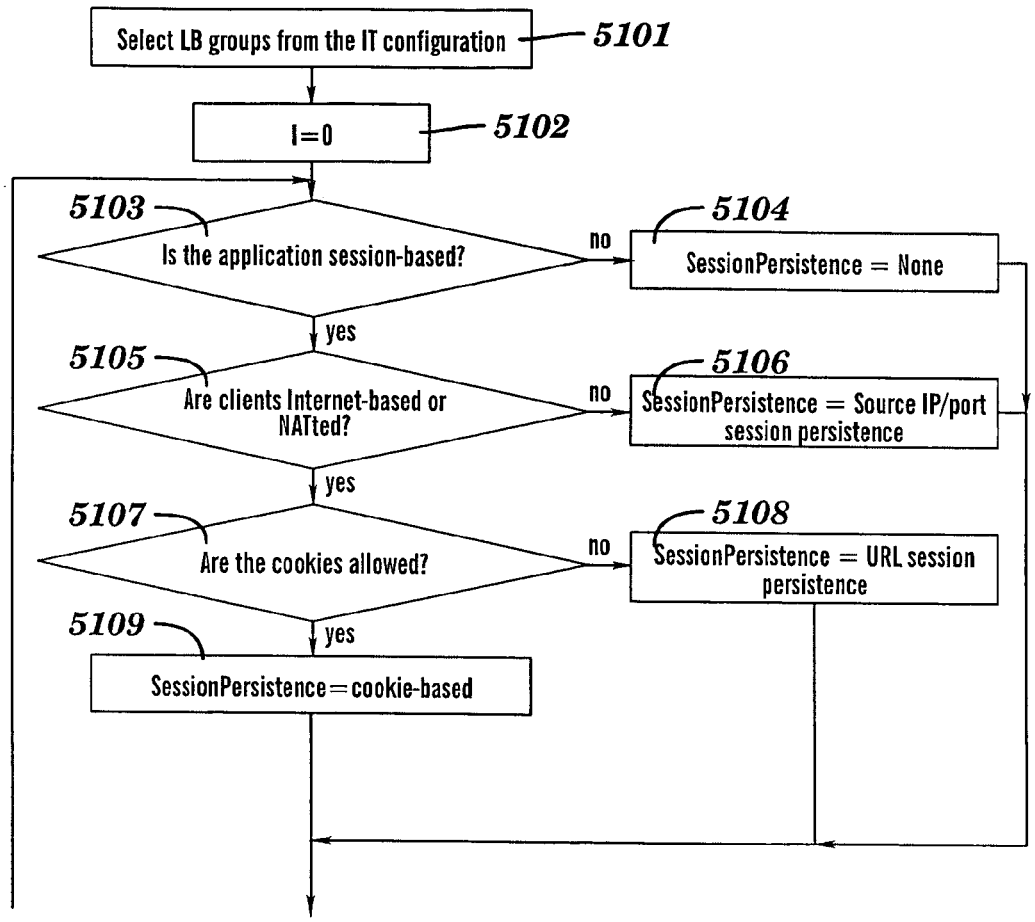
FIGS. 33A-33B is a flow chart depicting a method for load balancing rule generation, in accordance with embodiments of the present invention.
Figure 33B:
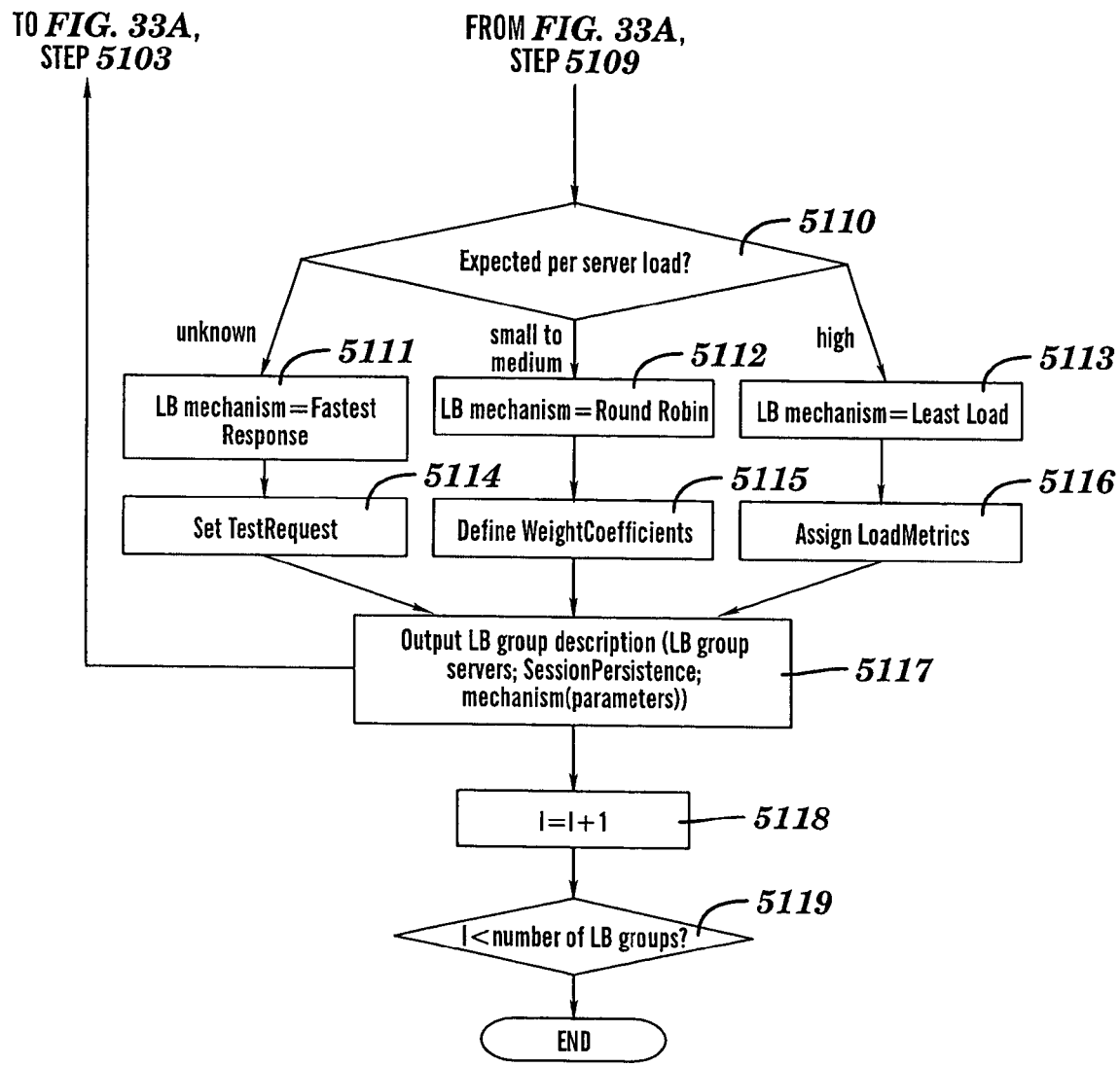

FIGS. 33A-33B (collectively, FIG. 33) is a flow chart comprising steps 5101-5119 which describe a load balancing rule generation algorithm, in accordance with embodiments of the present invention.

In step 5101, the load balanced groups are selected (either by the user via GUI by clicking on the computers comprising every group, or by iteratively cycling through the ITServers associated with Programs in the IT structure primitive composition running instances of the same Program and located on the same subnet and returning, as the result of every iteration, the list of ITServers belonging to a single load balanced group). The counter I is a load balance group number index.

The method iterates through the load balanced groups using the counter I initialized in step 5102.

In steps 5103 through 5109, the session persistence mechanism is specified.

In step 5103, based on the value of isSessionBased property of the Program object, the decision is made whether session persistence is required for this load balanced group. If the application is not session based, then SessionPersistence variable is assigned the value of None in Step 5104, and the processing continues at step 5110. Otherwise, the session persistence mechanism needs to be chosen in Steps 5105-5109 below.

In Step 5105 the method cycles through the list of the application clients to ascertain whether those are Internet-based or using NATted IP addresses (i.e., IP addresses produced by Network Address Translation). If there are no such clients, then SessionPersistence variable is assigned the value of "Source IP/port-based session persistence" in Step 5106, and the processing continues at step 5110. Otherwise, the method ascertains whether the use of cookies is allowed by the load balancer equipments used, as well as by the local policies. If yes, then SessionPersistence variable is assigned the value of "cookie-based" in Step 5109, and the processing continues at step 5110. Otherwise, SessionPersistence variable is assigned the value of "URL-based session persistence" in Step 5108, and the processing continues at step 5110.

In steps 5110 through 5116, the load balancing mechanism and its parameters are specified. The load balanced mechanism is selected by the method (Fastest Response, Round Robin, Least Load) based upon the expected server load (which is a property of the application to be load balanced). "Server load" is defined as metrics, comprising CPU utilization of the server, RAM utilization of the server, network bandwidth utilization of the server NIC, or a combination thereof computed based on a predetermined formula, or a metric based on some other characteristics of a server execution of workload. A load "range" of server load may be expressed as a percent range or as "unknown" if the server load is unknown.

If the expected server load is unknown, then the variable LBmechanism gets assigned the value of "Fastest response" in step 5111. In step 5114, the TestRequest variable is assigned the default value based upon the type of the application being load balanced (e.g. "get/index.html" for HTTP servers).

If the expected server load is small to medium (e.g., within a range of 30-50%), then the variable LBmechanism gets assigned the value of "Round robin" in step 5112. In step 5115, the weight coefficients $k_1, k_2, \ldots$, for servers 1, 2, ..., respectively, are defined by the method as being proportional to the servers' capacity (CPU and RAM). If the expected server load is high (e.g., within a range of greater than 50%), then the variable LBmechanism gets assigned the value of "Least load" in step 5113. In step 5116, the LoadMetrics variable gets assigned, in the preferred embodiment, the default value of "% CPU", or, in another embodiment, "remaining RAM", or in another embodiment, the network traffic generated by the application, or in yet another embodiment, a linear combination of all or some of the above factors.

Although FIG. 33 illustrates three load balancing mechanisms relating to steps 5111-5113, the present invention generally permits selection of a load balancing mechanism from two or more load balancing mechanisms. The two or more load balancing mechanisms respectively correspond to two or more ranges of server load. The selected load balancing mechanism corresponds to a determined or unknown server load.

In step 5117, a LB group description gets generated based upon the values of the properties of the ITLBGroup object defined supra, in accordance with the load balanced equipment as defined in the IT structure primitive composition. The generated LB group description may be outputted on a tangible medium (e.g., computer screen, printed paper, magnetic storage medium such as a disk or hard drive, an optical storage device, etc.)

In step 5118, the counter I of the load balanced groups gets incremented, and in step 5119 the method loops back to step 5103 if the list of the load balanced groups is not yet exhausted.

The load balancing algorithm of FIG. 33 may be implemented in computer code such as in a load balancing script in the rule definition language of the load balancer being used.

4.2.3. Load Balancing Rules Generation Example.

Figure 34:
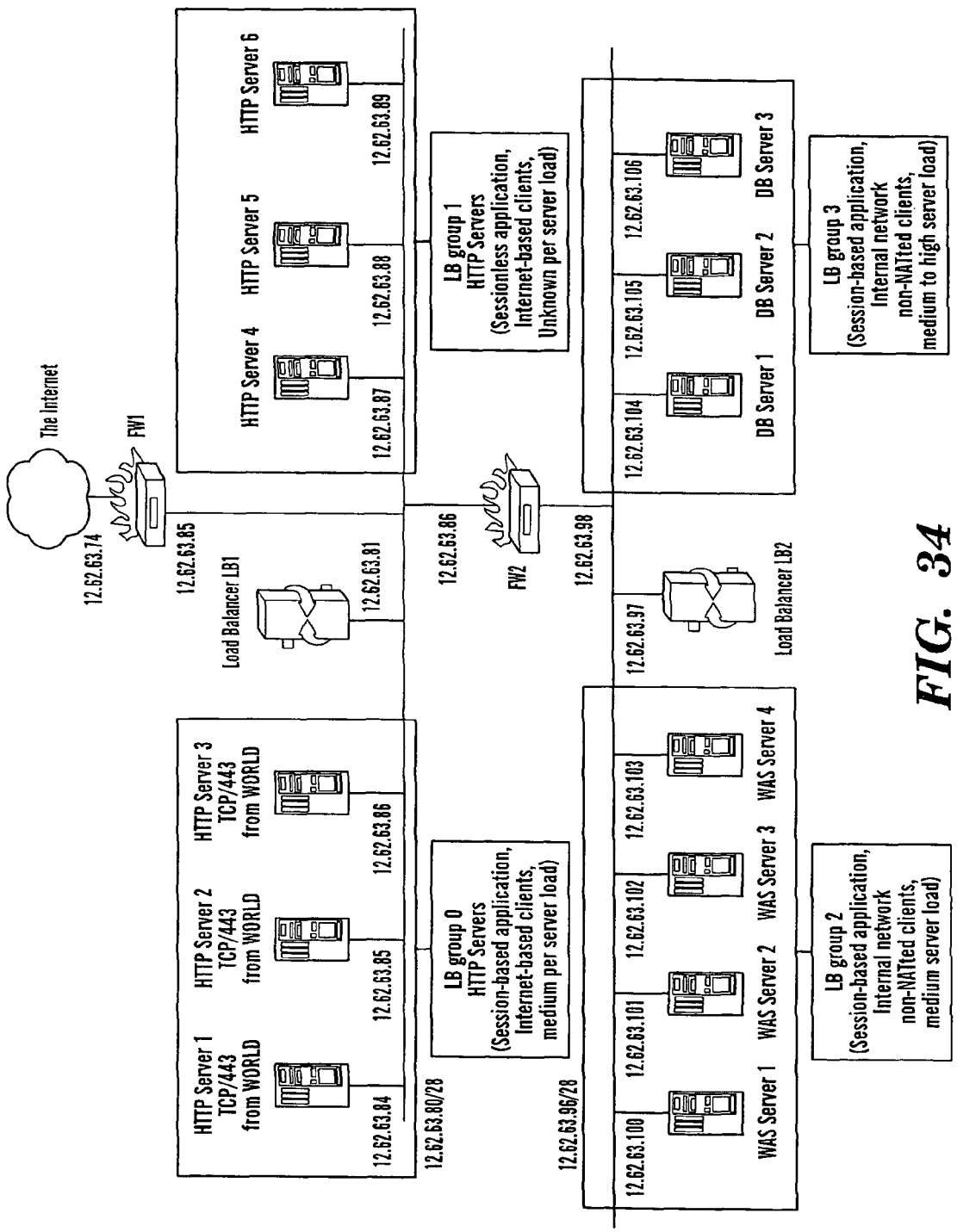
FIG. 34 depicts a configuration illustrating the method of FIG. 33, in accordance with embodiments of the present invention.

FIG. 34 depicts a sample load balancing configuration illustrating the method of FIG. 33, in accordance with embodiments of the present invention. In FIG. 34, the sample load balancing configuration comprises:

1) a front end (Internet-facing) firewall FW1 interconnecting the Internet and the presentation tier subnet 12.62.63.80/28;

2) a load balancer (LB1) 12.62.63.81 connected to the presentation tier subnet 12.62.63.80/28;

3) a back end (business and data tier firewall) FW2 interconnecting the presentation tier subnet 12.62.63.80/28 and the business and data tier subnet 12.62.63.96/28;

4) a load balancer (LB2) 12.62.63.97 connected to the business and data tier subnet 12.62.63.96/28;

5) six HTTP servers: 12.62.63.84-89 connected to the presentation tier subnet;

6) four WAS servers: 12.62.63.100-103 connected to the business and data tier subnet; and 7) three Database servers 12.62.63.104-106 connected to the business and data tier subnet.

The relevant software components are running on the servers as follows:

1) HTTP Server software component on HTTP Servers 1-6;

2) WAS Server software component on WAS Servers 1-4;

3) DB2 Server software component on DB Servers 1-3.

HTTP Servers 1-3 are serving the static content and forwarding the dynamic content requests to an application running on WAS servers 1-4. Thus, the HTTP Servers 1-3 are serving a session-based application with Internet-based browser clients. The expected server load triggered by a single transaction on the HTTP Servers 1-3 is medium (e.g., 30-50%).

HTTP Servers 4-6 are only serving static content to Internet-based browser clients. Thus, no user sessions are required or supported. The expected server load triggered by a single transaction on the HTTP Servers 4-6 is unknown.

WAS Servers 1-4 are running session-based application, user requests to which are relayed through HTTP Servers 1-3. Thus, the application clients reside on the Internal non-NATted network. The expected server load triggered by a single transaction on the WAS Servers 1-4 is medium (e.g., 30-50%).

Database Servers 1-3 are running the database server application whose clients reside on the WAS Servers 1-4.

For the described sample configuration, the corresponding IT structure would comprise the following objects (only relevant properties of the IT entities are shown for clarity) in Tables 5A and 5B as a result of a script in the rule definition language of the load balancers LB1 and LB2.

TABLE 5A

Load balancers:

| Load balancer name | IP address of the Network Interface |
|---|---|
| LB1 | 12.62.63.81 |
| LB2 | 12.62.63.97 |

TABLE 5B

Servers:

| Server name | IP address of the Network Interface | Application Name | Session-based? | Server load | Clients | Load balanced group |
|---|---|---|---|---|---|---|
| HTTP Server 1 | 12.62.63.84 | HTTP Server | yes | medium | Internet-based | 0 |
| HTTP Server 2 | 12.62.63.85 | HTTP Server | yes | medium | Internet-based | 0 |
| HTTP Server 3 | 12.62.63.86 | HTTP Server | yes | medium | Internet-based | 0 |
| HTTP Server 4 | 12.62.63.87 | HTTP Server | no | unknown | Internet-based | 1 |
| HTTP Server 5 | 12.62.63.88 | HTTP Server | no | unknown | Internet-based | 1 |
| HTTP Server 6 | 12.62.63.89 | HTTP Server | no | unknown | Internet-based | 1 |
| WAS Server 1 | 12.62.63.100 | WAS Server | yes | medium | Internal non-NATted | 2 |
| WAS Server 1 | 12.62.63.101 | WAS Server | yes | medium | Internal non-NATted | 2 |
| WAS Server 1 | 12.62.63.102 | WAS Server | yes | medium | Internal non-NATted | 2 |
| WAS Server 1 | 12.62.63.103 | WAS Server | yes | medium | Internal non-NATted | 2 |
| DB2 Server | 12.62.63.104 | DB2 EE | yes | high | Internal non-NATted | 3 |
| DB2 Server | 12.62.63.105 | DB2 EE | yes | high | Internal non-NATted | 3 |
| DB2 Server | 12.62.63.106 | DB2 EE | yes | high | Internal non-NATted | 3 |

Each of the preceding load balance groups is located on the same subnet as may be verified from FIG. 34. The following load balancing rules in Table 5C will be produced by the algorithm wherein the LB mechanism is determined by the server load.

TABLE 5C

| LB group number | Servers | LB mechanism (parameters) | Session Persistence | Load balancer location |
|---|---|---|---|---|
| 0 | HTTP Server 1, HTTP Server 2, HTTP Server 3 | Round robin | Cookie-based | 12.62.63.80/28 |
| 1 | HTTP Server 4, HTTP Server 5, HTTP Server 6 | Least load | None | 12.62.63.80/28 |
| 2 | WAS Server 1, WAS Server 2, WAS Server 3, WAS Server 4 | Round robin | Source IP/port | 12.62.63.96/28 |

TABLE 5C-continued

| LB group number | Servers | LB mechanism (parameters) | Session Persistence | Load balancer location |
|---|---|---|---|---|
| 3 | DB Server 1, DB Server 2, DB Server 3 | Fastest response | Source IP/port | 12.62.63.96/28 |

4.3 Generation of Wrappers for Non-Compliant Applications

An application level communication protocol may be non-compliant with the security policy at the transport level. Examples of such transport-level non-compliance include but not limited to the following situations:

1) the application (TCP server) listens at a TCP port (or a multitude of TCP ports) which is explicitly disallowed by the security policy (e.g. a dynamically assigned port from the automatic range, as in FTP passive mode); and 2) the application (UDP server) accepts UDP datagrams using a UDP port or a port range which is explicitly disallowed by the security policy.

The present invention discloses generation of a wrapper around the application adapted to use a non-compliant port in order to cure the transport-level non-compliance, such that the wrapper will exist on the same computer as the application. The wrapper will communicate with the application via the non-compliant port or multitude of ports that the application is adapted to use, but will communicate to the outside world via compliant ports only. Thus, the application may continue to use the non-compliant transport and yet communicate with the outside world.

As an example, assume that application A wants to accept incoming connections from its clients at dynamically assigned automatic TCP ports. However, assume that local policy does not permit applications to listen at dynamically assigned automatic ports, but rather permits free static ports from the range of 1 to 5000 to be used for communications by applications. The present invention would generate a wrapper program X that would exist on the same computer as the application A. An external client C of the Application A would talk to the wrapper X at a previously agreed upon or otherwise communicated static TCP port P thinking that it talks to the application A directly, but in fact the wrapper X will accept the incoming connection at the static TCP port P, and will act as a transparent TCP proxy by forwarding the data stream it received from the client C to the application A and vice versa using another TCP connection it establishes to a local dynamic TCP port where the application A listens.

The wrapper generation software of the present invention generate the wrapper, adds the wrapper to the IT structure, and establishes a relationship stating that program A communicates through wrapper X. The wrapper would be embedded within the composition of the IT structure.

4.3.1 Algorithm For Generating Wrappers for Non-Compliant Applications

Figure 35:
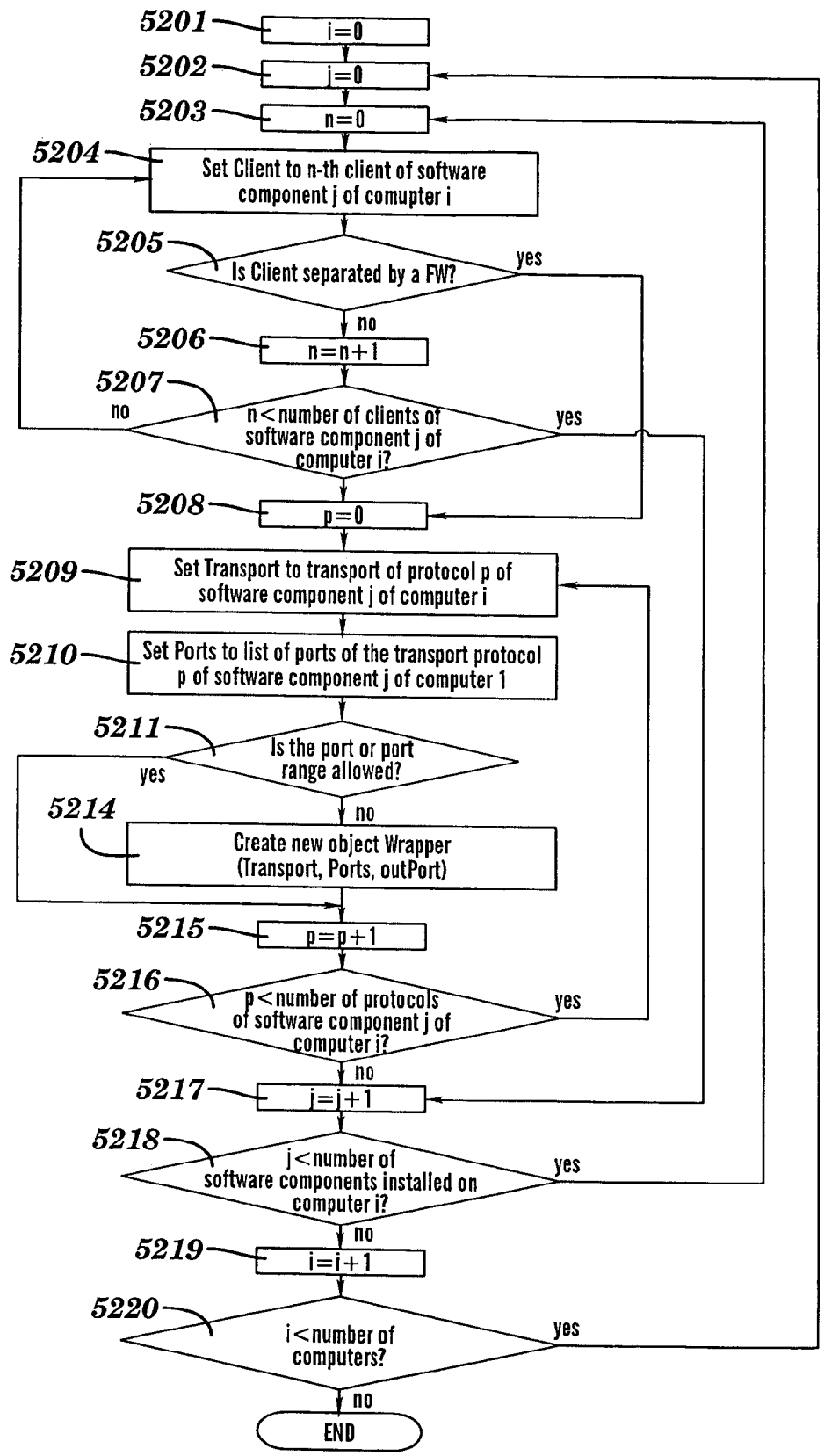
FIG. 35 is a flow chart depicting a method for generating wrappers for a non-compliant application, in accordance with embodiments of the present invention.

FIG. 35 is a flow chart comprising steps 5201-5220 which describe generation of wrappers for non-compliant applications, in accordance with embodiments of the present invention.

The counters i, j, n, and p in FIG. 35 are used as follows. Counter i indexes the computers within an IT structure primitive composition. Counter j indexes the software components installed on a given computer. Counter n indexes clients of a given software component installed on a given computer.

Counter p indexes application level protocols used by a given software component installed on the given computer.

The method iterates through all the computers in the given IT structure primitive composition, using the loop over counter i comprising steps 5202-5220. Counter i is initialized to zero in step 5201.

For each computer i, the method iterates through the software components i installed on the computer i, using the loop over counter j comprising steps 5203-5218. Counter j is initialized to zero in step 5202.

For every software component j, assumed to be a server, the method iterates through its clients n installed on the computer i, using the loop over counter n which begins at step 5204 and is terminated at step 5207. Counter n is initialized to zero in step 5203.

In steps 5204 through 5207, the method ascertains whether any client of the j-th software component is separated from the i-th computer by a firewall.

In step 5204, the memory variable Client is assigned the value of m-th Client of the j-th software component of the i-th computer of the given IT structure primitive composition.

In step 5205, the method ascertains whether Client is separated from the i-th computer by a firewall (this can be done by analyzing IP addresses of the i-th computer and Client). If yes, step 5208 is executed next; otherwise, in step 5206 the client counter n of the clients for the given software component is incremented by 1 and step 5207 determines whether all clients have been processed for the given software component j.

If all clients have been not processed for the given software component j, then the method loops back to step 5204; otherwise step 5217 is executed next.

In steps 5208 through 5216, the method iterates through the application level protocols p used by the j-th software component of the i-th computer, using the loop over counter p comprising steps 5209-5216. Counter p is initialized to zero in step 5208.

In step 5209, the memory variable Transport is assigned the value of transport protocol (i.e., TCP or UDP) used by the p-th application level protocol of the j-th software component.

In step 5210, the memory variable Ports is assigned the value of list of ports of the transport protocol (i.e., TCP or UDP) used by the p-th application level protocol of the j-th software component.

In step 5211, the method ascertains whether the port or port range used is allowed by the security policy. If no, then the method proceeds to step 5214 for generation of a wrapper, otherwise the method branches to step 5215.

In step 5214, the method creates a new instance of ITIP-TransportWrapper which represents a communication protocol wrapper which opens a single TCP connection from the client to the server and uses the connection for all the transmissions between the two hosts, by "wrapping" all the data connections and datagrams contemplated by the software client and server within the TCP connection.

Even though original non-compliant communications may have been performed using either TCP or UDP transport, the generated wrapper will always be using TCP transport (thus, if necessary, wrapping UDP datagrams with a single TCP connection). The reason for this is that it is possible to conceive a security policy which fully prohibits any UDP communications crossing IT structure boundaries.

In step 5215, the counter p of the application level protocols for the given software component j is incremented by 1.

Step 5216 determines whether all protocols of the j-th software component have been processed. If all protocols of the j-th software component have not been processed, the method loops back to step 5209; otherwise 5217 is executed next.

In step 5217, the counter j of the software components installed on the i-th computer is incremented by 1.

In step 5218, the method determines whether all software components of the i-th computer have been processed. If all software components of the i-th computer have been not processed, then the method branches back to step 5303; otherwise step 5219 is executed next.

In step 5219, the counter i of the computers within the given IT structure primitive composition is incremented by 1.

In step 5220, the method determines whether all computers have been processed. If all computers have not been processed, then the method branches back to step 5302; otherwise the method ends.

5. Verification of Correctness of Aspects of IT Structure

Verification of correctness of IT structure comprises software that generates a deliverable (i.e., an end result of a verification activity) from knowledge of IT structures and/or other aspects of an IT development model.

This section discloses verification of correctness of an IT structure deployment, detection of unauthorized changes to an operating instance of an IT structure, and verification of conformance of an IT structure to an IT delivery environment.

5.1 Verifying Correctness of an IT Structure Deployment

Figure 36:
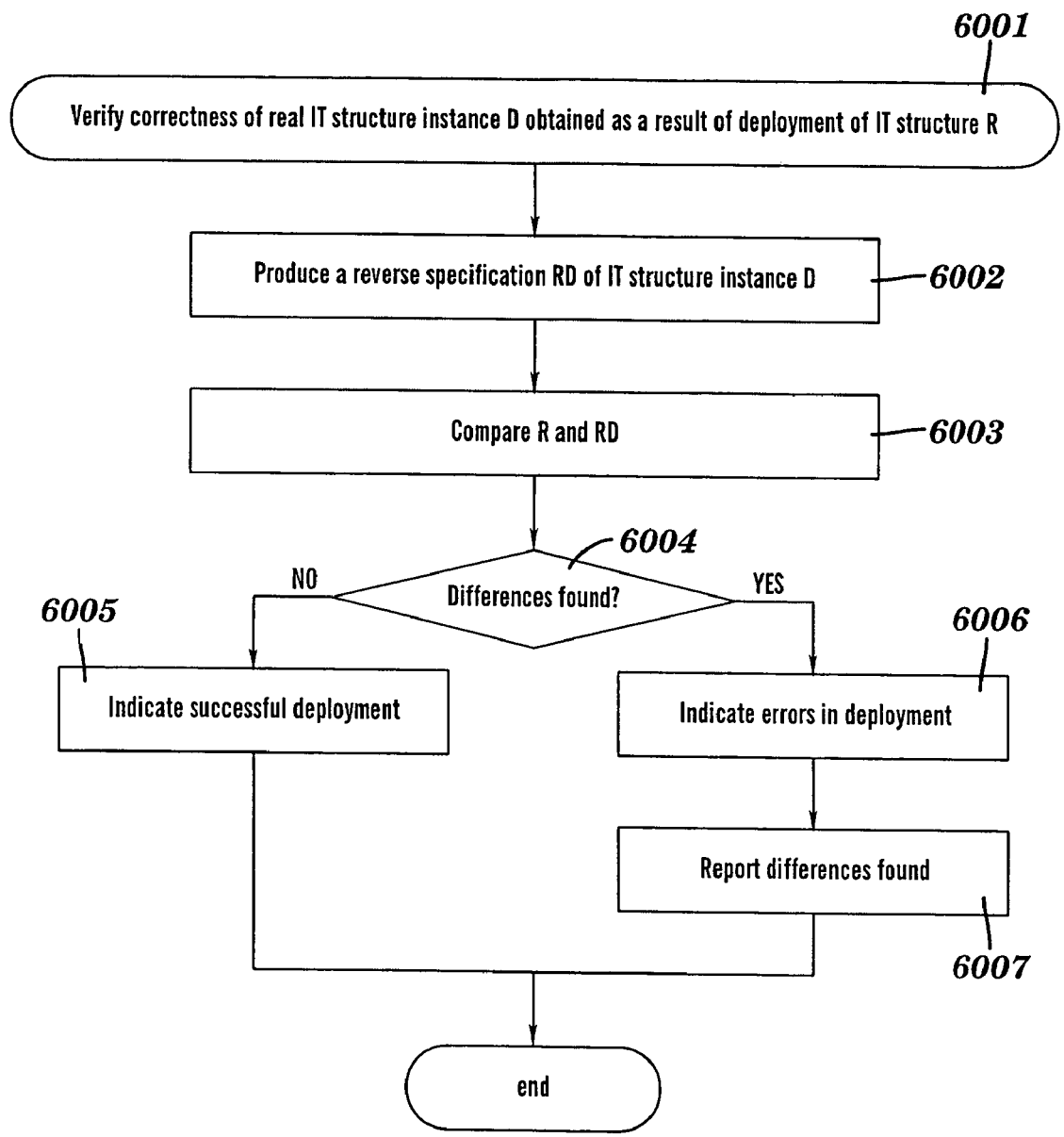
FIG. 36 is a flow chart depicting a method for verifying correctness of an IT structure deployment, in accordance with embodiments of the present invention.

The process of verifying correctness of deployment of an IT structure is illustrated in FIG. 36, in accordance with embodiments of the present invention. The objective is to verify correctness of real IT structure instance D obtained as a result of deployment of IT structure R (step 6001). The process produces a reverse specification RD of IT structure instance D (step 6002). The process then performs a comparison of IT structures R and RD (step 6003). See supra FIG. 16 and description thereof for depiction of the reverse specification process, which may comprise: providing information relating to the IT structure instance D; and generating the real IT structure RD from the information relating to the IT structure instance D. Providing information may comprise gathering the information, such as by, inter alia, at least one IT agent.

If no differences between RD and R are found (step 6004), the process indicates that D is a result of successful deployment of R (step 6005). Otherwise, the process indicates an error (step 6006) and reports differences (e.g., at least one difference discovered, all differences discovered, etc.) discovered (step 6007).

5.2 Detecting Unauthorized Changes to the Operating Instance of an IT Structure Instance Unauthorized changes to the operating instance of an IT structure can be detected by continuously or periodically employing the process of verification of deployment described above. It is assumed that any legitimate (authorized) changes to an IT structure are performed by changing the IT structure specification and re-deploying the IT structure. Any other changes, e.g., those performed against the operating instance of an IT structure, are considered illegitimate (unauthorized), be they inadvertent or maliciously intentional.

Figure 37:
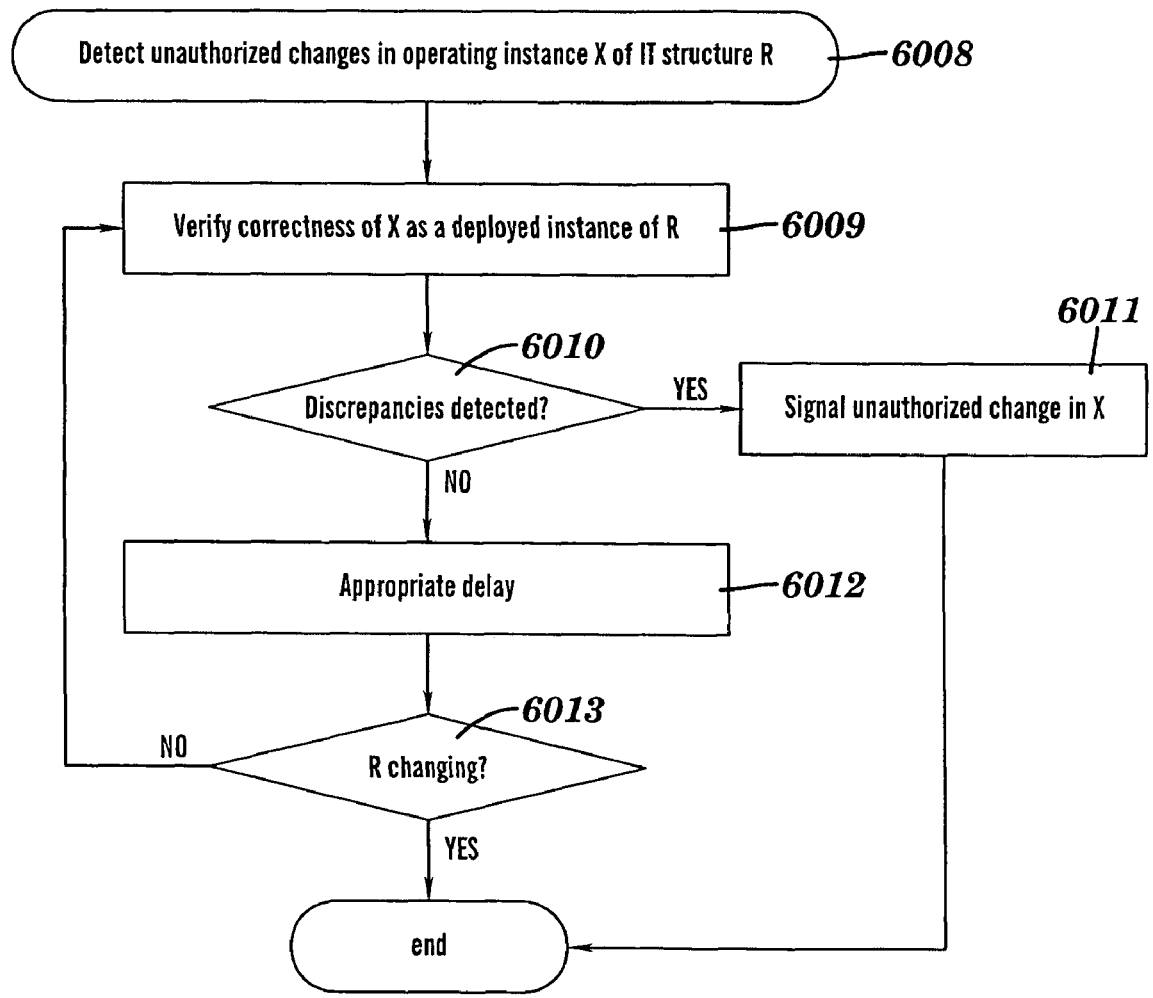
FIG. 37 is a flow chart depicting a method for detecting unauthorized changes to an operating instance of an IT structure, in accordance with embodiments of the present invention.

The process of detecting unauthorized changes to an IT structure is illustrated in FIG. 37, in accordance with embodiments of the present invention. The goal is to detect unauthorized changes to the operating instance X of IT structure R (step 6008). The process performs verification of deployment of X by determining if X is a correctly deployed instance of R (step 6009). If discrepancies are detected by the verification of deployment step of the process (step 6010) (i.e., if said determining determines that X is not a correctly deployed instance of R then signaling that X is not a correctly deployed instance of R), an unauthorized change is reported (step 6011). Depending upon the kind of a particular deviation of the real IT structure from its specification, an appropriate corrective action is triggered, and the appropriate operations personnel are notified by any available communication means (e.g., E-mail, an error message displayed on screen or placed in a report). Assuming no unauthorized changes were detected (step 6010), the process waits for an appropriate period of time (step 6012), defined by the operational policy. The period of time may be zero (i.e., no delay between verification attempts). The process then checks whether the IT structure R is undergoing an authorized change (step 6013), and if so, the process terminates. An authorized change, in this context, may mean that IT structure R is going through a translation/binding process, or is identified as "undergoing change" by the version control function of a development environment. Either one of these authorized changes in R can be detected in step 6013, and cause a termination of the change detection cycle (i.e., the verification process ends), with the assumption that the verification process may be restarted upon completion of the authorized change. In the absence of an unauthorized change to the IT structure R (step 6013), the process repeats the verification by looping back to step 6009.

The determination of whether the IT structure R is undergoing an authorized change is performed based on information obtained from the development environment that is aware of which IT structures are in a process of being changed.

In addition to the notification in step 6011 of the process described above, a set of conditions can be formulated for recognition by the process or the party notified about an occurrence of unauthorized change in step 6011, for which conditions the appropriate mitigating and damage control procedures are initiated, e.g. California SB 1386 notice procedure may be initiated whenever the network infrastructure is compromised to the extent that the service provider would believe that an intruder could have gained access to end users' private information.

5.3 Verifying Conformance of an IT Structure to an Exemplary Delivery Environment The following exemplary delivery environment is a data center and is aimed at providing the highly-available branded infrastructure for Internet-accessible IT applications.

The data center is a new, state-of-the-art facility. It is built on today's technology and practices a philosophy of being a security-focused operation. Activities and services are monitored by an experienced technical staff 24×7 from the Network Operations Center (NOC).

The facilities include 3,000 square feet of raised floor, a network operations monitoring center, conference rooms, administrative space and coffee room.

The physical space of the data center has a secure co-location in a 3,000 square foot room with 18" raised floor and is ADA (Americans with Disabilities Act)-compliant. The physical space includes 27"×39"×84" cabinets with internal vertical cable management and vented front and back doors. All hardware must fit into cabinets. No space other than cabinets is provided.

The electrical power to the data center from NYSEG (New York State Electric and Gas Company) is delivered by dual redundant feeds. The electric service in the building is connected to a parallel redundant UPS. There is a backup 1000 KW diesel generator with 7-day fuel reserve.

Primary Internet access of the data center is via AT&T Gigabit Ethernet over multi-mode fiber to their national fiber network node located in adjacent building. This network node has eight connections to the AT&T network. Alternate internet access is via 100 Mbps Ethernet over single-mode fiber connection to the Cable & Wireless Network.

Security for the data center includes access control by Smart Card system issued by NOC personnel staffed 24×7× 365 (24 hours, 7 days a week, 365 days a year). Data center floor access is controlled by access card and biometric scan. Visitors are granted access by duly authorized representatives of the data center clients. A biometric scan and surrender of the visitor's driver's license for a proxy card is required for visitors to gain access from the lobby to the administrative area. Another biometric scan and use of the access card is required to enter the raised floor area.

Every independent IT structure hosted (added to the IT delivery environment) in the exemplary IT delivery environment connects to a firewall, provided and managed by the data center. This firewall is configured to the requirements of the hosted IT structure. The data center does not prohibit IT structures being added to the IT delivery environment from having their own firewalls.

The preceding exemplary delivery environment of a data center is merely illustrative and the scope of the present invention is not limited to the preceding exemplary delivery environment.

Figure 38A:
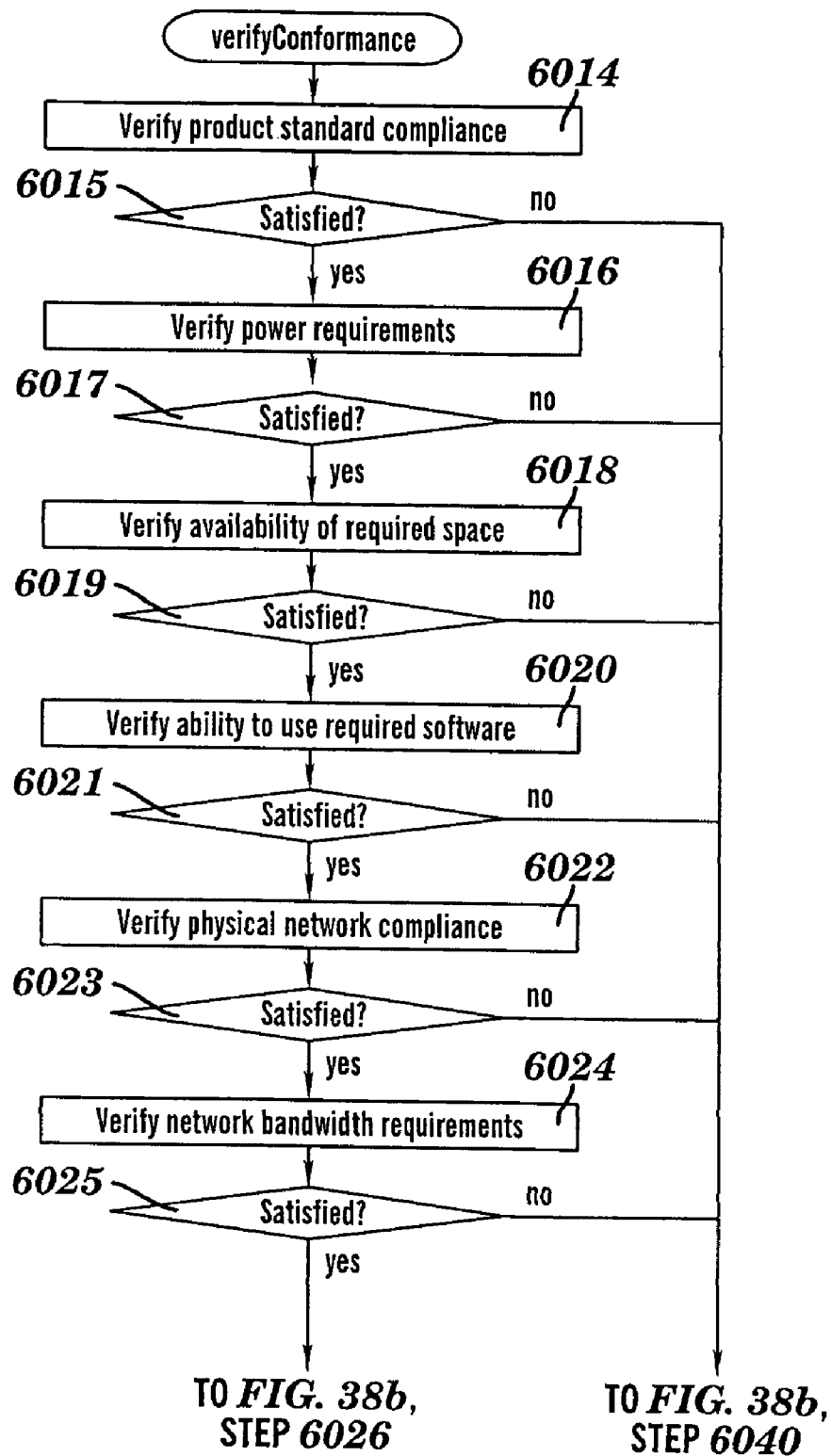
FIG. 38 is a flow chart depicting the verifyConformance( ) method of an exemplary IT delivery environment, in accordance with embodiments of the present invention.
Figure 38B:
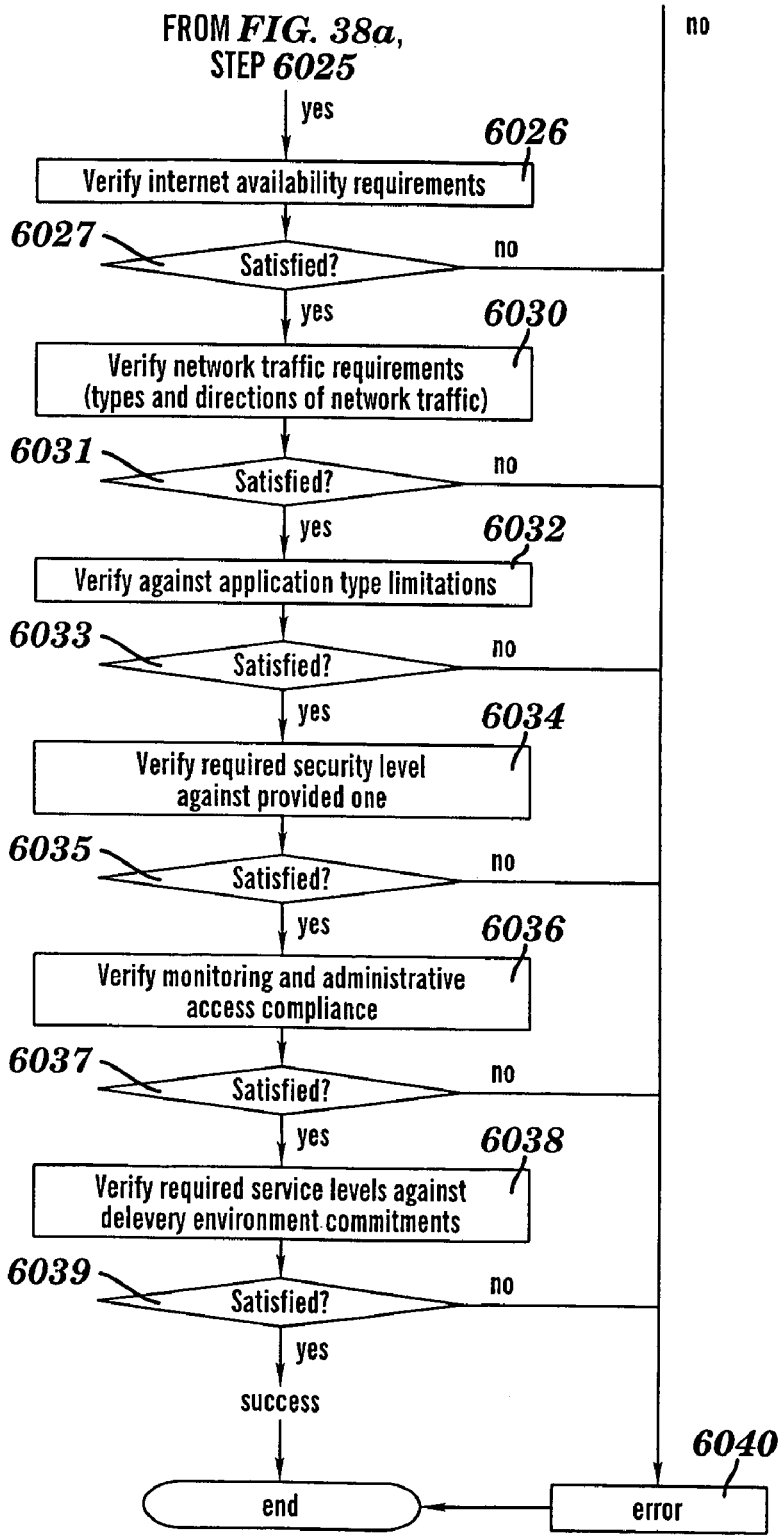

FIG. 38 provides an overview of the verifyConformance( ) method of the described IT delivery environment, in accordance with embodiments of the present invention. The verifyConformance( ) method verifies compliance of the target IT structure to the factors relevant within the context of an IT delivery environment such as the preceding exemplary delivery environment.

A set of product standards may be established by a data center, such that for certain types of products only products included in the standard set may be used—e.g., operating systems may be restricted to UNIX, and Windows; e.g., UNIX hardware platforms may be restricted to RS/6000 model F50 or H50 and no other computer may be used to run UNIX. The process examines the IT structure primitive composition (as returned by the getPrimitiveComposition( ) method) and ensures that any non-abstract elements of the primitive composition represent products that are within the established set of standards for the IT delivery environment (step 6014). If the verification is successful (no violations found) (step 6015), the process continues at step 6016, otherwise, an error is indicated 6040 and the process terminates.

The process then proceeds to verify power requirements (step 6016) (i.e., to verify that power consumption requirements of the IT structure are compatible with the power capacity of the IT delivery environment). This may involve, inter alia:

1. Verifying that the total peak power consumption of the IT Structure does not exceed the spare electrical capacity of the Data Center. The power consumption determination is performed as a sum of power consumption of all devices comprising the IT structure primitive composition (as returned by the getPrimitiveComposition( ) method, the output of which is subset to hardware devices only). The power consumption of the IT structure is a sum of outputs of PeakPowerConsumption( ) method of each of the devices in the IT structure primitive composition.

2. If the High Availability is required, verify that the spare backup generator capacity does not exceed the total peak power consumption of the IT structure in power-saving mode (e.g., with monitors and other non-critical devices switched off). To perform this determination, the power consumption of the IT structure in power-saving mode is calculated using the same approach as described above, but including in the power consumption computation only the power consumption of critical (in the context of the IT structure) devices. A critical device is a device used by the normal operation of an IT structure, as opposed of any auxiliary activities, including but not limited to error handling, logging, tracing, accountability, monitoring, etc. For example, a printer attached to a computer used by a system programmer to print captured error logs is non-critical, a monitor attached to a computer running the application server, and used by a system programmer to start and stop the application server, is non-critical, while the computer running the application server is critical.

If the verification is successful (no violations found) (step 6017), the process continues at step 6018, otherwise, an error is indicated 6040 and the process terminates.

The process then proceeds to verify availability of required space (step 6018). This may involve verifying that the number of rack slots required by the IT Structure hardware devices (the device list is determined from the IT structure primitive composition, subset to devices, then the method isRackMounted( ) is used to determine whether the device is rack mounted, followed by the use of the requiredSpace( ) method of each device to determine the number of rack slots required to house the device, and/or the amount of floor space required to place the device on the raised floor) does not exceed the number of available rack slots in the Data Center. If the verification is successful (no violations found) (step 6019), the process continues at step 6020, otherwise, an error is indicated 6040 and the process terminates.

The process then proceeds to verify the ability of the IT structure to use required software and to ensure that no forbidden software is being introduced by the IT structure into the IT delivery environment (step 6020). The process iterates through the Data Center's list of the software packages that are not allowed for deployment in it, and verifies that the IT structure primitive composition does not contain any of these forbidden software packages (based on the set of software entities (class Program) returned by the getPrimitiveComposition( ) method). If the verification is successful (no violations found) (step 6021), the process continues at step 6022, otherwise, an error is indicated (step 6040) and the process terminates. Each of the software products required for use by the IT delivery environment is defined as an IT structure, which implies definitions of its dependencies and prerequisites. The process, in step 6020, verifies that the IT structure being checked for compliance with this IT delivery environment indeed satisfies all these dependencies and prerequisites, i.e., the primitive composition of the IT structure being verified (as obtained from the method getPrimitiveComposition( )) contains all the required elements to satisfy the dependencies and prerequisites of the IT delivery environment product set.

The process then proceeds to verify physical network compliance (step 6022). This may involve verifying that the IT structure uses only physical network interfaces explicitly supported by Data Center (e.g., if phone/modem connections are required, the phone lines must be available in the Data Center). This is performed by examining the CommunicationITRelationship entities in the list of IT relationships of the IT structure, as returned by the getPrimitiveRelationships( ) method, and examining the <connection type> property of each CommunicationITRelationship thus obtained. If the verification is successful (no violations found) (step 6023), the process continues at step 6024, otherwise, an error is indicated (step 6040) and the process terminates.

The process then proceeds to verify network bandwidth requirements (step 6024). This may involve verifying that the total peak network bandwidth requirement of the software elements of an IT primitive composition of the IT structure does not exceed the total spare network capacity of the Data Center (i.e., IT delivery environment). The total peak network bandwidth requirement of the IT structure is determined as a sum of peak network bandwidth requirements of entities of class Program in the IT structure primitive composition, as returned by method getPeakBandwidthRequirement( ) of each such entity. However, the list of programs contained in the IT structure primitive composition will be subset to only those programs that communicate externally, i.e., to external entities (as determined by the examination of CommunicationITRelationship objects obtained from getPrimitiveRelationships( ) method of the IT structure). For example, if there are four entities of class Program in the IT structure primitive composition, communicating externally, and having the peak bandwidth requirements of 1, 0.5, 2.5, and 4 Mbps, then the resulting total peak bandwidth requirement will be 8 Mbps. If the verification is successful (no violations found) (step 6025), the process continues at step 6026, otherwise, an error is indicated (step 6040) and the process terminates.

The process then proceeds to verify Internet availability requirements (step 6026) (i.e., Internet availability provided by the IT delivery environment to satisfy Internet connectivity requirements of the IT structure). This may involve:

1. If the Internet connectivity is required by the IT structure (as indicated by the presence of at least one CommunicationITRelationship entity in the IT structure set of primitive IT relationships (method getPrimitiveRelationships( ) that involves an external IT structure), verifying that the Data Center has at least one Internet hookup.

2. If the High Availability (as evidenced by getOperationalCharacteristics( ) method of the IT structure) is required and the Internet connectivity is required, verifying that the Data Center has at least two Internet hookups through different providers.

If the verification is successful (no violations found) (step 6027), the process continues at step 6030, otherwise, an error is indicated (step 6040) and the process terminates.

The process then proceeds to verify network traffic requirements (step 6030). This may involve:

1. If the Data Center (i.e., IT delivery environment) forbids certain protocols (UDP, ICMP, X), verifying that these protocols are not used by the IT Structure. The verification is performed by examining the properties of ConnectsTo IT interfaces comprising CommunicationITRelationship objects in the list obtained from the getPrimitiveRelationships( ) method.

2. If the Data Center (i.e., IT delivery environment) forbids incoming connections to certain ports, verifying that the IT Structure doesn't have interfaces on those ports that need to be accessed from outside the data center network (i.e., the IT structure does not comprise an interface on any port forbidden by the IT delivery environment from accessing external data flow into the IT delivery environment from outside of the IT delivery environment). Port usage is evidenced from properties of ConnectsTo IT interfaces comprising CommunicationITRelationship objects, contained in the set returned by getPrimitiveRelationships( ), subset to CommunicationITRelationship objects involving external IT structures.

3. If the Data Center (i.e., IT delivery environment) forbids outgoing connections to certain ports, verifying that the IT Structure doesn't have interfaces on these ports that need to access the interfaces outside the Data Center network (i.e., the IT structure does not comprise an interface on any port forbidden by the IT delivery environment from facilitating outward data flow from within the IT delivery environment to outside of the IT delivery environment). Port usage is evidenced from properties of ConnectsTo IT interfaces comprising CommunicationITRelationship objects contained in the set returned by getPrimitiveRelationships( ), subset to CommunicationITRelationship objects involving external IT structures.

If the verification is successful (no violations found) (step 6031), the process continues at step 6032, otherwise, an error is indicated (step 6040) and the process terminates.

The process then proceeds to verify against software application type limitations (step 6032). This may involve:

1. If the Data Center (i.e., IT delivery environment) policies forbid certain types of software applications, verifying that IT Structure does not include such software applications (e.g., Data Center policies may forbid using FTP servers for security reasons). This determination is performed by examining subclasses of Program objects contained in the IT structure primitive composition, as returned by the getPrimitiveComposition( ) method.

2. If the Data Center (i.e., IT delivery environment) policies forbid certain communication modes of applications, verifying that IT Structure does not include software applications running in that mode (e.g., Data Center may forbid originating SMTP emails from its hosts for fear of being blocked by anti-spanning engines if it is abused). This determination is performed by examining subclasses of ConnectsTo ITInterface comprising ITRelationships (obtained from getPrimitiveITRelationships( ) method) involving external IT structures, these ConnectsTo subclasses using port 25 (SMTP).

If the verification is successful (no violations found) (step 6033), the process continues at step 6034, otherwise, an error is indicated (step 6040) and the process terminates.

The process then proceeds to verify required security level against the provided one (step 6034). This may involve:

1. Verifying physical security requirements. This may be performed as a manual step of the method, involving comparison of security operational characteristics obtained from getOperationalCharacteristics( ) method of the IT structure to the actual physical security policy of the data center, or as an automated (program) comparison of security operational characteristics of the IT structure to the data center security policy represented as a set of operational characteristic expressions. If a manual activity is performed, the process continues upon manual entry of the result of the physical security check. For example, the IT structure being verified may include a wireless access point. This wireless access point must be protected against physical theft and tampering by being mounted inside a locked cabinet. The IT delivery environment then must have the ability to mount wireless access points inside a locked cabinet, as a part of its physical security policy. If the IT delivery environment has a less restrictive physical security policy for wireless access point mounting (e.g., wireless access points must be mounted within the ceiling space or at least 8' above the floor), then this may be insufficient to satisfy the more restrictive requirement of the IT structure, and therefore the check in step 6034 would fail.

2. Verifying anti-virus protection. This involves obtaining the list of objects of class Program from the IT structure primitive composition (as returned by the getPrimitiveComposition( ) method), and making sure that every object of class Program representing Windows OS has installed (the corresponding InstallationITRelationship object is present in the IT structure set of IT relationships as provided by the getPrimitiveRelationships( ) method) on it an object of class Program representing an Anti-Virus program (as evidenced by the appropriate subclass).

If the verification is successful (no violations found) (step 6035), the process continues at step 6036, otherwise, an error is indicated (step 6040) and the process terminates.

The process then proceeds to verify monitoring and administrative access compliance (step 6036). This may involve verifying that IT Structure has all of the necessary interfaces (network or other) to provide access to the IT structure by monitoring systems of the Data Center (i.e., IT delivery environment). A particular subclass of Manageable ITInterface may be required to be present in all IT structures deployed in this IT delivery environment, in which case the determination may be performed by examining the list of Manageable ITInterfaces as comprising the IT relationships returned by the getPrimitiveRelationships( ) method. For example, a separate network segment may be required by the IT delivery environment for administrative access and, in this step, verification could include a check for the presence of a NIC connecting to the administrative segment in the IT structure being verified.

If the verification is successful (no violations found) (step 6037), the process continues at step 6038, otherwise, an error is indicated (step 6040) and the process terminates.

The process then proceeds to verify required service levels against delivery environment commitments (step 6038). This may involve:

1. Verifying that the Data Center incident response time does not exceed the response time claimed in the IT Structure (as evidenced by the appropriate operational characteristic of the IT structure, contained in the list of operational characteristics returned by the getOperationalCharacteristics( ) method). For example, operational characteristic INCIDENT_RESPONSE_TIME(<time>) may be defined. The IT structure may have the INCIDENT_RESPONSE_TIME operational characteristic with the value of 5 min, indicating that an error incident must be handled no slower than 5 minutes from its occurrence. The IT delivery environment may have a standard policy of handling incidents, with the rule being that error incident handling will not exceed 30 minutes from the time of occurrence. In this case, the IT structure imposes a more stringent incident handling requirement than the IT delivery environment can provide and the verification test of step 6038 will accordingly fail.

2. Verifying that the expected monthly number of incidents in the IT Structure multiplied by Data Center incident response time does not exceed the maximum permitted monthly down time (as evidenced by the appropriate operational characteristic of the IT structure, contained in the list of operational characteristics returned by the getOperationalCharacteristics( ) method). For example, the IT structure being verified may have the operational characteristics AVAILABILITY(99.9%) and MAX_NUMBER_OF_INCIDENTS(5/month). The IT delivery environment has the operational characteristic INCIDENT_RESPONSE_TIME(5 min). Assuming that any incident equates to downtime (or unavailability), this means that the number of incidents per month cannot exceed 8 (i.e., $(1.000-0.999) \times 30$ days/month$\times 1440$ minutes/day$\div 5$ minutes/incident), and the IT structure complies with the IT delivery environment. If, however, the IT delivery environment had the INCIDENT_RESPONSE_TIME operational characteristic value of 30 minutes, then the IT structure being verified would not be able to maintain 99.9% availability and the maximum expected number of incidents of 5 per month, resulting in failure of the test of step 6038.

Thus, step 6038 verifies that the IT structure does not have incident response requirements that cannot be fulfilled by the IT delivery environment. If the verification of step 6038 is successful (i.e., no violations found) as determined in step 6039, the process terminates successfully (indicating that the IT structure is compliant with the IT delivery environment), otherwise, an error is indicated (step 6040) and the process terminates.

6.0 Computer System

Figure 20:
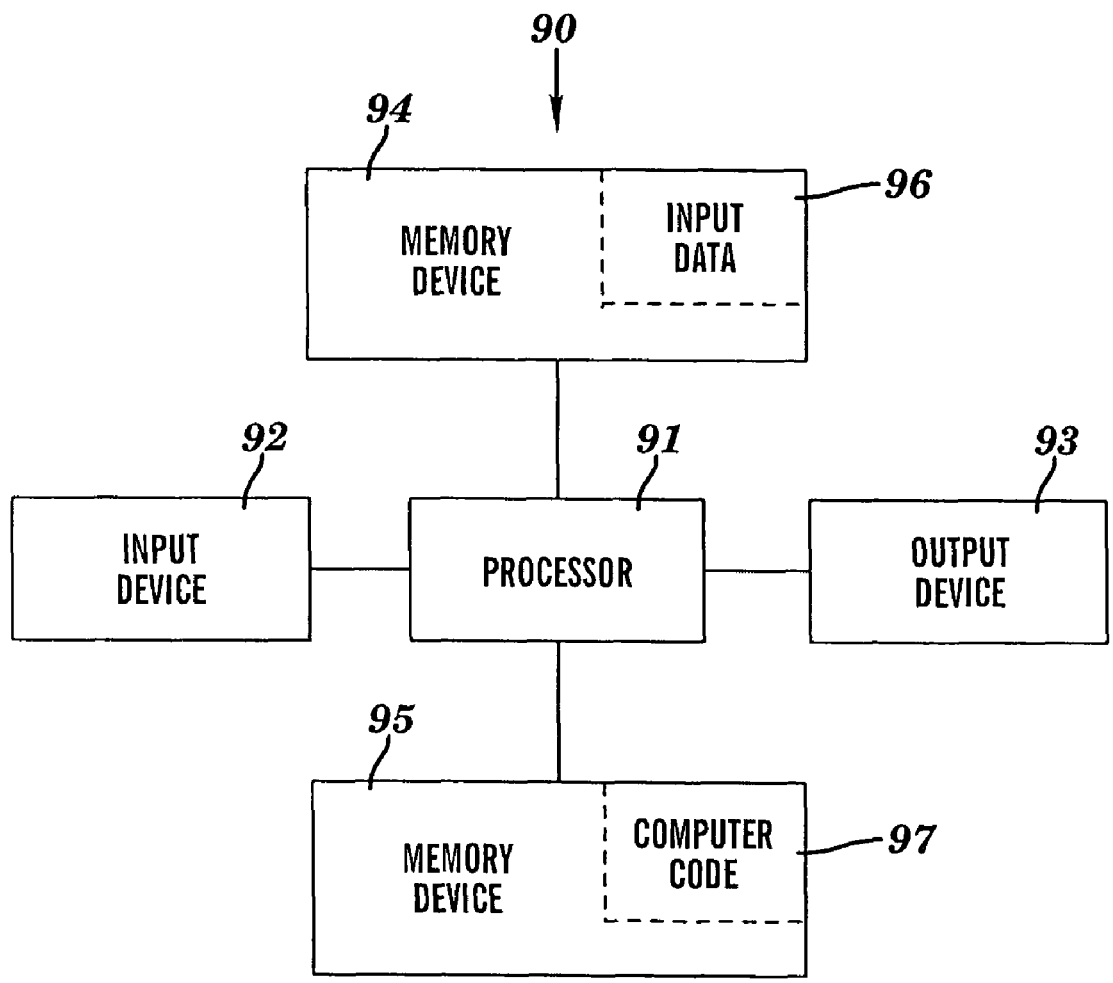
FIG. 20 illustrates a computer system used for implementing an IT Entity Model and associated processes, in accordance with embodiments of the present invention.

FIG. 20 illustrates a computer system 90 used for implementing an IT Entity Model and associated processes, for visualizing configurations relating to IT structures, for generation of IT configuration elements (e.g., firewall rules, load balancing scripts, wrappers for non-compliant applications), and for automating verification of correctness of aspects of an IT system, including any subset of the algorithms and methods described herein, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes one or more algorithms for implementing an IT Entity Model and associated processes, for visualizing configurations relating to IT structures, for generation of IT configuration elements (e.g., firewall rules, load balancing scripts, wrappers for non-compliant applications), and for automating verification of correctness of aspects of an IT system, including any subset of the algorithms and methods described herein. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 20) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for implementing an IT Entity Model and associated processes, for visualizing configurations relating to IT structures, for generation of IT configuration elements (e.g., firewall rules, load balancing scripts, wrappers for non-compliant applications), and for automating verification of correctness of aspects of an IT system, including any subset of the algorithms and methods described herein.

While FIG. 20 shows the computer system 90 as a particular configuration of hardware and software, any configuration of hardware and software, as would be known to a person of ordinary skill in the art, may be utilized for the purposes stated supra in conjunction with the particular computer system 90 of FIG. 20. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for verifying conformance of an Information Technology (IT) structure of an IT system to an IT delivery environment, said method comprising:

a processor of a computer system verifying product standard compliance of the IT structure by verifying that a primitive composition of the IT structure does not comprise a non-abstract element that is not in conformance with all standards established for the IT delivery environment, said primitive composition of the IT structure comprising non-abstract elements that include a plurality of hardware devices, said IT delivery environment comprising IT delivery environment policies;

verifying compliance of software elements of the primitive composition of the IT structure by explicitly verifying that the IT structure does not comprise a software element that is on an existing list of software elements forbidden from being used in the IT delivery environment, and by explicitly verifying that each software element of the IT structure required for use in the IT delivery environment satisfies all dependencies of said each software element required by the IT delivery environment;

verifying software application type compliance of the IT structure by explicitly verifying that the IT structure does not comprise a software application type that is explicitly specified in the IT delivery environment policies as being forbidden from being used in the IT delivery environment;

verifying software application communication compliance of the IT structure by explicit verifying that the IT structure does not comprise a software application communication mode explicitly specified in the IT delivery environment policies as being forbidden from being used in the IT delivery environment; and verifying network traffic compliance of the IT structure by explicitly verifying that:
the IT structure does not use a protocol explicitly specified by the IT delivery environment as being forbidden from being used in the IT delivery environment,
the IT structure does not comprise an interface on any port explicitly specified by the IT delivery environment as being forbidden from accessing external data flow into the IT delivery environment from outside of the IT delivery environment, and
the IT structure does not comprise an interface on any port explicitly specified by the IT delivery environment as being forbidden from facilitating outward data flow from within the IT delivery environment to outside of the IT delivery environment.

2. The method of claim 1, said method further comprising verifying network bandwidth compliance of the IT structure by explicitly verifying that a total peak network bandwidth required collectively by only externally communicating software elements of the software elements of the primitive composition of the IT structure does not exceed a total spare network bandwidth capacity of the IT delivery environment, wherein the externally communicating software elements communicate to entities external to the IT delivery environment.

3. The method of claim 1, said method further comprising verifying monitoring and administrative access compliance of the IT structure by explicitly verifying that the IT structure has all interfaces necessary for providing access to the IT structure by a monitoring system of the IT delivery environment.

4. The method of claim 1, said method further comprising explicitly verifying that a required service level compliance of the IT structure does not have an incident response timing requirement that cannot be fulfilled by an operational characteristic explicitly specified for the IT delivery environment.

5. The method of claim 1, said method further comprising:
   explicitly verifying required security level compliance of the IT structure;
   explicitly verifying Internet availability provided by the IT delivery environment to satisfy Internet connectivity requirements of the IT structure;
   verifying that a power consumption by all devices in the primitive composition of the IT structure does not exceed a power capacity of the IT delivery environment, wherein said power consumption by all devices is a sum of a peak power output of said all devices in the primitive composition of the IT structure;
   explicitly verifying that the IT structure uses only physical network interface specified in a list of IT relationships of the IT structure as being supported by the IT delivery environment; and
   explicitly verifying that a space requirement of the hardware devices comprised by an IT primitive composition of the IT structure can be satisfied by the IT delivery environment.

6. The method of claim 1,
   wherein the IT delivery environment policies explicitly specify that a software application communication mode of Simple Mail Transfer Protocol (SMTP) is forbidden from being used in the IT delivery environment, and
   wherein the IT delivery environment explicitly specifies that a protocol of User Datagram Protocol (UDP) is forbidden from being used in the IT delivery environment.

7. A computer program product, comprising a computer readable storage medium having a computer readable program code stored therein, said computer readable program code comprising an algorithm adapted to implement method for verifying conformance of an Information Technology (IT) structure of an IT system to an IT delivery environment, said method comprising:
   verifying product standard compliance of the IT structure by verifying that a primitive composition of the IT structure does not comprise a non-abstract element that is not in conformance with all standards established for the IT delivery environment, said primitive composition of the IT structure comprising non-abstract elements that include a plurality of hardware devices, said IT delivery environment comprising IT delivery environment policies;
   verifying compliance of software elements of the primitive composition of the IT structure by explicitly verifying that the IT structure does not comprise a software element that is on an existing list of software elements forbidden from being used in the IT delivery environment, and by explicitly verifying that each software element of the IT structure required for use in the IT delivery environment satisfies all dependencies of said each software element required by the IT delivery environment;
   verifying software application type compliance of the IT structure by explicitly verifying that the IT structure does not comprise a software application type that is explicitly specified in the IT delivery environment policies as being forbidden from being used in the IT delivery environment;
   verifying software application communication compliance of the IT structure by explicitly verifying that the IT structure does not comprise a software application communication mode explicitly specified in the IT delivery environment policies as being forbidden from being used in the IT delivery environment; and
   verifying network traffic compliance of the IT structure by explicitly verifying that:
      the IT structure does not use a protocol explicitly specified by the IT delivery environment as being forbidden from being used in the IT delivery environment,
      the IT structure does not comprise an interface on any port explicitly specified by the IT delivery environment as being forbidden from accessing external data flow into the IT delivery environment from outside of the IT delivery environment, and
      the IT structure does not comprise an interface on any port explicitly specified by the IT delivery environment as being forbidden from facilitating outward data flow from within the IT delivery environment to outside of the IT delivery environment.

8. The computer program product of claim 7, said method further comprising verifying network bandwidth compliance of the IT structure by explicitly verifying that a total peak network bandwidth required collectively by only externally communicating software elements of the software elements of the primitive composition of the IT structure does not exceed a total spare network bandwidth capacity of the IT delivery environment, wherein the externally communicating software elements communicate to entities external to the IT delivery environment.

9. The computer program product of claim 7, said method further comprising verifying monitoring and administrative access compliance of the IT structure by explicitly verifying that the IT structure has all interfaces necessary for providing access to the IT structure by a monitoring system of the IT delivery environment.

10. The computer program product of claim 7, said method further comprising explicitly verifying that a required service level compliance of the IT structure does not have an incident response timing requirement that cannot be fulfilled by an operational characteristic explicitly specified for the IT delivery environment.

11. The computer program product of claim 7, said method further comprising:
   explicitly verifying required security level compliance of the IT structure;
   explicitly verifying Internet availability provided by the IT delivery environment to satisfy Internet connectivity requirements of the IT structure;
   verifying that a power consumption by all devices in the primitive composition of the IT structure does not exceed a power capacity of the IT delivery environment, wherein said power consumption by all devices is a sum of a peak power output of said all devices in the primitive composition of the IT structure;

explicitly verifying that the IT structure uses only physical network interface specified in a list of IT relationships of the IT structure as being supported by the IT delivery environment; and explicitly verifying that a space requirement of the hardware devices comprised by an IT primitive composition of the IT structure can be satisfied by the IT delivery environment.

12. The computer program product of claim 7, wherein the IT delivery environment policies explicitly specify that a software application communication mode of Simple Mail Transfer Protocol (SMTP) is forbidden from being used in the IT delivery environment, and wherein the IT delivery environment explicitly specifies that a protocol of User Datagram Protocol (UDP) is forbidden from being used in the IT delivery environment.

13. A process for integrating computing infrastructure, said process comprising integrating computer-readable code into a computing system, wherein the code in combination with the computing system is capable of performing a method for verifying conformance of an Information Technology (IT) structure of an IT system to an IT delivery environment, said method comprising:

a processor of the computing system verifying product standard compliance of the IT structure by verifying that a primitive composition of the IT structure does not comprise a non-abstract element that is not in conformance with all standards established for the IT delivery environment, said primitive composition of the IT structure comprising non-abstract elements that include a plurality of hardware devices, said IT delivery environment comprising IT delivery environment policies;

verifying compliance of software elements of the primitive composition of the IT structure by explicitly verifying that the IT structure does not comprise a software element that is on an existing list of software elements forbidden from being used in the IT delivery environment, and by explicitly verifying that each software element of the IT structure required for use in the IT delivery environment satisfies all dependencies of said each software element required by the IT delivery environment;

verifying software application type compliance of the IT structure by explicitly verifying that the IT structure does not comprise a software application type that is explicitly specified in the IT delivery environment policies as being forbidden from being used in the IT delivery environment;

verifying software application communication compliance of the IT structure by explicitly verifying that the IT structure does not comprise a software application communication mode explicitly specified in the IT delivery environment policies as being forbidden from being used in the IT delivery environment; and verifying network traffic compliance of the IT structure by explicitly verifying that:

the IT structure does not use a protocol explicitly specified by the IT delivery environment as being forbidden from being used in the IT delivery environment, the IT structure does not comprise an interface on any port explicitly specified by the IT delivery environment as being forbidden from accessing external data flow into the IT delivery environment from outside of the IT delivery environment, and the IT structure does not comprise an interface on any port explicitly specified by the IT delivery environment as being forbidden from facilitating outward data flow from within the IT delivery environment to outside of the IT delivery environment.

14. The process of claim 13, said method further comprising verifying network bandwidth compliance of the IT structure by explicitly verifying that a total peak network bandwidth required collectively by only externally communicating software elements of the software elements of the primitive composition of the IT structure does not exceed a total spare network bandwidth capacity of the IT delivery environment, wherein the externally communicating software elements communicate to entities external to the IT delivery environment.

15. The process of claim 13, said method further comprising verifying monitoring and administrative access compliance of the IT structure by explicitly verifying that the IT structure has all interfaces necessary for providing access to the IT structure by a monitoring system of the IT delivery environment.

16. The process of claim 13, said method further comprising further comprising explicitly verifying that a required service level compliance of the IT structure does not have an incident response timing requirement that cannot be fulfilled by an operational characteristic explicitly specified for the IT delivery environment.

17. The process of claim 13, said method further comprising:

explicitly verifying required security level compliance of the IT structure;

explicitly verifying Internet availability provided by the IT delivery environment to satisfy Internet connectivity requirements of the IT structure;

verifying that a power consumption by all devices in the primitive composition of the IT structure does not exceed a power capacity of the IT delivery environment, wherein said power consumption by all devices is a sum of a peak power output of said all devices in the primitive composition of the IT structure;

explicitly verifying that the IT structure uses only physical network interface specified in a list of IT relationships of the IT structure as being supported by the IT delivery environment; and explicitly verifying that a space requirement of the hardware devices comprised by an IT primitive composition of the IT structure can be satisfied by the IT delivery environment.

18. The process of claim 13, wherein the IT delivery environment policies explicitly specify that a software application communication mode of Simple Mail Transfer Protocol (SMTP) is forbidden from being used in the IT delivery environment, and wherein the IT delivery environment explicitly specifies that a protocol of User Datagram Protocol (UDP) is forbidden from being used in the IT delivery environment.

19. A computer system comprising a processor and a computer readable memory unit coupled to the processor, said memory unit containing program code configured to be executed by the processor to implement a method for verifying conformance of an Information Technology (IT) structure of an IT system to an IT delivery environment, said method comprising:

verifying product standard compliance of the IT structure by verifying that a primitive composition of the IT structure does not comprise a non-abstract element that is not in conformance with all standards established for the IT delivery environment, said primitive composition of the IT structure comprising non-abstract elements that include a plurality of hardware devices, said IT delivery environment comprising IT delivery environment policies;

verifying compliance of software elements of the primitive composition of the IT structure by explicitly verifying that the IT structure does not comprise a software element that is on an existing list of software elements forbidden from being used in the IT delivery environment, and by explicitly verifying that each software element of the IT structure required for use in the IT delivery environment satisfies all dependencies of said each software element required by the IT delivery environment;

verifying software application type compliance of the IT structure by explicitly verifying that the IT structure does not comprise a software application type that is explicitly specified in the IT delivery environment policies as being forbidden from being used in the IT delivery environment;

verifying software application communication compliance of the IT structure by explicitly verifying that the IT structure does not comprise a software application communication mode explicitly specified in the IT delivery environment policies as being forbidden from being used in the IT delivery environment; and verifying network traffic compliance of the IT structure by explicitly verifying that:
 the IT structure does not use a protocol explicitly specified by the IT delivery environment as being forbidden from being used in the IT delivery environment,
 the IT structure does not comprise an interface on any port explicitly specified by the IT delivery environment as being forbidden from accessing external data flow into the IT delivery environment from outside of the IT delivery environment, and
 the IT structure does not comprise an interface on any port explicitly specified by the IT delivery environment as being forbidden from facilitating outward data flow from within the IT delivery environment to outside of the IT delivery environment.

20. The computer system of claim 19, said method further comprising verifying network bandwidth compliance of the IT structure by explicitly verifying that a total peak network bandwidth required collectively by only externally communicating software elements of the software elements of the primitive composition of the IT structure does not exceed a total spare network bandwidth capacity of the IT delivery environment, wherein the externally communicating software elements communicate to entities external to the IT delivery environment.

21. The computer system of claim 19, said method further comprising verifying monitoring and administrative access compliance of the IT structure by explicitly verifying that the IT structure has all interfaces necessary for providing access to the IT structure by a monitoring system of the IT delivery environment.

22. The computer system of claim 19, said method further comprising explicitly verifying that a required service level compliance of the IT structure does not have an incident response timing requirement that cannot be fulfilled by an operational characteristic explicitly specified for the IT delivery environment.

23. The computer system of claim 19, said method further comprising:
 explicitly verifying required security level compliance of the IT structure;
 explicitly verifying Internet availability provided by the IT delivery environment to satisfy Internet connectivity requirements of the IT structure;
 verifying that a power consumption by all devices in the primitive composition of the IT structure does not exceed a power capacity of the IT delivery environment, wherein said power consumption by all devices is a sum of a peak power output of said all devices in the primitive composition of the IT structure;
 explicitly verifying that the IT structure uses only physical network interface specified in a list of IT relationships of the IT structure as being supported by the IT delivery environment; and
 explicitly verifying that a space requirement of the hardware devices comprised by an IT primitive composition of the IT structure can be satisfied by the IT delivery environment.

24. The computer system of claim 19,
 wherein the IT delivery environment policies explicitly specify that a software application communication mode of Simple Mail Transfer Protocol (SMTP) is forbidden from being used in the IT delivery environment, and
 wherein the IT delivery environment explicitly specifies that a protocol of User Datagram Protocol (UDP) is forbidden from being used in the IT delivery environment.

* * * * *